United States Patent [19]

Erickson et al.

[11] 4,106,090
[45] Aug. 8, 1978

[54] MONOLITHIC MICROCOMPUTER CENTRAL PROCESSOR

[75] Inventors: Charles R. Erickson, Fremont; Hemraj K. Hingarh; Robert Moeckel, both of Santa Clara; Dan Wilnai, Sunnyvale, all of Calif.

[73] Assignee: Fairchild Camera and Instrument Corporation, Mountain View, Calif.

[21] Appl. No.: 760,063

[22] Filed: Jan. 17, 1977

[51] Int. Cl.² .............................................. G06F 7/48
[52] U.S. Cl. ................................................... 364/200
[58] Field of Search ......................... 364/200 MS File

[56] References Cited

U.S. PATENT DOCUMENTS

| B 533,454 | 3/1976 | Moran | 364/200 |
|---|---|---|---|
| 3,757,306 | 9/1973 | Boone | 364/200 |
| 3,825,905 | 7/1974 | Allen, Jr. | 364/200 |
| 3,832,694 | 8/1974 | Judith | 364/200 |
| 3,962,684 | 6/1976 | Caudel et al. | 364/200 |
| 3,969,724 | 7/1976 | Anderson et al. | 364/200 |

Primary Examiner—Harvey E. Springborn
Attorney, Agent, or Firm—Alan H. MacPherson; Henry K. Woodward; Robert C. Colwell

[57] ABSTRACT

A central processing unit (CPU) is utilized in combination with external memories and input/output devices to form a Microcomputer System. The CPU is a 16-bit fixed word length processor monolithically integrated onto a single semiconductor chip which uses two's complement arithmetic for computations. The CPU includes an arithmetic logic unit (ALU), accumulators, data path multiplexers, program counter means, and programmable logic arrays to control operation of the processor.

The processor of this invention is capable of using a homogeneous memory, wherein instructions and data are both stored in the same memory. In the disclosed embodiment, 15 of the 16-bits are used for addressing the memory. Thus, the processor is capable of directly addressing 32,768 16-bit words in the memory.

An external 16-bit bus is used to interconnect the external memory and input/output devices with the CPU. Bidirectional three-state logic is used to enable both input and output data, as well as memory addresses, to be transmitted over the same bus thereby simplifying design. In addition, provision is made for coupling an operator console into a system formed around the processor of this invention, thus allowing for a user to interface with the system.

5 Claims, 36 Drawing Figures

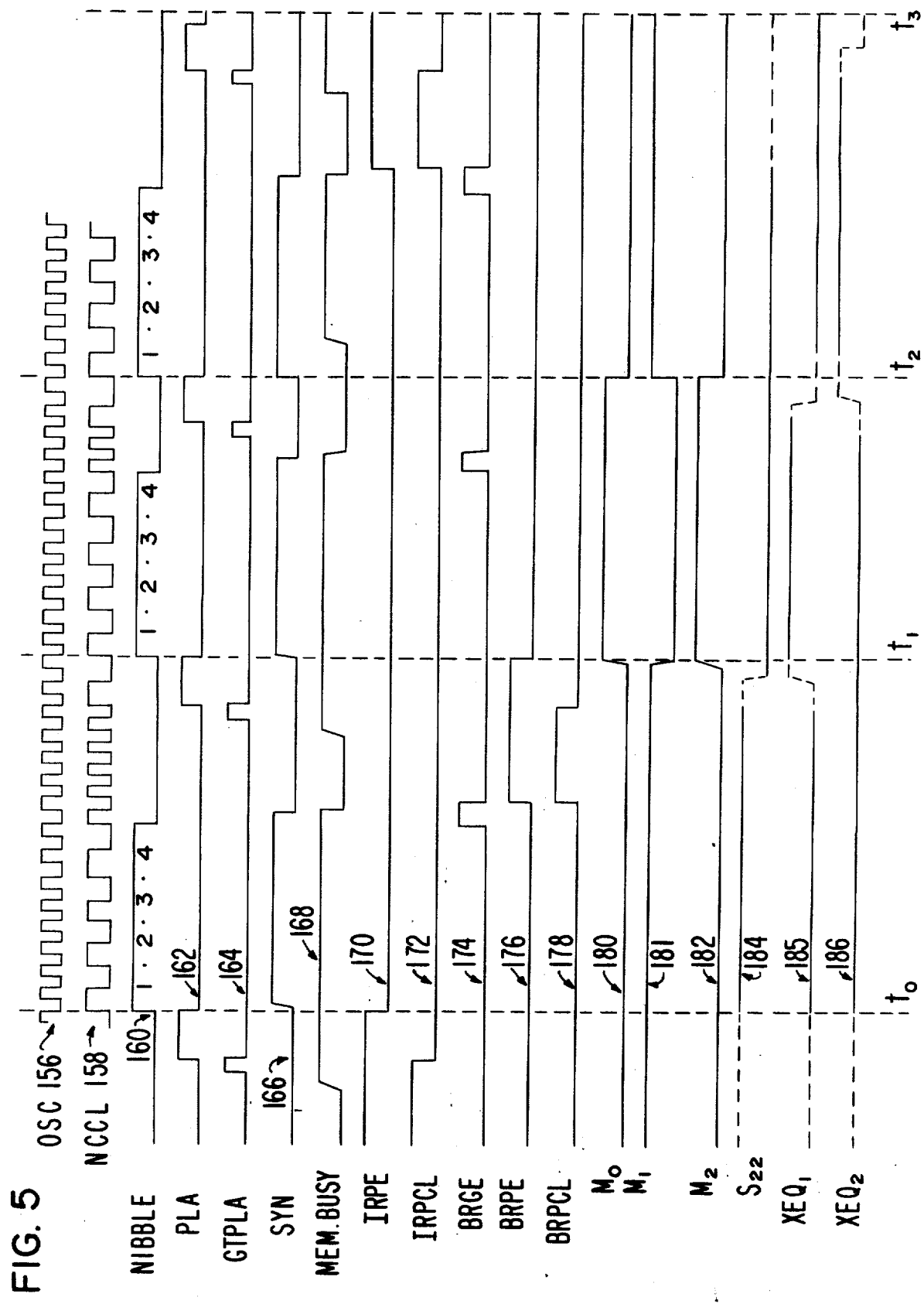

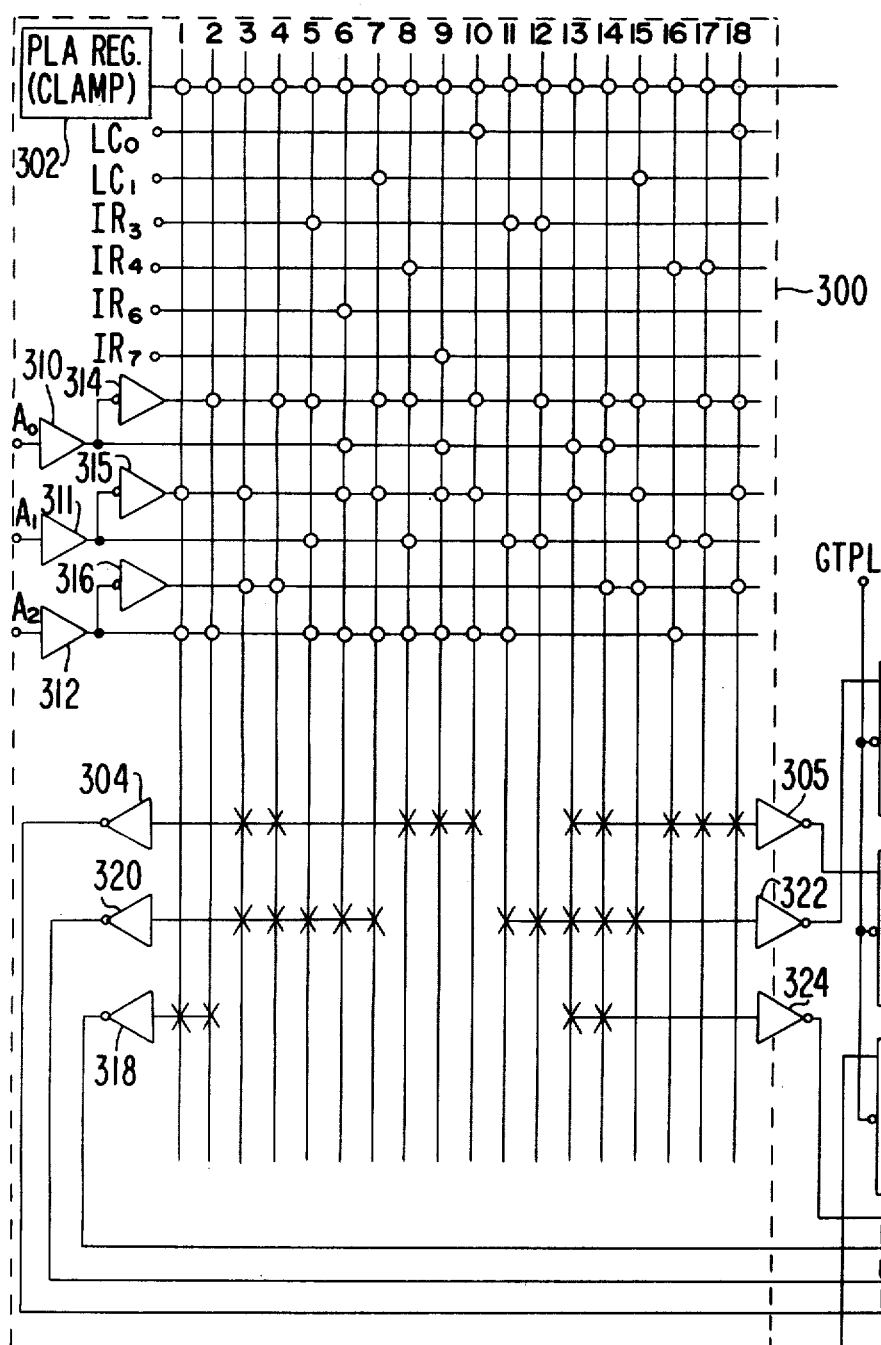
FIG. 8
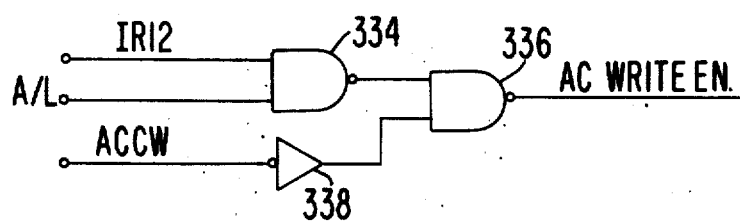

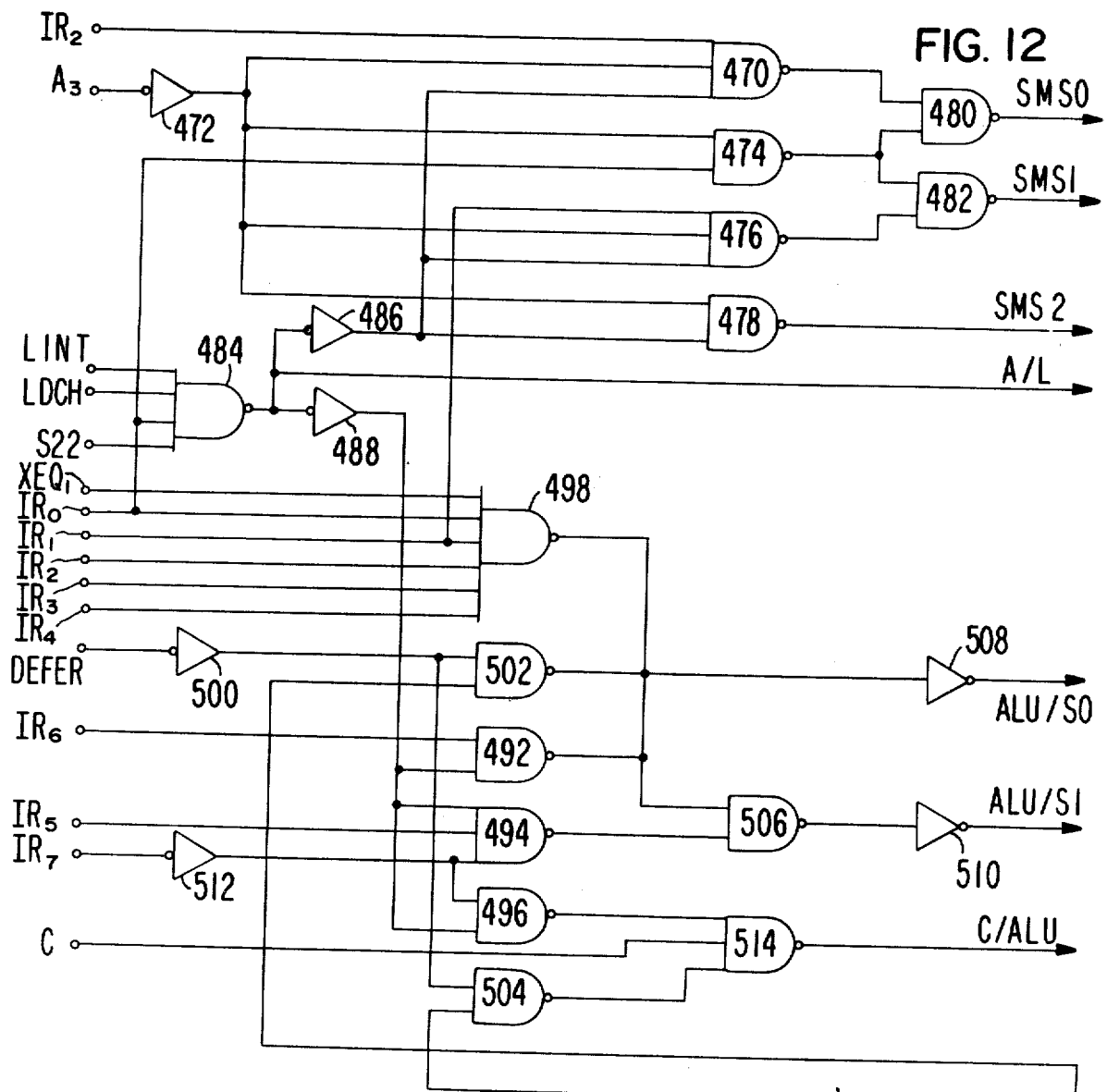
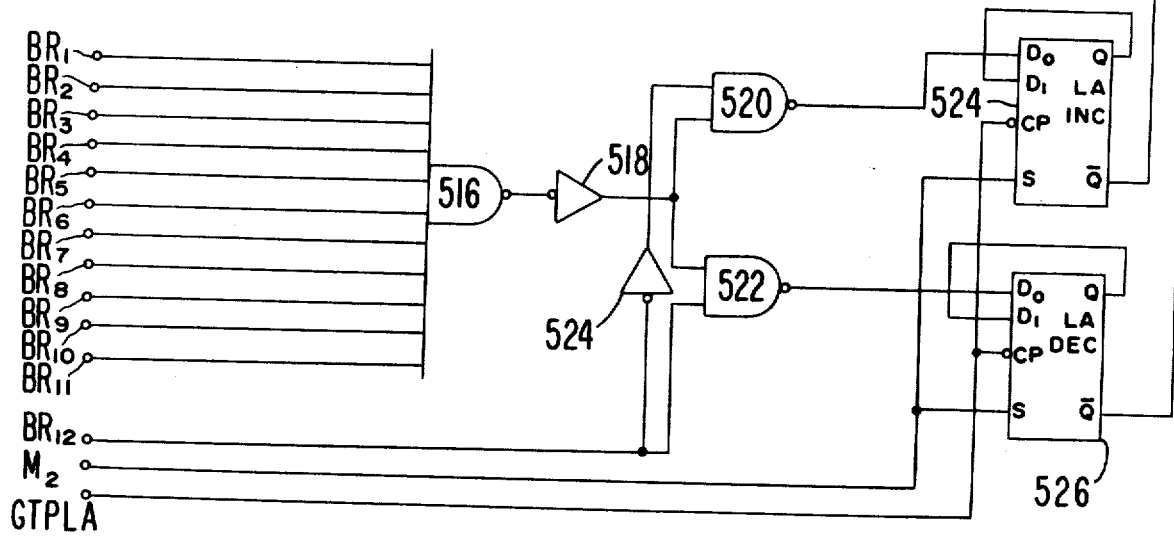
FIG. 12

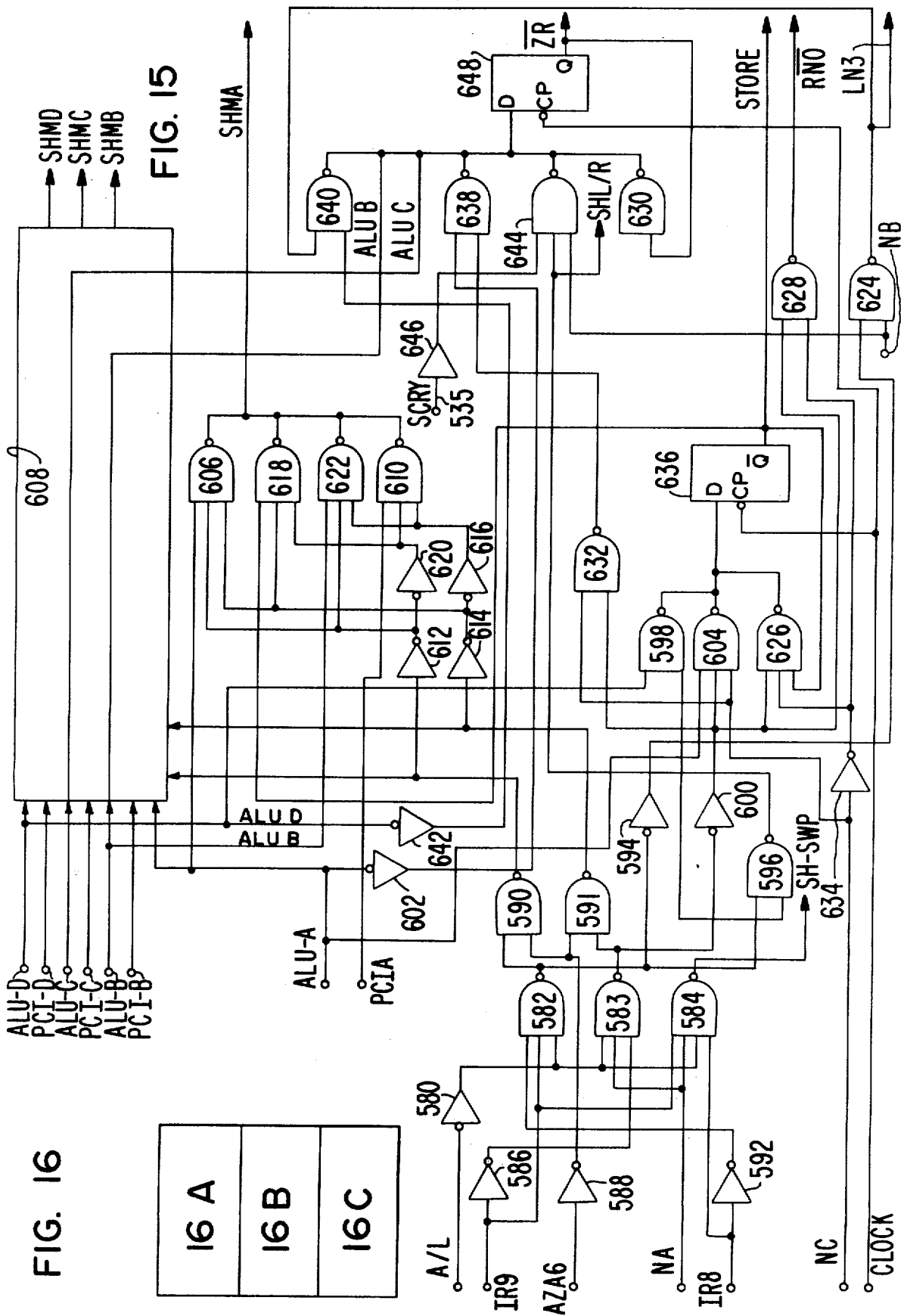

FIG. 18 READ, SYN CYCLE

MONOLITHIC MICROCOMPUTER CENTRAL PROCESSOR

BACKGROUND OF THE INVENTION

Field of the Invention

The invention relates to the field of digital computers, and in particular to an integrated circuit forming a central processing unit for a digital computer system.

Prior Art

In recent years, with the development of the so-called "minicomputer" or "microcomputer," digital computer applications have greatly increased. Minicomputers today are used in the heart of many systems since they are more flexible, can be easily programmed for a particular application, can be more readily changed or updated than in fixed logic design systems; and, most significantly, the cost of such computers is much less than the cost of large general purpose digital computers.

The development of large-scale integrated circuits (LSI) has made possible the design of minicomputer systems which are capable of performing specialized computer functions. A minicomputer may comprise the control processing portion of a larger computer, or may comprise a small computer independently in and of itself. Minicomputers, like all computer processors, can perform both arithmetic and logic functions in a bit-parallel manner under the direction of a stored program. Minicomputers, then, are inherently programmable. When placed in a system with peripheral memory circuits to provide the control program, and with input-and-output circuits, a minicomputer system is obtained which has a power of computation less than that of a large computer system. As large scale integration technology advances, however, the power of computation of minicomputer systems approaches that of these large computer systems.

The placement of a central processing unit, memory circuits, input-and-output circuits and miscellaneous support circuitry on a minimum number of integrated circuit chips inherently entails the employment of a small number of packages, which have a large number of external connectors or pins.

The typical prior art minicomputer or microprocessor devices presently available on the market are limited to operation with 8-bit bytes (or numbers), and many such devices available today are fabricated from metal-oxide-semiconductor technology (MOS). First, there is a need to expand the number of bits to thereby expand the capability of such miniature computing devices; and, there is also a concomitant need to increase the speed of operation of such devices.

SUMMARY OF THE INVENTION

A central processing unit (CPU) for a general purpose digital computer formed from a single monolithic integrated circuit chip is described. Integrated injection logic technology is employed to form the CPU of the present invention on a single semiconductor chip, thereby providing for a greater density of components on a single chip; and, thus providing a 16-bit central processing unit for a minicomputer system on a single semiconductor chip. In addition, the integrated injection logic technology provides for faster operating semiconductor devices; and, thus provides for an overall faster operating processor than those fabricated with metal-oxide-semiconductor (MOS) technology.

BRIEF DESCRIPTION OF THE DRAWINGS

FIG. 5 is a conceptual timing diagram showing the basic timing and control signals for the CPU of the present invention;

FIG. 8 is a detailed circuit diagram of a contrl PLA and gating networks for the destination multiplexer, and accumulator address logic;

FIG. 12 is a detailed circuit diagram of the source multiplexer control and ALU function control logic;

FIG. 15 is a detailed circuit diagram of the shifter logic;

FIG. 16 is a unitary diagram showing the orientation of FIGS. 16a, 16b and 16c;

FIGS. 29A through 29D illustrate a detailed layout of the programmable logic array.

DETAILED DESCRIPTION

Figure 1:
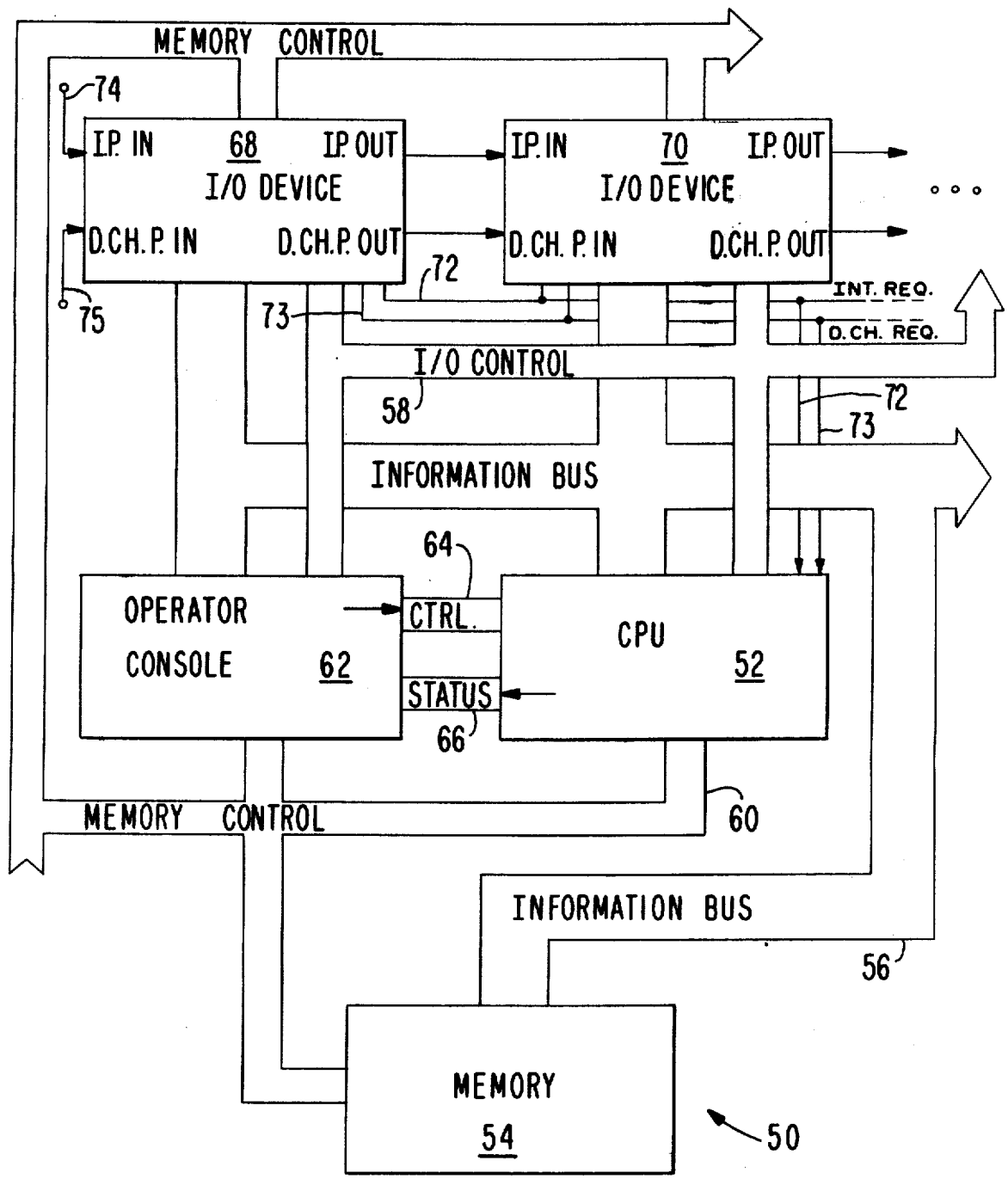
FIG. 1 is a block diagram of a minicomputer system employing the central processing unit of the present invention.

Referring now to the drawings, and in particular FIG. 1, a block diagram of a minicomputer system 50 is illustrated, which system employs the central processing unit (CPU) 52 of the present invention. A memory 54, which may typically comprise any of the readily available memory devices on the market, is coupled to the CPU 52 by means of an information bus 56, an input-/output (I/O) control bus 58, and memory control bus 60.

An operator console 62 is coupled to the CPU 52 by means of a control bus 64 and a status bus 66. The operator console 62 is also coupled to the memory control bus 60, the information bus 56, and the I/O control bus 58. The operator console 62 typically comprises a plurality of switches and light indicators to enable a user to interface with the minicomputer system 50. Input and-/or output devices may be coupled to the minicomputer system 50, which devices are generally indicated by the I/O device blocks 68 and 70.

Each I/O device, such as devices 68, 70 . . . , are adapted to interrupt the operation of the CPU 52 by means of an interrupt request (INT. REQ.) signal supplied on a line 72. Direct memory access may be effected between an I/O device and the memory 54 by a data channel request (D. CH. REQ.) signal on a line 73. There are other ways of interrupting operation of the CPU. For example, a HALT signal may be supplied to the CPU 52 from the console 62. In operation, the CPU periodically samples the Halt signal line from the console, the Data Channel Request signal line 73, and the Interrupt Request signal line 72 before each new instruction is executed. If, for example, an Interrupt Request has been detected, then the CPU goes through several microcycles to prepare for the interruption. In particular, the contents of the program counter, which contains the next memory address for fetching the next instruction code to be executed, is stored in address zero of the memory. The CPU then addresses memory to fetch the interrupt service routine.

The I/O devices 68, 70 . . . may be coupled in a priority chain such that the first device (herein device 68) is the first I/O device which can interrupt the CPU operation. All subsequent devices (herein device 70) will be serviced by the CPU 52 following service of the priority I/O device (herein device 68). The priority chain of the I/O devices is effected by coupling an "interrupt priority in" (I. P. IN) input terminal of the first (highest priority) I/O device to a fixed potential, and coupling an "interrupt priority out" (I.P. OUT) output terminal of this same device to the I.P. IN input terminal of the next I/O device in the priority chain. In FIG. 1, the I. P. IN input terminal of I/O device 68 is coupled to a fixed potential by means of a line 74. The I. P. OUT terminal of the device 68 is coupled to the I. P. IN terminal of the device 70. The DATA Channel Request signal lines are coupled in a similar manner. A Data Channel Priority In (D. CH.P. IN) input terminal of the device 68 is coupled to a fixed potential by means of a line 75. A Data Channel Priority Out (D. CH. P. OUT) terminal of the device 68 is coupled to the D. CH. P. IN terminal of the device 70.

The program, which comprises a sequence of instruction codes for the CPU 52 to perform various operation, is stored in the memory 54. These instructions are relayed to the CPU 52 by means of the information bus 56 in response to signals supplied on the memory control bus 60 from the CPU 52. Likewise data generated by the CPU 52, such as for example the result of a computation, may also be stored in the memory 54 by transferring such result data along the information bus 56 to the memory in response to additional control signals supplied on the control bus 60. The I/O devices 68, 70 . . . are controlled by the CPU 52 by means of signals supplied on the I/O control bus 58.

Figure 2:
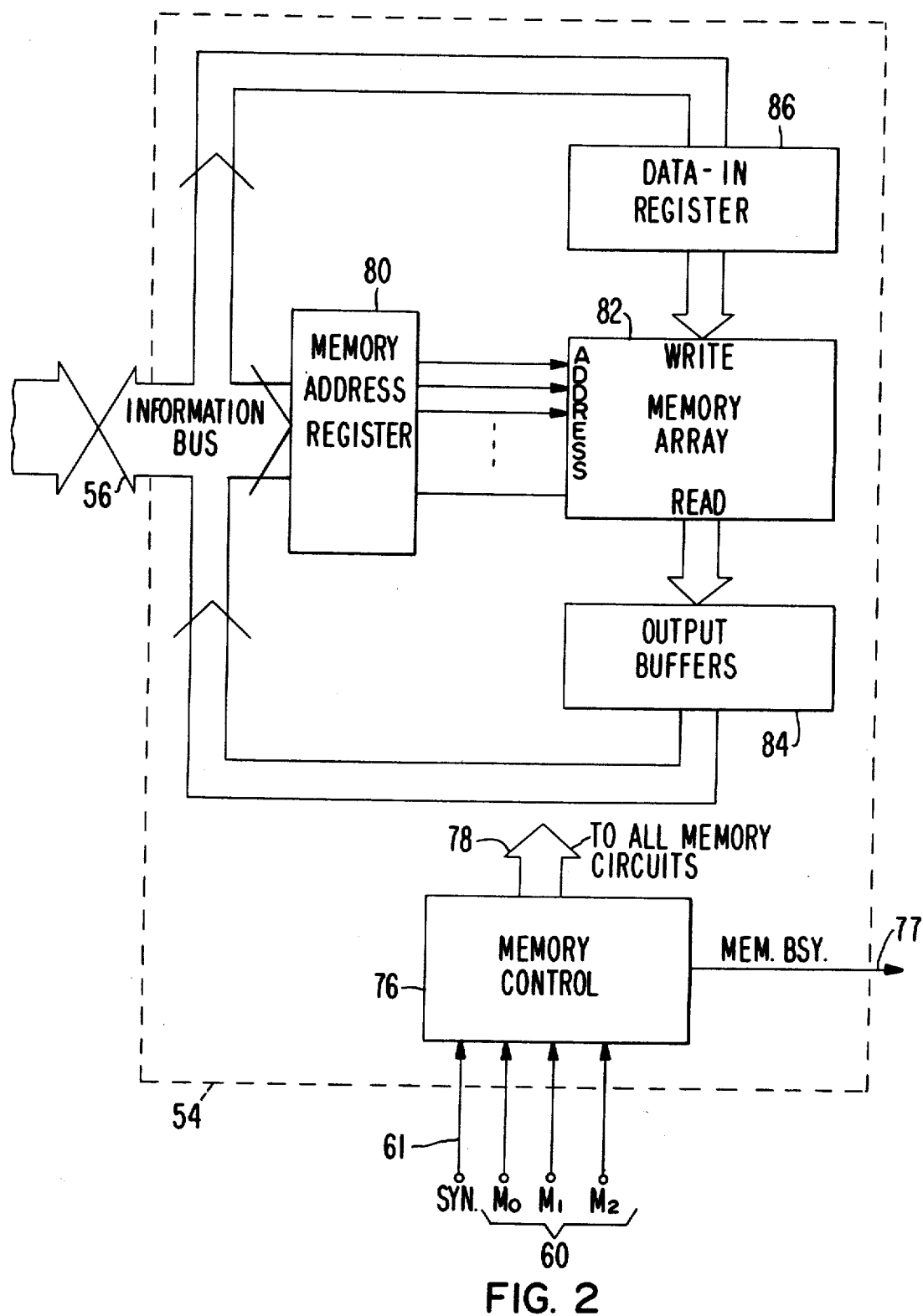
FIG. 2 is a block diagram of a typical memory which may be used with the CPU of the present invention.

Referring now to FIG. 2, a generalized block diagram of a typical memory 54 is illustrated. The memory control bus 60, which in this embodiment comprises three signal lines entitled $M_0$, $M_1$ and $M_2$, is coupled to the input of a memory control circuit 76. Outputs of the memory control circuit 76 are supplied on lines 78, which lines are coupled to all of the individual memory circuits and are not identified in detail herein for simplification of the drawings. A control signal entitled SYN is supplied on a line 61 to the memory control 76. The SYN signal is a syncronization signal to control the operation of the memory 54 in step with the operation of the CPU 52. The CPU 52 operation is likewise syncronized with the operation of the memory 54 by a signal supplied on a line 77, which is designated herein as Memory Busy. The CPU periodically generates the SYN signal, and the Memory Busy signal is generated in the memory in response to the SYN signal. In addition, the Memory Busy signal can also be generated by the memory when the memory is busy and not just in response to the SYN signal.

The information bus 56 is coupled to the output of a memory address register (MAR) 80, which temporarily stores the memory address. The MAR 80 has outputs coupled to the address input of a memory array 82. The information bus 56 is also coupled to output terminals of an output buffer 84. Input terminals of the buffer 84 are coupled to "read" output terminals of the memory array 82. The information bus 56 is also coupled to input terminals of a data-in register 86. Output terminals of the data-in register 86 are coupled to the "write" input terminals of the memory array 82.

Figure 3:
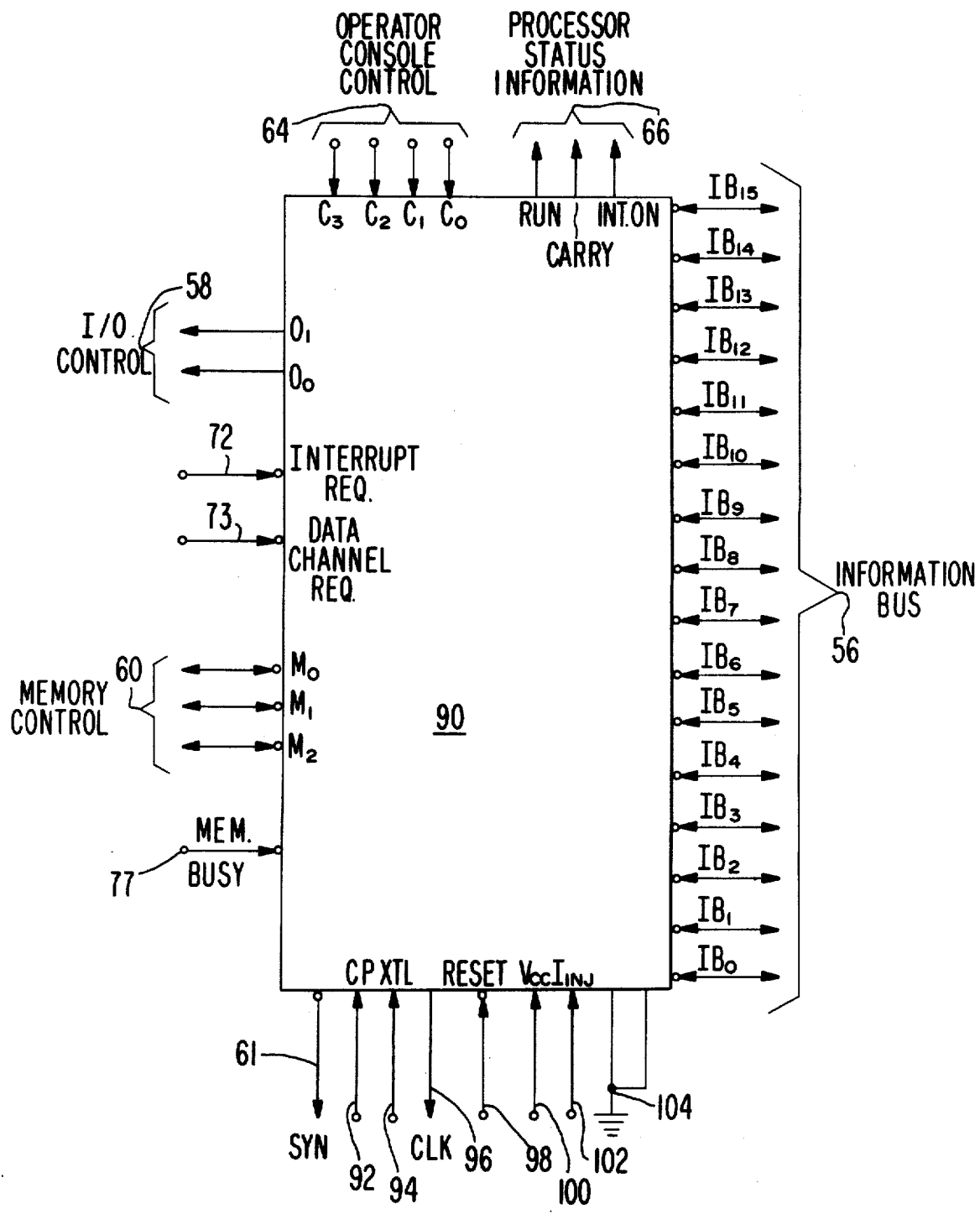
FIG. 3 is a block diagram of a package housing the single semiconductor chip minicomputer CPU of the present invention showing the connector pin layout therefor.

Referring now to FIG. 3 a plan view of a pack? 90, which houses a single semiconductor chip forming the CPU 52, is illustrated. In particular, the diagram in FIG. 3 illustrates the layout of pin connectors to the package 90, which pin connections provide couplings to the CPU for external components of the minicomputer system 50. The information bus 56 is illustrated as being broken down into 16 pin connectors for transmitting the 16-bits, either to or from the CPU. Each of these connectors is identified as $IB_0$ through $IB_{15}$, which are the designations used herein refer to the individual data bits on the information bus 56 of the minicomputer system. The I/O control bus 58 comprises two signal lines identified as $O_1$ and $O_0$. The memory control bus 60 comprises three lines identified as $M_0$ through $M_2$. A lowlevel output signal on the $M_0$ signal line effects the reading of data from the memory array; a lowlevel signal on the $M_1$ signal line effects the writing of data into the memory array; and, a lowlevel signal on the $M_2$ line indicates that a memory address is being supplied to the memory array 82. The Memory Busy line 77 is provided as an input to the CPU 52, and a low-level signal supplied on this line indicates that the memory is presently performing an operation.

In addition to the signal lines and buses as identified hereinabove, an external clock signal (CP) is supplied on a line 92, and a line 94 is provided for connection to crystal (XTL) for an optional form of clock oscillator. For example, a crystal can be connected between the CP signal line 92 and the XTL line 94, which in conjunction with amplifiers in the CPU itself forms an oscillator to generate the clock signal for the CPU. In addition, the clock signal generated within the CPU 52 is supplied on a line 96 (CLK. OUT), which may be used to synchronize other operations of the minicomputer system 50. A Reset signal is supplied on a line 98, which when operated resets some of the registers within the CPU 52, and places the CPU in a "wait" status. Voltage is supplied on a line 100, and a current source Iinj is coupled to a line 102. The illustrated embodiment employs a type of integrated transistor circuitry referred to as "integrated injection logic." This type of logic requires a source of regulated current for proper operation. Accordingly, the line 102 is coupled to a current source of a power supply external to the CPU 52 to provide this current. Ground potential is provided to the CPU 52 at a terminal 104, which in this embodiment is coupled to two separate connector pins of the CPU as shown.

Figure 4A:
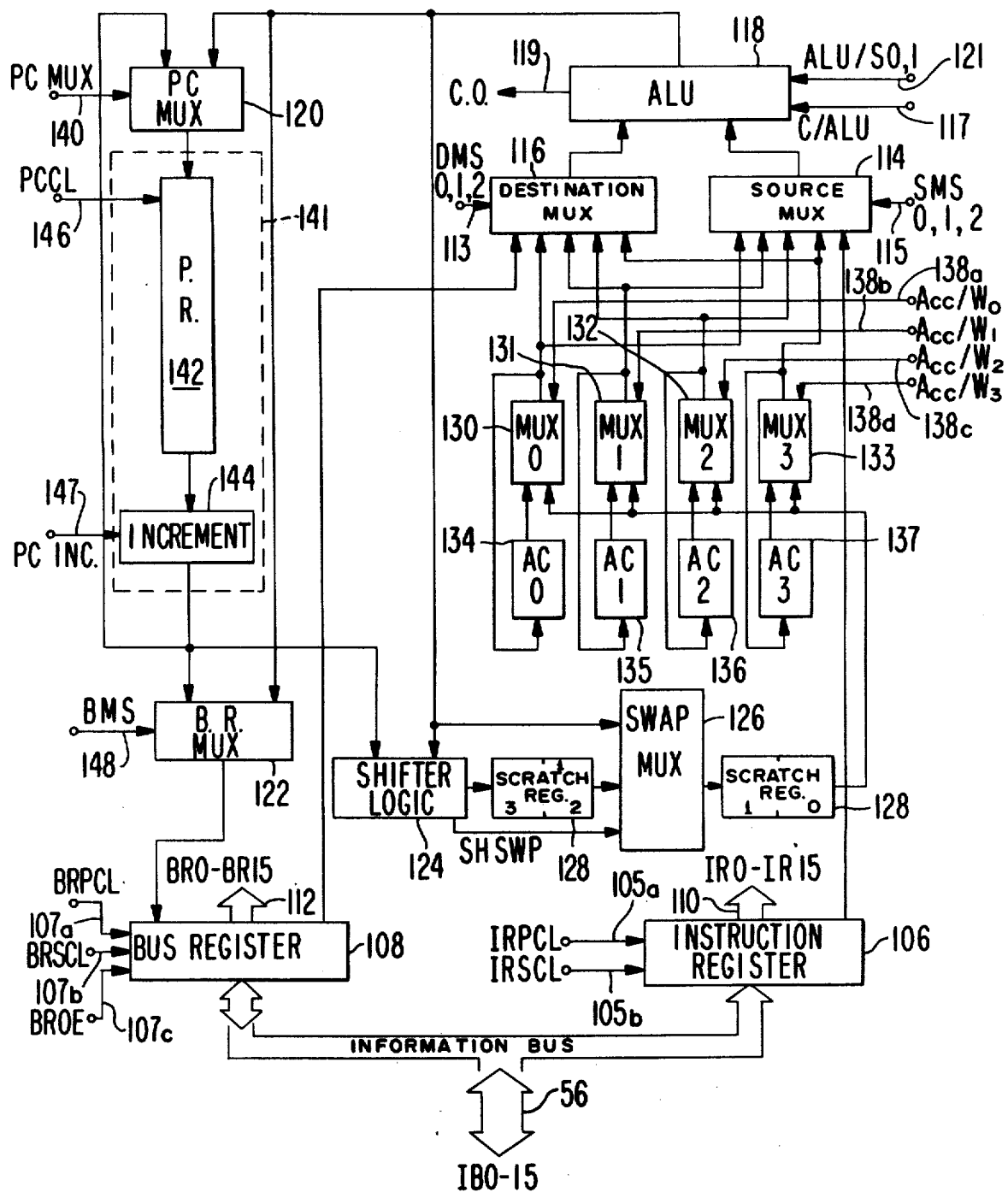
FIG. 4a is a block diagram of data path logic of the CPU.
Figure 4B:
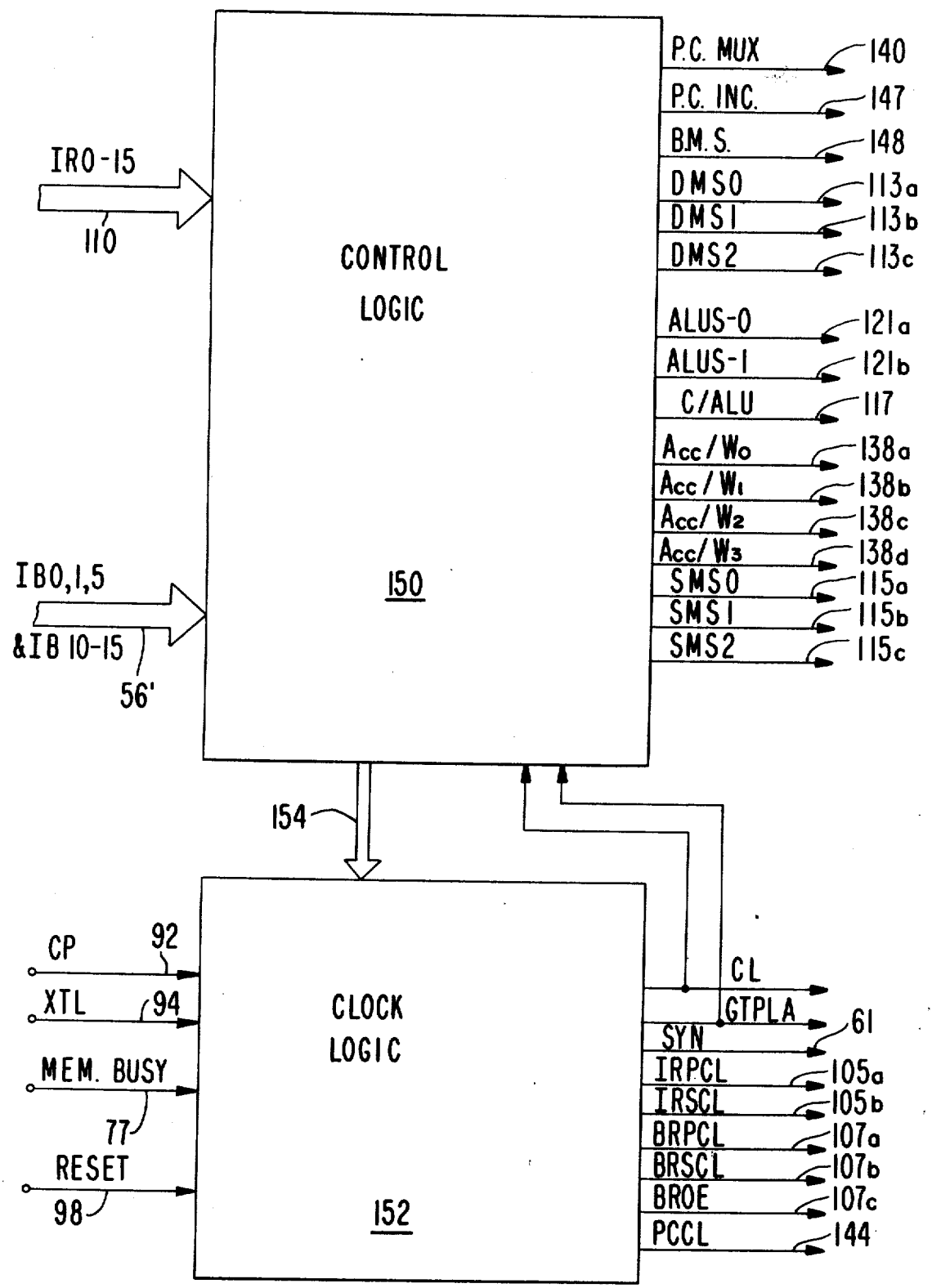
FIG. 4b is a block diagram of the control and clock circuitry for the CPU.

The CPU 52 of the present invention is conceptually divided into Data Path circuitry, which is illustrated in FIG. 4a, and Control and Clock Logic circuitry which are generally represented by the block diagram illustrated in FIG. 4b. The CPU 52 operates with only four bits (hereinafter "nibble") at a time of the 16-bit words used in the minicomputer system. However, the CPU appears to external system components to operate with the entire 16-bit word. Accordingly, the Data Path Logic Circuitry is broken up into four slices each of which is capable of handling four bits.

With reference to the Data Path Logic, and in particular to FIG. 4a, the information bus 56 is coupled to input terminals of an instruction register 106 and a bus register 108. The output of the instruction register 106 (IR00 – IR15) is supplied on a bus 110. In a similar manner, the output of the bus register 108 (BR0 – BR15) is supplied on a bus 112. Since the buses 110 and 112 are coupled to numerous circuits within the CPU 52, the individual connections of these buses to the various blocks forming the block diagrams in FIGS. 4a and 4b are not illustrated for simplification of the drawings. The operation of the instruction register 106 is controlled by two clock signals supplied on lines 105a and 105b, which signals are identified herein as IRPCL (Instruction Register Parallel Clock) and IRSCL (Instruction Register Serial Clock), respectively. The operation of the bus register 108 is controlled by three clock signals supplied on lines 107a, 107b, and 107c, which signals are identified herein as BRPCL (Bus Register Parallel Clock), BRSCL (Bus Register Serial Clock) and BROE (Bus Register Output Enable), respectively. The four least significant bit positions of the instruction register 106 (i.e., the least significant nibble) are supplied to inputs of a source multiplexer 114. The operation of the source multiplexer 114 is controlled by three Source Multiplexer Select signals designated herein as SMS0, S1 and S2, which are supplied on lines 115. Similarly, the least significant nibble of the bus register 108 is supplied to inputs of a destination multiplexer 116. In a similar manner, operation of the destination multiplexer 116 is controlled by three Destination Multiplexer Select signals designated herein as DMS0, S1, and S2, which signals are supplied on lines 113. It is the function of the multiplexers 114 and 116 to direct a selected set of four inputs to four outputs thereof.

The output of the source multiplexer 114 is supplied as a first operand input to a four-bit arithmetic logic unit (ALU) 118, and the output of the destination multiplexer 116 is supplied as the second operand input to the ALU. The operation of the ALU 118 is controlled by three signals. These signals are the ALU Select Signals (ALUS0 and S1) supplied on lines 121, and the Carry ALU signal supplied on line 117. The output of the ALU 118 is supplied to a program counter multiplexer 120, a bus register multiplexer 122, shifter logic 124, and to one side of a swap multiplexer 126. The output of the shifter logic 124 is coupled to the most significant nibble input terminals of a scratch register 128, and the output of the next most significant nibble of the scratch 128 is coupled to the second set of inputs of the swap multiplexer 126. An output of the shifter logic 124 is supplied to the swap multiplexer 126 to indicate whether the 16-bit word being supplied parallel by nibble and serially by word is to be shifted or swapped. Thus, this signal is designated herein as SH SWP, or "Shift or Swap."

The output of swap multiplexer 126 is coupled to the next to lowest order nibble of the scratch register 128. The least significant nibble of the scratch register 128 is coupled to the inputs of four 4-bit multiplexers 130 through 133. The output of the multiplexer 130 is coupled to an input of the source multiplexer 114 and to the input of the destination multiplexer 116. Also, the outputs of the multiplexer 130 are coupled back to inputs of a 16 bit accumulator 134. The outputs of the multiplexers 131 through 133 are similarly coupled to the inputs of the source multiplexer 114 and the destination multiplexer 116, and to inputs of accumulators 135 through 137, respectively. The operation of the multiplexers 130 through 133 are controlled by four Accumulator Write signals designated herein ACC/W0, W1, W2 and W3 which signals are supplied on lines 138a through 138d, respectively.

The program counter multiplexer 120 is controlled by a P. C. Multiplexer Select signal (PC MUX), which is supplied on a line 140. The output of the multiplexer 120 is supplied as an input to a program counter 141 of the CPU 52. The program counter 141 in this embodiment comprises a program register (P.R) 142 and an increment circuit 144. The operation of the program register 142 is controlled by a program counter clock signal (PCCL) supplied on a line 146. The output of the program register 142 is supplied as input to the increment circuit 144, which circuit operation is controlled by a program counter increment signal (PC INC) supplied on a line 147.

The output of the increment circuit 144 is supplied to a second input of the bus register multiplexer 122, to a second input of the program counter multiplexer 120, and to a second input of the shifter logic 124. The operation of the bus register multiplexer 122 is controlled by a Bus Multiplexer Select signal designated herein as BMS, which is supplied on a line 148. The output of the bus register multiplexer 122 is coupled to the most significant nibble of the bus register 108. Thus, the address provided by the program counter 141 is supplied to the information bus 56 for transmittal to the memory. Note that by means of multiplexer 122, a memory address or data may also be supplied from the ALU 118.

Referring now to FIG. 4b, a generalized block diagram of control logic 150 and clock logic 152 is illustrated. The output of the instruction register 110, (i. e., IR0 through IR15) is provided as an input to the control logic 150. In addition, a portion of the output from the information bus 56 (i.e., IB0, 1, 5, and 10–15) is also provided as an input to the control logic 150. However, since only a portion of the information bus 56 is provided as the input to the control logic 150, this bus is represented by the reference numeral 56' in FIG. 4b. Output terminals of the control logic 150 are coupled to input terminals of the clock logic 152 by means of a bus 154.

The clock (CP) and crystal (XTL) inputs provided on the lines 92 and 94 are coupled as inputs to the clock logic 152. In addition, the Memory Busy signal, which is transmitted on the line 77, is provided as an additional input to the clock logic 152. The Reset signal 98 is also provided to an input of the clock logic 152. The multiplicity of outputs from the control logic 150 and the clock logic 152 have been briefly referred to hereinabove, and will be amplified in greater detail hereinbelow in conjunction with the detailed description of the remaining figures.

The CPU 52 processes data internally through the ALU in four sequential 4-bit nibbles. Referring now to FIG. 5, a conceptual timing diagram of a portion of the signals referred to hereinabove is illustrated. Waveform 156 illustrates the basic clock signal generated by the oscillator which drives the CPU 52. Waveform 158 illustrates the NCCL clock signal produced by the clock logic 152, within the CPU 52.

Waveform 160 illustrates the timing relationship for each nibble of the 16-bit word. Each positive part of waveform 160 encompasses four nibbles. During each of these positive parts of this waveform, an operation is being performed by the CPU such as, for example, an arithmetic operation. Waveform 162 represents operation of the PLA, which waveform simply shows the time slots at which the PLA propagates output signals. Waveform 164 illustrates the GTPLA signal which abbreviates "Go to PLA". This clock signal is active just prior to the PLA time slots, and the PLA time slots occur just prior to the positive parts of the Nibble signal. This timing relationship allows sufficient time for an operation to be set up prior to execution of that operation. Waveform 166 represents the SYN signal, which is provided by the clock logic 152 to synchronize operation of memory and I/O devices used with the CPU of the present invention. Waveform 168 illustrates the Memory Busy signal supplied by the memory control circuit 76 (FIG. 2), which signal indicates that the memory is accessing data as described above.

Note that during the time when the SYN signal (Waveform 166) is at a low level and the PLA time period (waveform 162) is also at a low level, the NCCL clock signal changes to the higher frequency of the oscillator signal (waveform 156). This change in clock frequency is made to avoid undue delay in recognizing an input to the CPU.

Waveform 170 illustrates the instruction register parallel enable signal (IRPE), which is supplied as an input to the instruction register 106 to control operation thereof. Waveform 172 illustrates the Instruction Register parallel clock signal (IRPCL), which also controls operation of the instruction register 106. Waveform 174 illustrates the Bus Register Output Enable signal (BROE), which is supplied to the bus register 108 to enable the outputs thereof to drive the Information Bus 56. Waveform 176 illustrates the BRPE signal which is supplied as a control input to the bus register 108, to select parallel loading of the bus register. Waveform 178 illustrates the Bus Register Parallel Clock signal (BRPCL) also supplied to a control input of the bus register 108.

Waveforms 180 through 182 illustrate the memory control signals, $M_0$ through $M_2$, which signals select the read, write and load memory address register operations, respectively, of the memory 54.

The time period divisions in FIG. 5 between $t_0$ and $t_1$, $t_1$ and $t_2$, and $t_2$ and $t_3$ represent microcycles of operation of an exemplary instruction for the CPU 52. Waveforms 184, 185 and 186 illustrate three particular states of operation of the CPU during the three illustrated exemplary microcycles. These states are identified herein as $S_{22}$, $XEQ_1$ (execute 1) and $XEQ_2$ (execute 2). It is noted that these three states of operation are by way of illustration of a "store accumulator" operation only, and not of limitation since there are other operations performed by the CPU.

To more clearly illustrate this point, all instructions for the CPU begin with the $S_{22}$ state. Then, for some instructions, such as that illustrated in FIG. 5, the CPU is placed in the $XEQ_1$ state. For still other instructions, the CPU is subsequently placed in the $XEQ_2$ state. In particular, the instruction register was loaded prior to time $t_0$, and between $t_0$ and $t_1$ execution of this instruction begins during the $S_{22}$ state. During PLA time of state $S_{22}$, the program logic array (PLA) determines the next microcycle to be performed based on the particular instruction code stored in the instruction register, in conjunction with additional inputs supplied to the PLA (to be explained further hereinbelow).

Between times $t_1$ and $t_2$, the $XEQ_1$ state signal is a high level to implement this state or microcycle of operation. A data path operation is performed during the Nibble time (waveform 160 at a high level). Next, a bus operation is performed as exemplified by the BROE signal (waveform 174) at a high level. Subsequently, a set up for the next microcycle is effected as exemplified by the GTPLA signal going to a high level followed by the PLA time slot. This same sequence is repeated during the $XEQ_2$ microcycle.

A description of the operation of the CPU 52 of the present invention is provided hereinbelow with reference to both FIGS. 4a and 4. First, the program register 142 addresses the memory to retrieve an instruction code. This instruction code is provided on the information bus 56 to the input of the instruction register 106 and stored therein. Assume, for example, that the instruction code loaded into the instruction register 106 is a "load accumulator" instruction. A part of this instruction code is an index to a memory address, which retrieves data to be loaded into an accumulator. In particular, the memory index portion of the instruction code loaded into the instruction register 106 is provided as an input to the source multiplexer 114 and subsequently to an input of the ALU 118. An example would be that a second operand is provided to the ALU 118 from a base register such as, for example, multiplexer 133. These operands are added by the ALU 118 and provided at the output thereof. This output from the ALU 118 constitutes the memory address from which data are to be retrieved, which address is supplied to the bus register multiplexer 122 and subsequently to the bus register 108. At this point the memory address is provided on the information bus 56 and supplied to the memory. Data retrieved from the memory are provided on the information bus 56 and loaded into the bus register 108. During the next cycle of operation, data loaded into the bus register 108 are provided as an input to the destination multiplexer 116 and to an operand input of the ALU 118. In this example, the data are combined with a zero from the source multiplexer 114. The sum or result of this operation is provided at the output of the ALU 118 and supplied to an input of the shifter 124. Next, this result is loaded into the scratch register 128.

During this same cycle of operation, the contents of the program register 142 is incremented by the increment circuit 144 and supplied to an input of the bus register multiplexer 122. In addition, this incremented program address is provided back to an input of the program counter multiplexer 120 in preparation for loading this address back into the program register 142. The output of the bus register multiplexer 122 is supplied to the bus register 108 and to the memory by means of the information bus 56 in preparation for fetching the next sequential instruction from memory. Also, during this cycle, the new instruction is loaded into the instruction register 106. Thus, there is an overlap of operations performed during one given microcycle, which avoids any undue time delay of the CPU operation.

During the next microcycle of operation, the contents which were loaded into the scratch register 128 are now transferred to a selected multiplexer (i.e., 130 through 133). During this same microcycle, the data loaded into the selected multiplexer are also updated into the corresponding accumulator (i.e., 134 through 137, respectively). It is noted that during this microcycle of loading the multiplexer and accumulator, the first microcycle of operation of the next instruction code stored in the instruction register 106 is also being executed.

Figure 6:
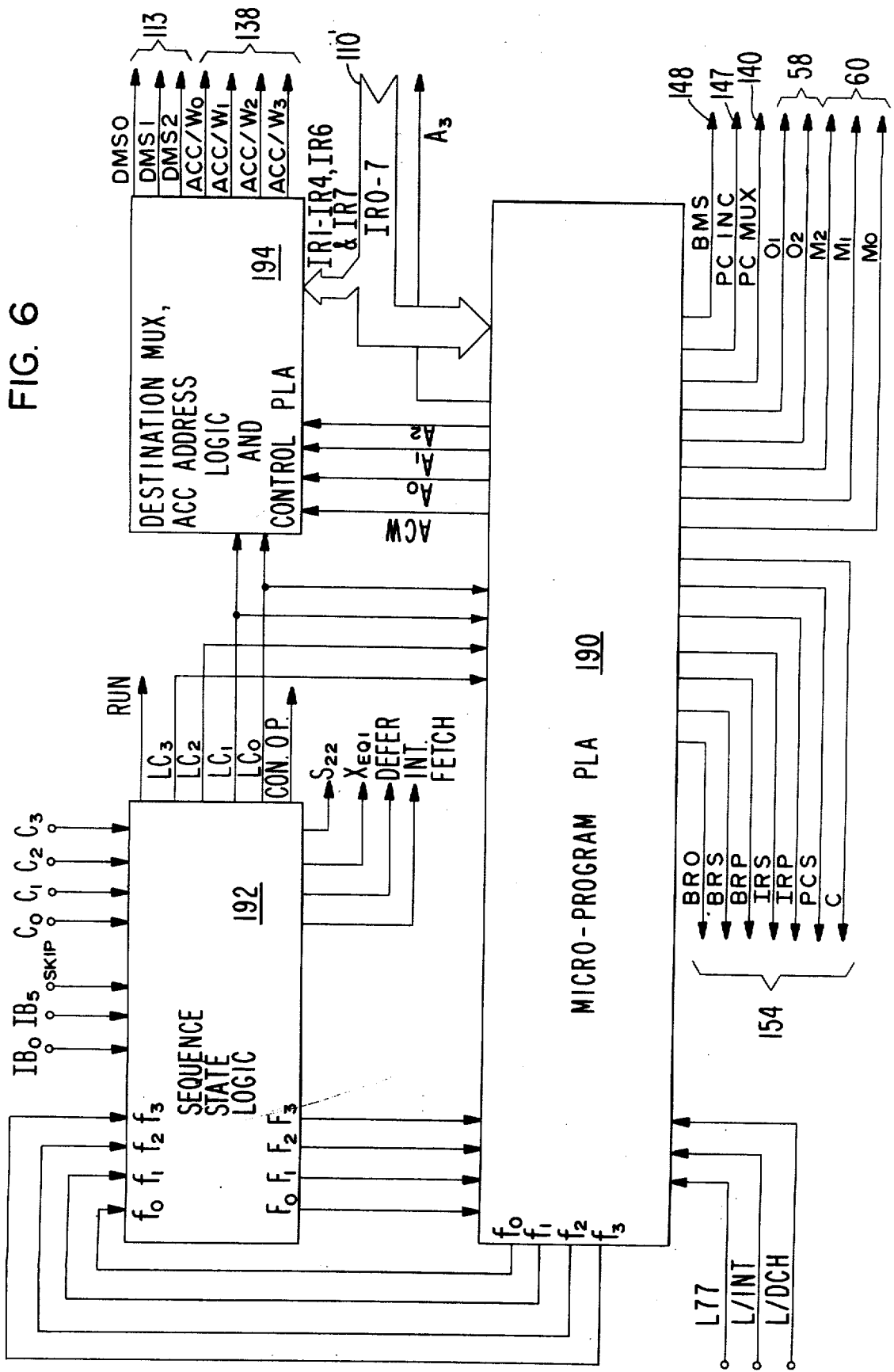
FIG. 6 is a block diagram of the sequence state logic, microprogram PLA, and the destination multiplexer, accumulator address logic including a control PLA.

Referring to FIG. 6, a block diagram of a microprogramable logic array (PLA) 190, a sequence state logic 192, and a destination multiplexer, accumulator address logic and control PLA 194 is illustrated. A portion of the output bus 110 from the instruction register 106, which is designated herein as 110', is provided as an input to the PLA 190 and a portion thereof is also provided as an input to the control PLA 194. Four outputs, designated herein as $f_0$ through $f_3$ from the PLA 190 are coupled back as inputs to the sequence state logic 192. Further, four outputs from the sequence state logic 192, which are designated herein as $F_0$ through $F_3$ are coupled as inputs to the PLA 190.

The combination of the PLA 190 and the sequence state logic 192 comprises a microprogram control, which decodes program instruction codes stored in the instruction register, and paces all the system timing and data transfers for program execution. In particular, the sequence state logic 192 includes a state register and the PLA 190 comprises essentially a memory-like structure for performing logic functions.

Variables are used as address bits to the PLA 190 and the output bits retrieved in response to the address bits comprise a multiplicity of signals which control the operation of the CPU. The state register within the sequence state logic 192 stores a portion of the address bits supplied to the PLA 190 from a portion of the output bits previously retrieved from the PLA, which portion is referred to herein as the "next" state.

Each unique combination of address bits supplied to the PLA input in combination with the output of the sequence state logic 192 ($F_0$ through $F_3$) will effect a retrieval from the PLA 190 of a unique combination of output signals which are supplied at the outputs of the microprogram PLA 190. The output signals supplied at outputs $f_0$ through $f_3$ modify the state register within the sequence state logic 192 to reflect the next state of the sequential control circuit. Thus, for a given input signal condition supplied on the bus 110' from the instruction register 106 the output signals on the lines $F_0$ through $F_3$ will change depending upon the next state indicated by the state register within the sequence state logic 192. Accordingly, the sequential control circuit formed by logic 192 and PLA 190 respond to input stimuli in a manner which is determined by the previous state of the responses from the sequential control circuit as determined by the current state in the state register within the state logic 192. The design of sequential control circuits is well documented in technical publications available to those skilled in the art. One such text is "Logic Design of Digital Computers" by Montgomery Phister and published by John Wiley, 1958.

Figure 29A:
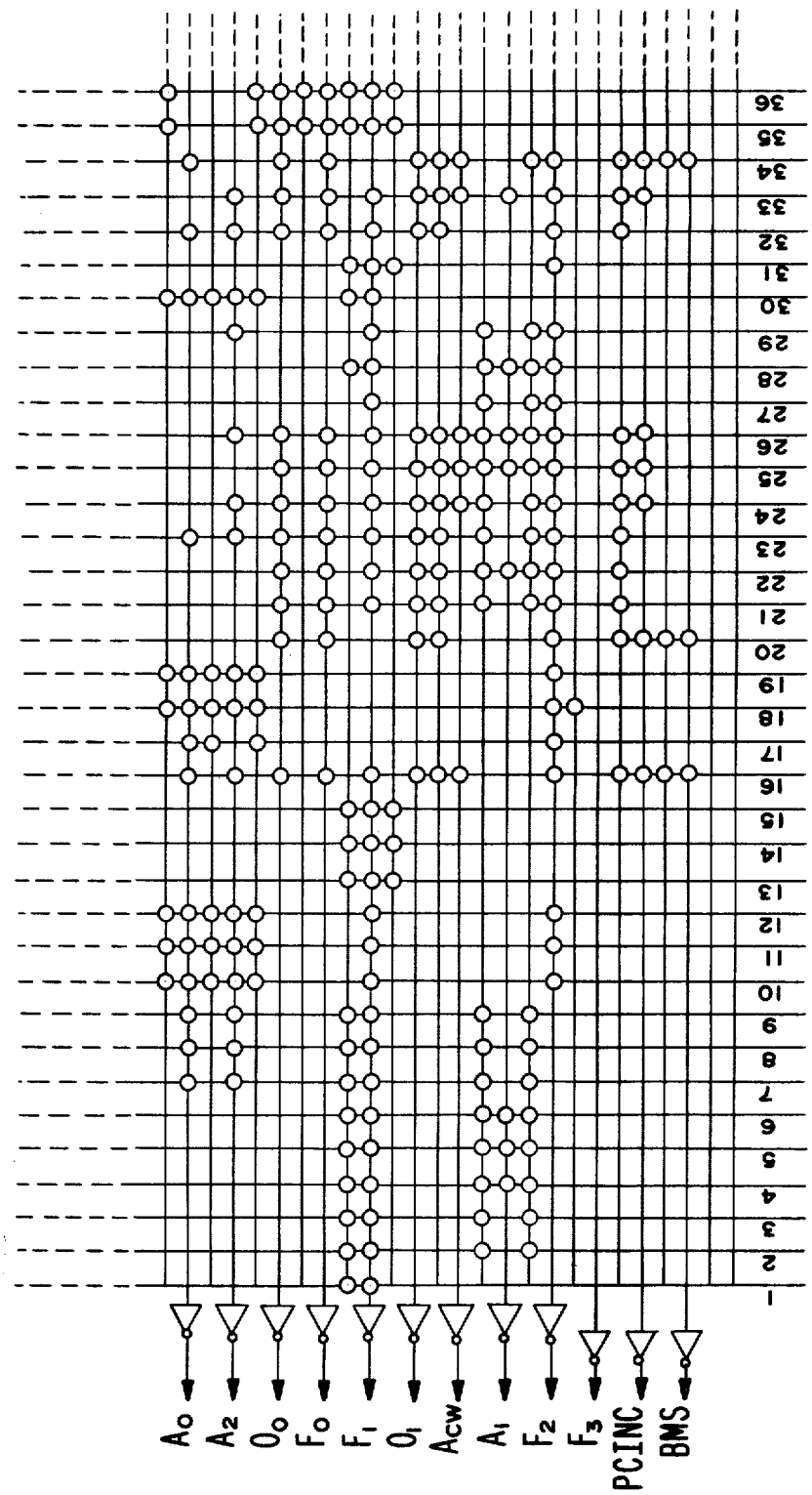
Figure 29B:
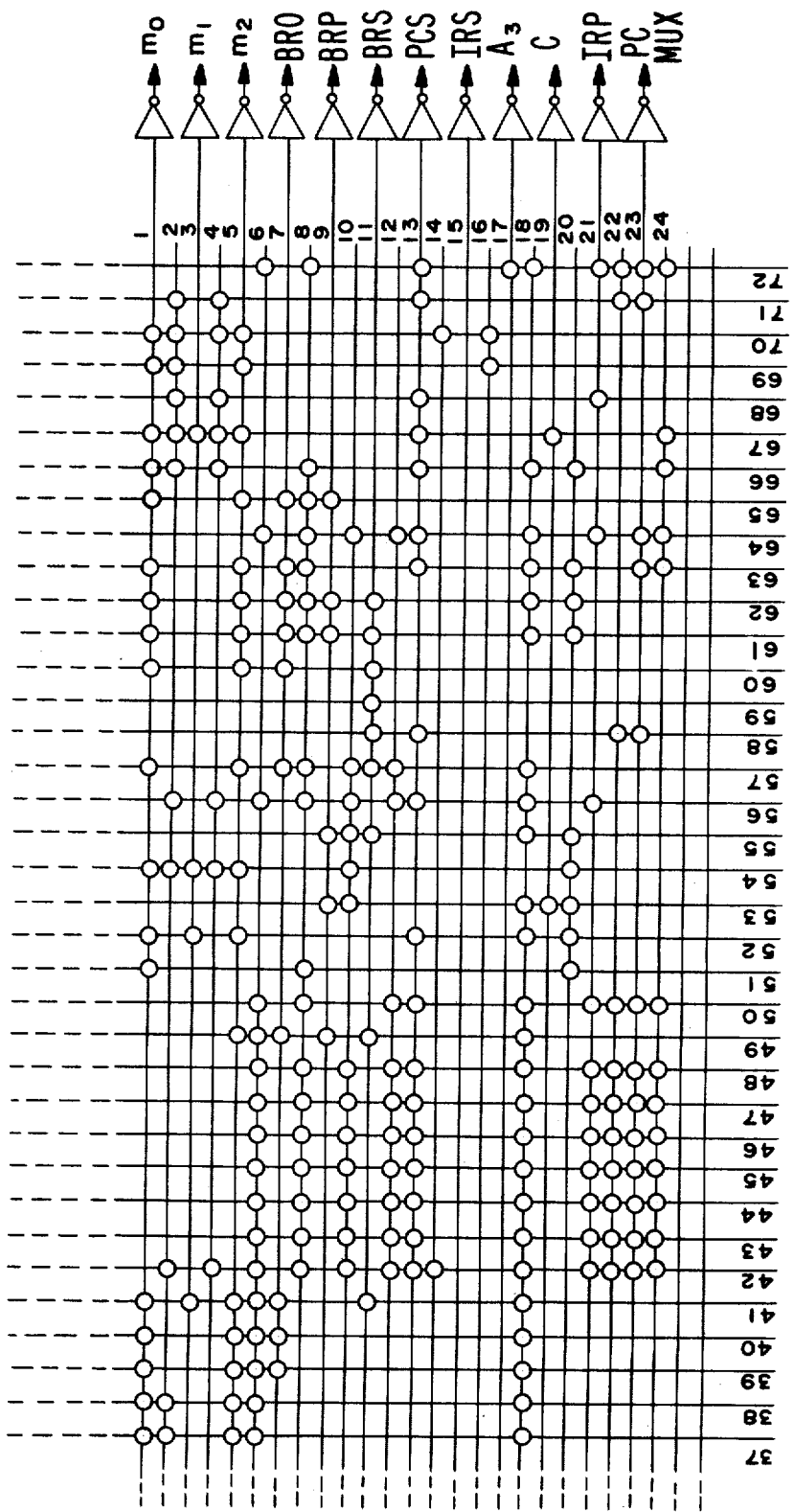
Figure 29:
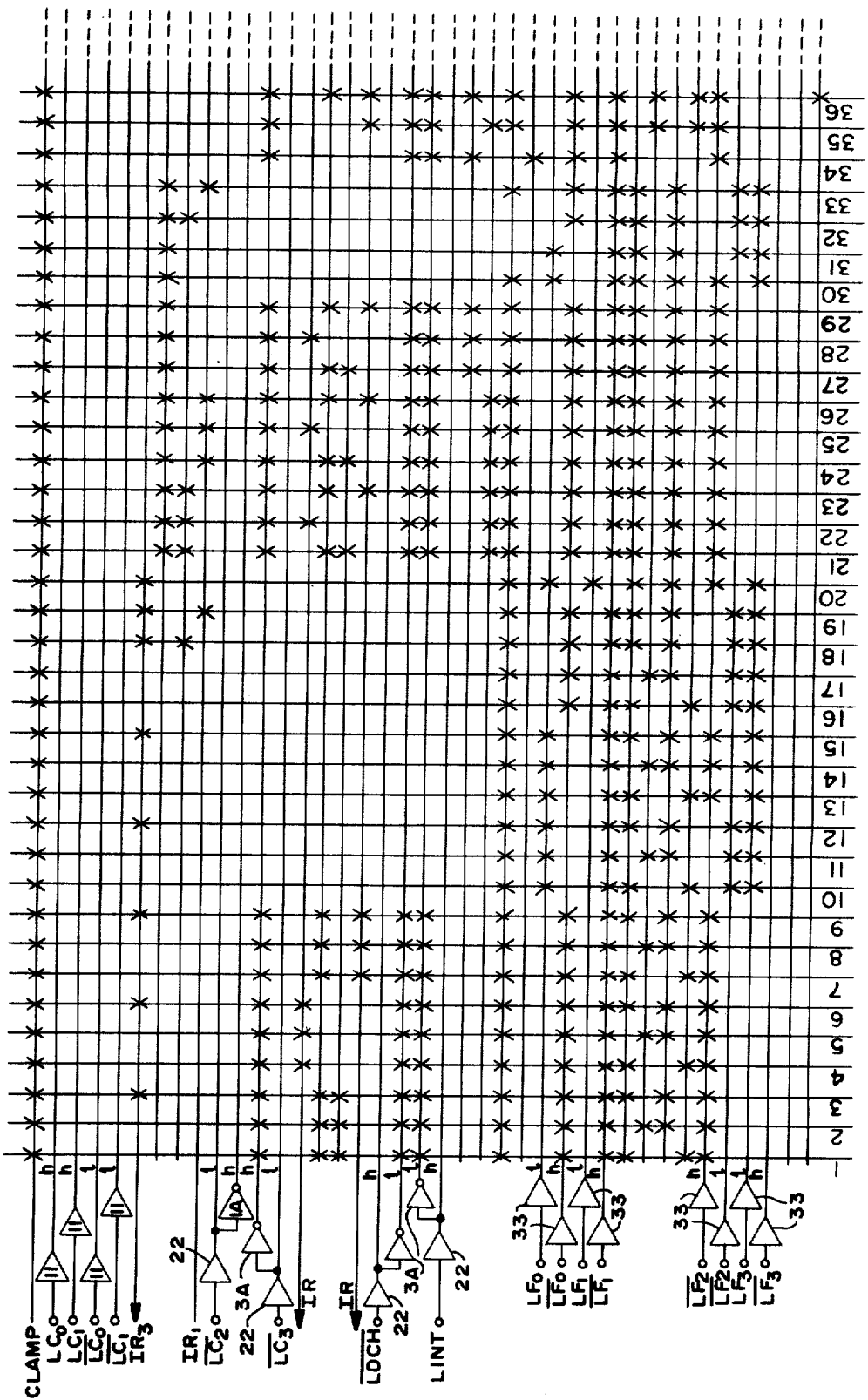
FIG. 29 is a unitary diagram showing the orientation of FIGS. 29A through 29D.
Figure 29D:
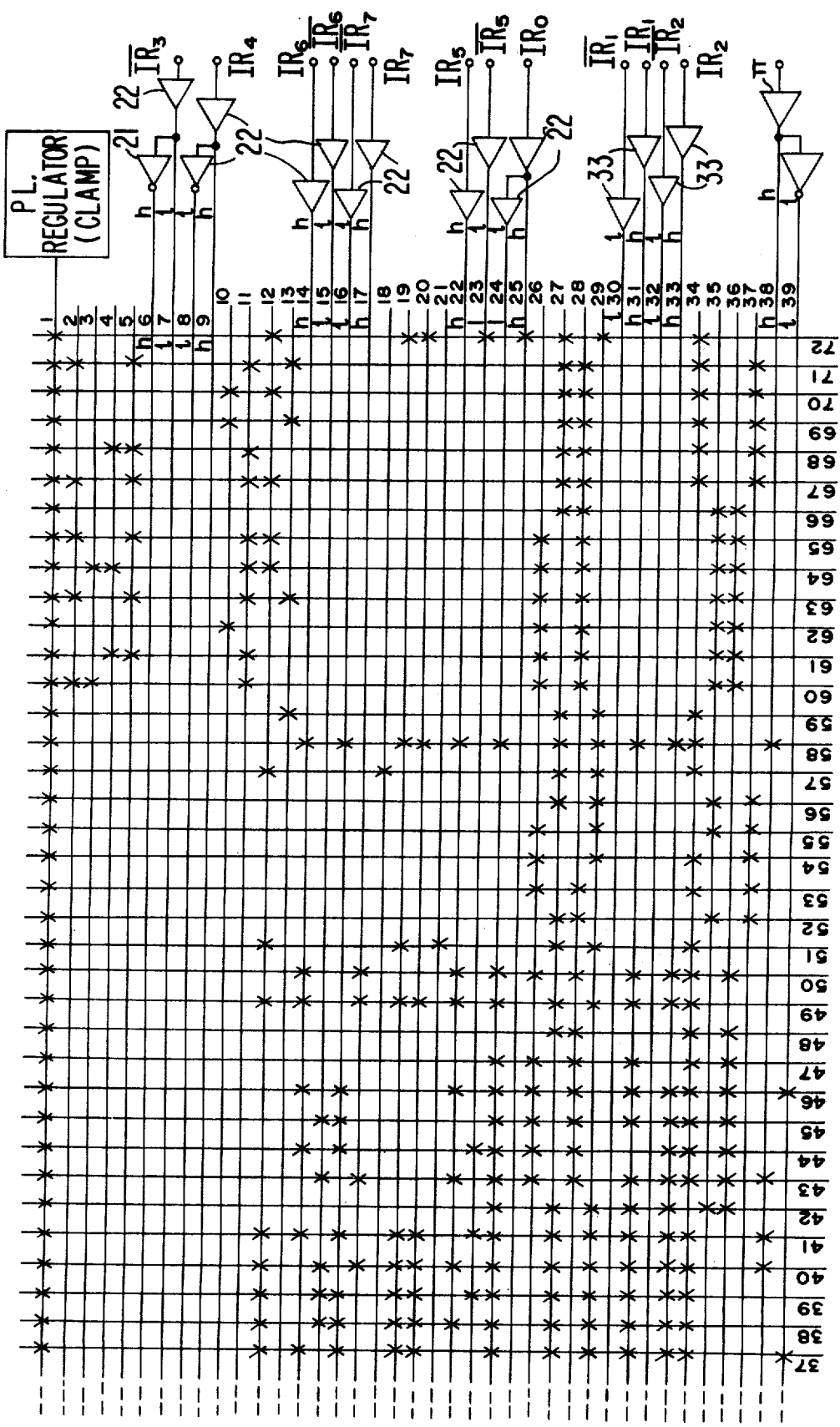

The PLA 190 layout, which comprises a preferred microprogram embodiment for this invention, is illustrated in FIGS. 29A-29D which are related as illustrated in FIG. 29. The signals are identified by name and are interconnected by AND functions (X's) and OR functions (O's).

Logic 194 responds to input signals supplied from the sequence state logic 192, the PLA 190 and the instruction register 106 to derive the control signals $DMS_0$ through $DMS_2$, and the control signals $Acc/W_0$ through $Acc/W_3$. These signals control the operation of the multiplexer 116 and the accumulators 130 through 133 (FIG. 4a), respectively.

The output signals from the control logic 150 supplied on the bus 154 (FIG. 4b) are indicated as outputs from the microprogram PLA 190. In particular, these signals comprise the following:

BRO, which abbreviates Bus Register output; and the BRS and BRP signals which abbreviates Bus Register Serial and Parallel, respectively; and, the IRS and IRP signals which abbreviate Instruction Register Serial and Parallel, respectively.

In addition, a signal designated herein as C represents the PLA carry signal. Further, the BMS signal is supplied on a line 148 which is the select signal supplied to the bus register multiplexer 122 (FIG. 4a). The program counter increment control signal and the program counter multiplexer signal (PC MUX) are supplied on the lines 147 and 140. These signals are supplied to the increment circuit 146 and the program counter multiplexer 120, respectively, as illustrated in FIG. 4a. The output control signals $O_1$ and $O_2$ supplied on the lines 58 are provided as outputs from the PLA 190, and in addition the memory control signals $M_0$ through $M_2$ are supplied on lines 60 to effect control of the memory 54.

Additional output signals from the PLA 190, which are designated herein as ACW, and $A_0$ through $A_3$, are provided as inputs to the Control PLA 194.

Additional inputs supplied to the PLA 190 comprise the L77 signal, which represents an I/O instruction. The L/INT signal, which indicates that there is a request for an interrupt and the L/DCH signal which represents that there is a request for a data channel or memory access by an I/O device.

Four signals designated herein as $LC_0$ through $LC_3$ are also provided as inputs to the PLA 190. These signals comprise the latched state of the console control signals. In addition, the $LC_0$ and $LC_1$ signals are provided as inputs to the control PLA 194.

The control signals $C_0$ through $C_3$ from the operator console 62 are provided as inputs to the sequence state logic. In addition, $IB_0$ and $IB_5$ of the information bus 56 are provided as inputs to the sequence state logic 192. A signal designated herein as Skip is provided as an input to the sequence state logic 192. If the CPU is in a Skip condition, the program register skips the next sequential memory address. Three additional decoded outputs from the sequence state logic 192 comprise the $S_{22}$, $XEQ_1$ and the DEFER state signals. These signals represent various states of operation of the CPU.

Figure 7:
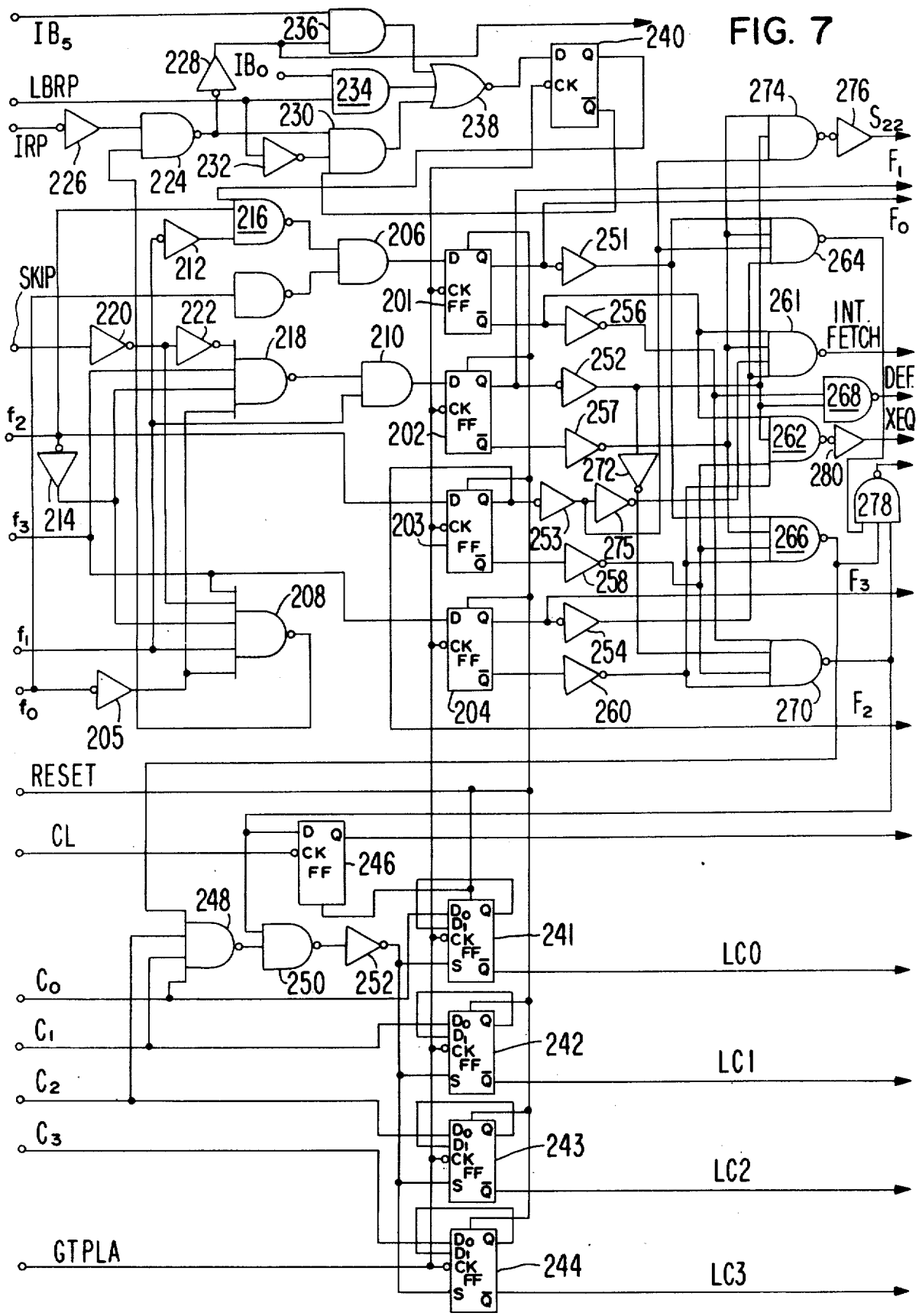
FIG. 7 is a detailed circuit diagram of the sequence state logic.

Referring now to FIG. 7, a detailed circuit diagram of the sequence state logic 192 is illustrated. Flipflops 201 through 204 form the sequence state register as referred to hereinabove. The $f_0$ signal supplied from the output of the PLA 190 (FIG. 6) is coupled to the input of an inverter 205 and to the input of an AND gate 206. The $f_1$ input signal is coupled to one of five inputs of a NAND gate 208, to one of two inputs of an AND gate 210, and to the input of an inverter 212. The $f_2$ signal from the PLA 190 is coupled to the input of an inverter 214, to the data (D) input of the flipflop 203 of the sequence state register, and to one of three inputs of a NAND gate 216. The $f_3$ input signal is coupled to a second input of the NAND gate 208, the data (D) input of the flipflop 204 of the sequence state register, and to one of four inputs of a NAND gate 218. The Skip signal is coupled to the input of an inverter 220, and the output of this inverter is coupled to the input of another inverter 222, and to a third input of the NAND gate 208. The output of the inverter 222 is coupled to a second input of the NAND gate 218. The output of the NAND gate 218 is coupled to the second input of the AND gate 210, and the output of this AND gate is coupled to the data (D) input of the flipflop 202 of the sequence state register.

The output of the inverter 212 is coupled to a second input of the NAND gate 216, and the output of the NAND gate 216 is coupled to the second input of the AND gate 206. The output of the AND gate 206 is coupled to the data (D) input of the flipflop 201 of the sequence state register.

The output of the inverter 214 is coupled to an input of the NAND gate 218, and to another input of the NAND gate 208. The output of the inverter 205 is coupled to yet another input of the NAND gate 208, and to another input of the NAND gate 218. The output of the NAND gate 208 is coupled to the first of two inputs of a NAND gate 224. The IRP signal (Instruction Register Parallel signal) is coupled to the input of an inverter 226, and the output thereof is coupled to the second input of the NAND gate 224. The output of the NAND gate 224 is coupled to the input of an inverter 228, and to one of three inputs of an AND gate 230. The LBRP signal (latched version of the Bus Register parallel signal) line is coupled to the input of an inverter 232, and to the input of an AND gate 234. The information bus signal line $IB_0$ is coupled to the second input of the AND gate 234. The output of the inverter 228 is coupled to one of two inputs of an AND gate 236, the bit position line of the information bus ($IB_5$) signal line is coupled to the second input of the AND gate 236. The outputs of the AND gates 230, 234 and 236 are coupled respectively to three inputs of a NOR gate 238. The output of the NOR gate 238 is coupled to the data (D) input of a flipflop 240.

The true (Q) output of the flipflop 240 is coupled to the third input of the NAND gate 216. The not true ($\overline{Q}$) output of the flipflop 240 is coupled back to the third input of the AND gate 230. The flip-flop 240, and associated gates coupled to the data input thereof is used during indirect addressing of memory.

Flipflops 241 through 244 are disposed for latching the console control signals $C_0$ through $C_3$, respectively. The GTPLA clock signal is supplied to the clock inputs of the flipflops 201 through 204, and the flipflops 240 through 244. The Reset signal supplied to the sequence state logic is coupled to the preset direct (PD) inputs of the flipflops 201 through 204, and 241 through 244. In addition, the Reset input signal is supplied to the clear direct (CD) input of a flipflop 246. The clock input of the flipflop 246 is coupled to the clock (CL) signal supplied from the clock logic 152.

The control signals ($C_0$ through $C_3$) from the operator console 62 are coupled to first data ($D_0$) inputs of the flipflops 241 through 244. In addition, the control signals $C_0$ through $C_2$ are coupled to three inputs of a NAND gate 248. The output of the NAND gate 248 is coupled to one of two inputs of a NAND gate 250. The output of the NAND gate 250 is coupled to the input of an inverter 252, and the output thereof is coupled to the select (S) input of the flipflops 241 through 244. The true (Q) outputs of the flipflops 241 through 244 are coupled back to a second data ($D_1$) input of each of the respective flipflops 241 through 244. The not true ($\overline{Q}$) outputs of the flipflops 241 through 244 provide the $LC_0$ through $LC_3$ output signals of the sequence state logic, which constitute the latched versions of the console control signals $C_0$ through $C_3$.

The true (Q) outputs of the flipflops 201 through 204 provide the $F_0$ through $F_3$ output signals from the sequence state logic, which are supplied to the PLA 190. In addition, the true (Q) outputs of these flipflops are also coupled to inputs of inverters 251 through 254, respectively. The not true ($\overline{Q}$) outputs of the flipflops 201 through 204 are coupled to the inputs of inverters 256 through 260, respectively. In addition, the not true ($\overline{Q}$) output of the flipflop 201 is coupled to one of four inputs of a NAND gate 261, and to one of four inputs of a NAND gate 262.

The output of the inverter 251 is coupled to one of four inputs of a NAND gate 264, and to one of four inputs of a NAND 266. The output of the inverter 256 is coupled to one of two inputs of a NAND gate 268, and to one of four inputs of a NAND gate 270. The output of the inverter 252 is coupled to the input of an inverter 272, to a second input of the NAND gate 264, to the second input of the NAND gate 268, and to a second input of the NAND gate 262. The output of the inverter 257 is coupled to one of three inputs of a NAND gate 274, a third input of the NAND gate 264, a third input of the NAND gate 261, and to a third input of the NAND gate 266. The output of the inverter 253 is coupled to the input of an inverter 275, the third input of the NAND gate 274 and the fourth input of the NAND gate 263. The output of the inverter 275 is coupled to a third input of the NAND gate 261. The output of the inverter 258 is coupled to a third input of the NAND gate 262, a fourth input of the NAND gate 266, and a third input of the NAND gate 270. The output of the inverter 254 is coupled to the fourth input of the NAND gate 264, the fourth input of the NAND gate 261. The output of the inverter 260 is coupled to the fourth input of the NAND gate 262, the fourth input of the NAND gate 266, and to the fourth input of the NAND gate 270.

The output of the NAND gate 274 is coupled to the input of an inverter 276, and the output of this inverter provides the $S_{22}$ signal. Thus, the NAND gate 274 decodes the $S_{22}$ state of operation. The output of the NAND gate 264 is coupled to one of three inputs of a NAND gate 278. The output of the NAND gate 261 provides the interrupt fetch signal (INT. FETCH), which is supplied as an input to Interrupt and Data Channel Logic to be discussed below. The output of the NAND gate 268 provides the DEFER signal. The DEFER signal is used during indirect addressing of memory to defer execution of an instruction in the instruction register so that the CPU will go through another cycle to fetch the desired operand. The output of the NAND gate 262 is coupled to the input of an inverter 280, and the output of this inverter provides the $XEQ_1$ signal. Thus, the NAND gate 262 decodes the $XEQ_1$ state of operation. The output of the NAND gate 266 is coupled to the second input of the NAND gate 278, and to the fourth input of the NAND gate 248. The output of the NAND gate 272 is coupled to the third input of the NAND gate 278, to the data (D) input of the flipflop 246, and to the second input of the NAND gate 250. The output of the NAND gate 278 provides an output signal that indicates console operation, which signal is designated herein as CON. OP.

The true (Q) output of the flipflop 246 provides the RUN signal, which is supplied as a CPU status signal to the Operator Console 62.

Referring now to FIG. 8, a detailed circuit diagram of the logic 194, which includes the destination multiplexer, the accumulator address logic and the control PLA, is shown. Control PLA 300 is also referred to herein as the "mini-PLA." The control PLA 300 performs the function of providing numerous output signals in response to address input signals. A PLA regulator, or clamp 302, provides a bias voltage to sense lines 1 through 18 of the control PLA 300. The $LC_0$ and $LC_1$ signals are coupled to inputs of the control PLA 300, and bit positions 3, 4, 6 and 7 of the instruction register (i.e., $IR_3$, $IR_4$, $IR_6$ and $IR_7$) are also provided as input signals to the control PLA.

To interpret the diagram illustrated in FIG. 8, a signal supplied at an input, for example at the $LC_0$ input, activates a horizontal line and an intersecting vertical line where a circle surrounds the intersection between the horizontal and vertical lines. For example the $LC_0$ input signal horizontal line intersects the verical lines 10 and 18. In this embodiment, when the $LC_0$ input signal is supplied on this horizontal line, and signals are supplied on all other horizontal lines intersecting at a circle, the corresponding vertical line will be pulled down in potential to, for example, ground potential.

The outputs from the PLA 300 are provided on horizontal lines indicated by a cross or X. In particular, outputs are supplied from the PLA 300 to inputs of inverters 304 and 305. The output of the inverter 304 is coupled to the input of an inverter 306, and the output of the inverter 305 is coupled to the data (D) input of a flipflop 308.

The control signals $A_0$ through $A_2$ from the microprogram PLA 190 (FIG. 6) are provided as inputs to the control PLA 300 through drivers 310 through 312. The output of the drivers 310 through 312 are coupled to inputs of inverters 314 through 316, respectively. Thus, the control signals $A_0$ through $A_2$ and the logic inversions thereof are provided as inputs to the control PLA 300. Following the output of the inverter 315 and the output of the driver 312 to the first intersection with vertical line 1, a signal is provided at the input of an inverter 318. The second intersecting vertical line 4 with the outputs of the inverters 314 and 316 leads to the input of an inverter 320. Yet another intersecting circle between the horizontal lines at the outputs of the driver 310 and the inverter 315 with the vertical line 12 leads to the input of an inverter 322. The outputs of the driver 310 and the inverter 315 intersect with the vertical line 13, which vertical line leads to the input of an inverter 324.

The output of the inverter 320 is provided as an input to an inverter 326, and the output of this inverter constitutes the Destination Multiplexer Select 1 signal (DMS 1). The output of the inverter 318 is coupled to the input of an inverter 328, and the output of this inverter constitutes the Destination Multiplexer Select 2 signal (DMS 2). The output of the inverter 322 is coupled to the data (D) input of a flipflop 330. The output of the inverter 324 is supplied on a line 332, which transmits the A246 signal supplied to the shifter logic 124.

The instruction register bit 12 (i.e., IR12) is coupled to the first of two inputs of a NAND gate 334. A control signal entitled A/L is coupled to the second input of the NAND gate 334, which signal will be explained further hereinbelow. The output of the NAND gate 334 is coupled to the first of two inputs of a NAND gate 336. The Accumulator Write (ACW) signal from the PLA 190 is coupled to the input of an inverter 338, and the output of this inverter is coupled to the second input of the NAND gate 336. The output of the NAND gate 336 is coupled to the data (D) input of a flipflop 340. The clock (CP) inputs of the flipflops 330, 308 and 340 are coupled to the GTPLA clock signal as described hereinabove.

The true (Q) output of flipflop 330 is coupled to the first of three inputs of NAND gates 342 and 344. The not true ($\bar{Q}$) output of the flipflop 330 is coupled to one of three inputs of NAND gates 346 and 348. The true (Q) output of the flipflop 308 is coupled to the second input of the NAND gates 348 and 344. The not true ($\bar{Q}$) output of the flipflop 308 is coupled to the second input of the NAND gates 342 and 346. The true (Q) output of the flipflop 340 is coupled to the input of an inverter 350, and the output of this inverter is coupled to the third input of each of the NAND gates 342, 344, 346 and 348.

The function of the gating network comprising NAND gates 334 and 336 and the inverter 338 is to enable writing into the accumulators. Thus, setting of the flipflop 340 from the output of the NAND gate 336 provides an output signal to enable the NAND gates 342, 344, 346 and 348. The outputs of these NAND gates constitute the accumulator write signals ($Acc/W_0$ – $W_3$) supplied on the lines 138. The outputs of the inverters 306, 326 and 328 supply the destination multiplexer select signals $DMS_0$, $DMS_1$ and $DMS_2$.

Figure 9:
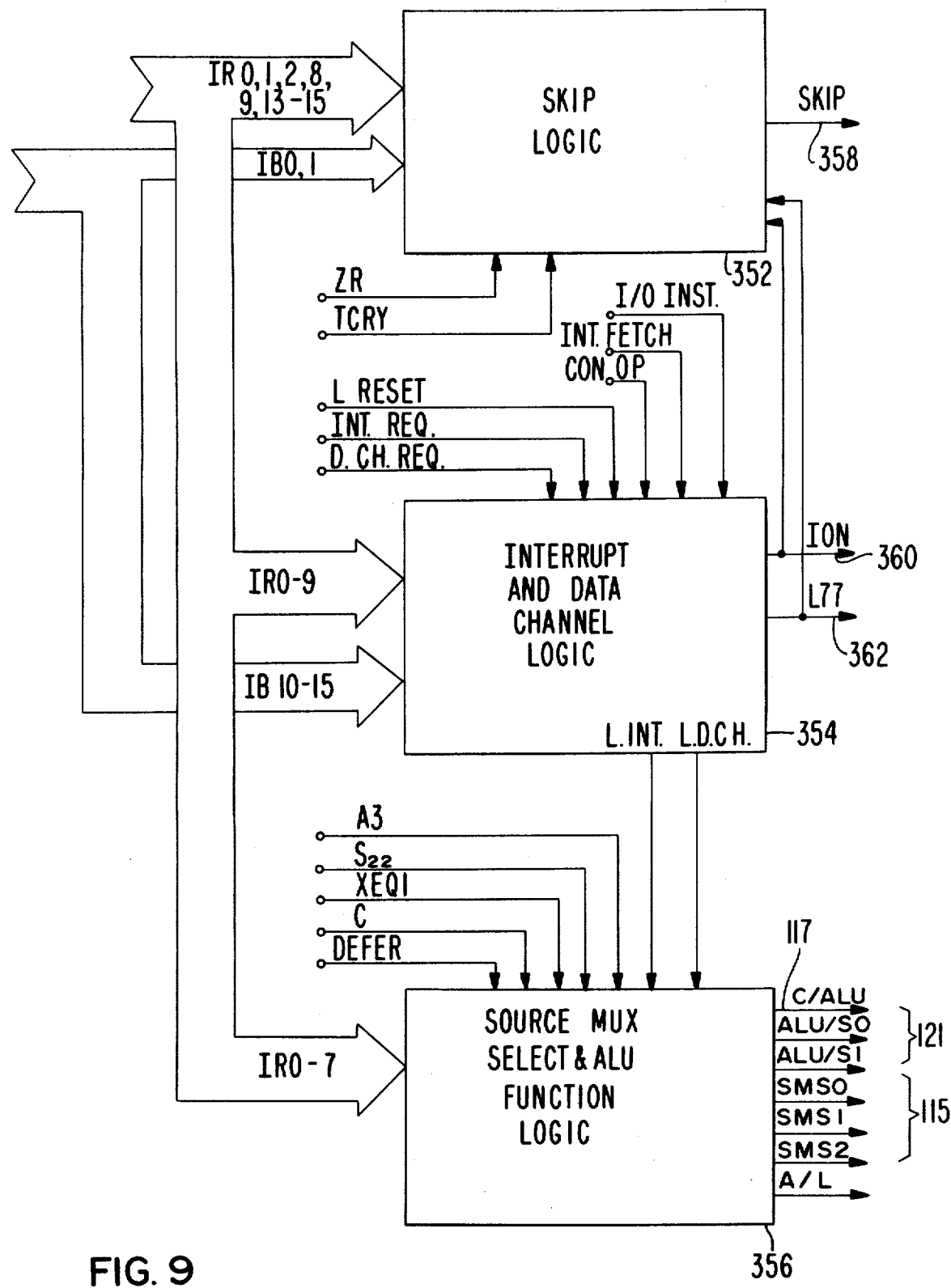
FIG. 9 is a block diagram of the skip logic, interrupt and data channel logic, and the source multiplexer select and the ALU function logic.

Referring now to FIG. 9, a block diagram of the Skip logic 352, Interrupt and Data Channel logic 354, and Source Multiplexer Select and ALU Function logic 356. Bit positions 0, 1, 2, 8, 9, and 13 through 15 of the instruction register are provided as inputs to the skip logic 352. Bit positions 0 through 9 of the instruction register are provided as inputs to the Interrupt and Data Channel logic 354. Bit positions 0 through 7 of the instruction register are provided as inputs to the logic 356. Bit positions 0 and 1 of the information bus are provided as inputs to the Skip logic 352, and bit positions 10 through 15 of the same information bus are provided as inputs to the logic 354. The zero result signal (ZR) and the tentative carry signal (TCRY) are provided as inputs to the Skip logic 352. The output of the Skip logic 352 is supplied on a line 358, and is designated herein as SKIP. The function of the SKIP signal is to cause the program counter 141 (FIG. 4a) to increment by one thereby "skipping" an address in memory.

The L RESET (latched version of the Reset signal), the INTERRUPT REQUEST and the DATA CHANNEL REQUEST signals are provided as inputs to the logic 354. Two outputs are provided from the logic 354. The first of these output signals is designated ION and is supplied on a line 360 as a CPU status signal to the operator console 62. The second signal is designated herein as L77, which indicates an I/O function involving the CPU and the operator console as I/O devices, is supplied on a line 362. In addition, two additional output signals are supplied from the logic 354 to inputs of the logic 356, which output signals are designated herein L. INT. and L. D. CH.

The output signals from the sequence state logic 192 (FIG. 6), which are designated as $S_{22}$, XEQ1 and DEFER state signals are provided as inputs to the logic 356. The $A_3$ output signal from the PLA 190 is also supplied as an input of the logic 356. Finally, the PLA carry signal (C) from the PLA 190 is also provided as an input to the logic 356. The output signals from the logic 356 control the operation of the source multiplexer 114 (FIG 4a) by providing the SMS0, SMS1 and SMS2 select signals on the lines 115. In addition, the output signals from the logic 356 control the operation of the ALU 118 by providing the C/ALU Signal on the line 117, and the ALU/S0 and S1 signals on the lines 121. The A/L control signal is provided as an output from the logic 356.

Figure 10:
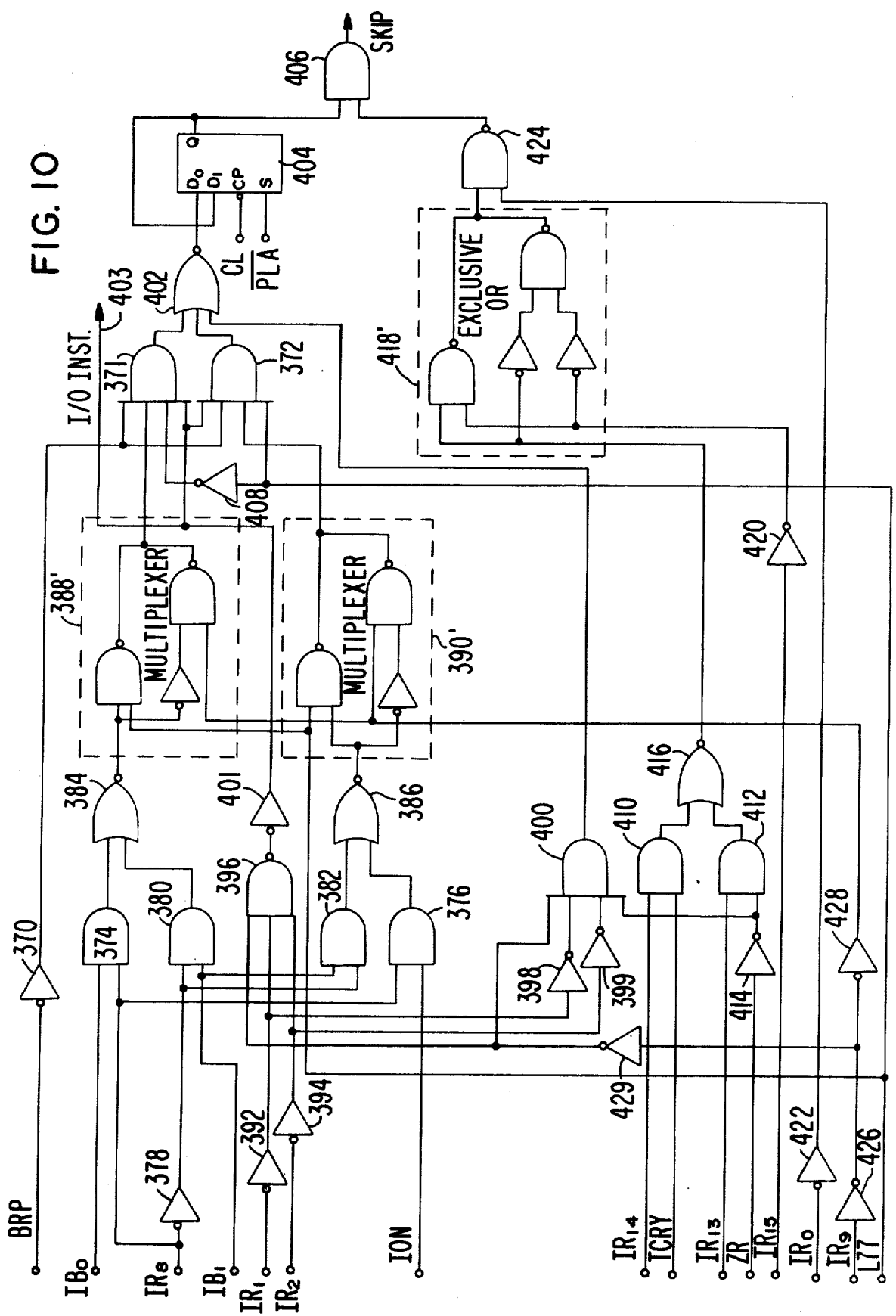
FIG. 10 is a detailed circuit diagram of the skip logic.

Referring now to FIG. 10, a detailed circuit diagram of the Skip logic 352 is illustrated. The Bus Register Parallel control signal (BRP) is supplied to the input of an inverter 370, and the output of this inverter is coupled to one of four inputs of AND gates 371 and 372. The zero bit position of the information bus ($IB_0$) is provided as one two inputs to an AND gate 374. The eighth bit position of the instruction register ($IR_8$) is provided as the second input to the AND gate 374, as one of two inputs to an AND gate 376, and as an input of to an inverter 378. The output of the inverter 378 is coupled to one of two inputs of an AND gate 380, and to one of two inputs of another AND gate 382. The first bit position of the information bus ($IB_1$) is provided as a second input to the AND gate 380, and as the second input to the AND gate 382. The outputs of the AND gates 374 and 380 are coupled to the two inputs of a NOR gate 384. The Interrupt-On signal (ION) is provided as the second input to the AND gate 376. The outputs of the AND gates 376 and 382 are provided as the two inputs of a NOR gate 386. The outputs of the NOR gates 384 and 386 are provided as select inputs to multiplier 388 and 390 enclosed within dashed lines 388' and 390', respectively.

The first bit position of the instruction register ($IR_1$) is provided as an input to an inverter 392. The second bit position of the instruction register ($IR_2$) is provided as the input to an inverter 394. The output of the inverter 392 is coupled to one of three inputs of a NAND gate 396, and the input of an inverter 398. The output of the inverter 394 is coupled to the second input of the NAND gate 396, and to the input of an inverter 399. The outputs of the inverters 398 and 399 are coupled to two of four inputs of an AND gate 400. The output of the NAND gate is coupled to the input of an inverter 401, and the output of this inverter is coupled to inputs of the NAND gates 371 and 372. In addition, the signal at the output of the inverter is supplied on a line 403, which signal represents an input/output instruction.

The outputs of the AND gates 371, 372 and 400 are coupled, respectively, to three inputs of a NOR gate 402. The output of the NOR gate 402 is coupled to the first data ($D_0$) input of a flipflop 404. The true (Q) output of the flipflop 404 is coupled to one of two inputs of a NAND gate 406, and to a second data ($D_1$) of the flipflip 404. The select (S) input of the flipflop 404 is coupled to the PLA signal supplied by the clock logic 152, which signal is the logic inversion of the PLA time slot represented by waveform 162 in FIG. 5. The clock CP input to the flipflop 404 is coupled to the CPU clock signal.

The L77 signal is coupled to the input of an inverter 408, and to an input of the AND gate 372. The output of the inverter 408 is coupled to another input of the AND 371. The output of the multiplexers 388 and 390 are coupled to third inputs of the AND gates 371 and 372, respectively.

The fourteenth bit position of the instruction register ($IR_{14}$) is provided as an input to an AND gate 410. The tentative carry signal (TCRY) is provided as the second input of the AND gate 410. The thirteenth bit position of the instruction register ($IR_{13}$) is provided as one of two inputs of an AND gate 412. The zero result signal (ZR) is provided as an input to an inverter 414, and the output of this inverter is coupled to the second input of the AND gate 412 and to a third input of the AND gate 400. The outputs of the AND gates 410 and 412 are coupled, respectively, to two inputs of a NOR gate 416. The output of the NOR gate 416 is coupled to one of two inputs of an EXCLUSIVE OR gating network 418 enclosed within dashed line 418'. The fifteenth bit position of the instruction register ($IR_{15}$) is provided as the input of an inverter 420, and the output of this inverter is coupled to the second input of EXCLUSIVE OR gating network 418. The zero bit position of the instruction register ($IR_0$) is provided as an input to an inverter 422, and the output of this inverter is coupled to one of two inputs of a NAND gate 424. The output of the EXCLUSIVE OR network 418 is coupled to the second input of the NAND gate 424. The output of the inverter 422 is also coupled to the input of an inverter 429. The output of the inverter 429 is coupled to the fourth input of the AND gate 400 and to the third input of the AND gate 396. The output of the NAND gate 424 is coupled to the second input of the AND gate 406, and the output of this AND gate provides the SKIP Signal at the output of the Skip logic 352.

The ninth bit position of the instruction register ($IR_9$) is provided as the input to an inverter 426, and the output of this inverter is coupled to the input of an inverter 429, and to inputs of the multiplexer circuits 388 and 390. The output of the inverter 428 is provided as a third input to each of the multiplexers 388 and 390.

As stated hereinabove, the purpose of the SKIP signal is to cause the program counter 141 to increment by one, thereby skipping an address in memory. State 5 in the sequence state logic 192 or the PLA 190 (on the $f_0$ through $f_3$ lines) is the skip state. If the SKIP signal is supplied by the Skip logic and the state lines $f_0$ through $f_3$ are at state 5, then the sequence state logic goes to state 5. If, on the other hand, the Skip signal is not received, then the sequence state logic goes to state 7, or the $S_{22}$ state.

There are three general conditions upon which a Skip will occur. First, a skip can occur on an arithmetic function, which condition is detected by the circuitry in FIG. 10 from the AND gate 424 back through the circuitry leading up to this AND gate.

Next, a skip can occur on an Input/Output instruction. This condition is detected by all that circuitry in FIG. 10 leading up to the AND gates 371 and 372. The third type of skip occurs during either the "increment-skip-zero" or "decrement-skip-zero" instructions. This type of skip condition is detected by that portion of the FIG. 10 circuitry leading up to and including the AND gate 400.

Figure 11:
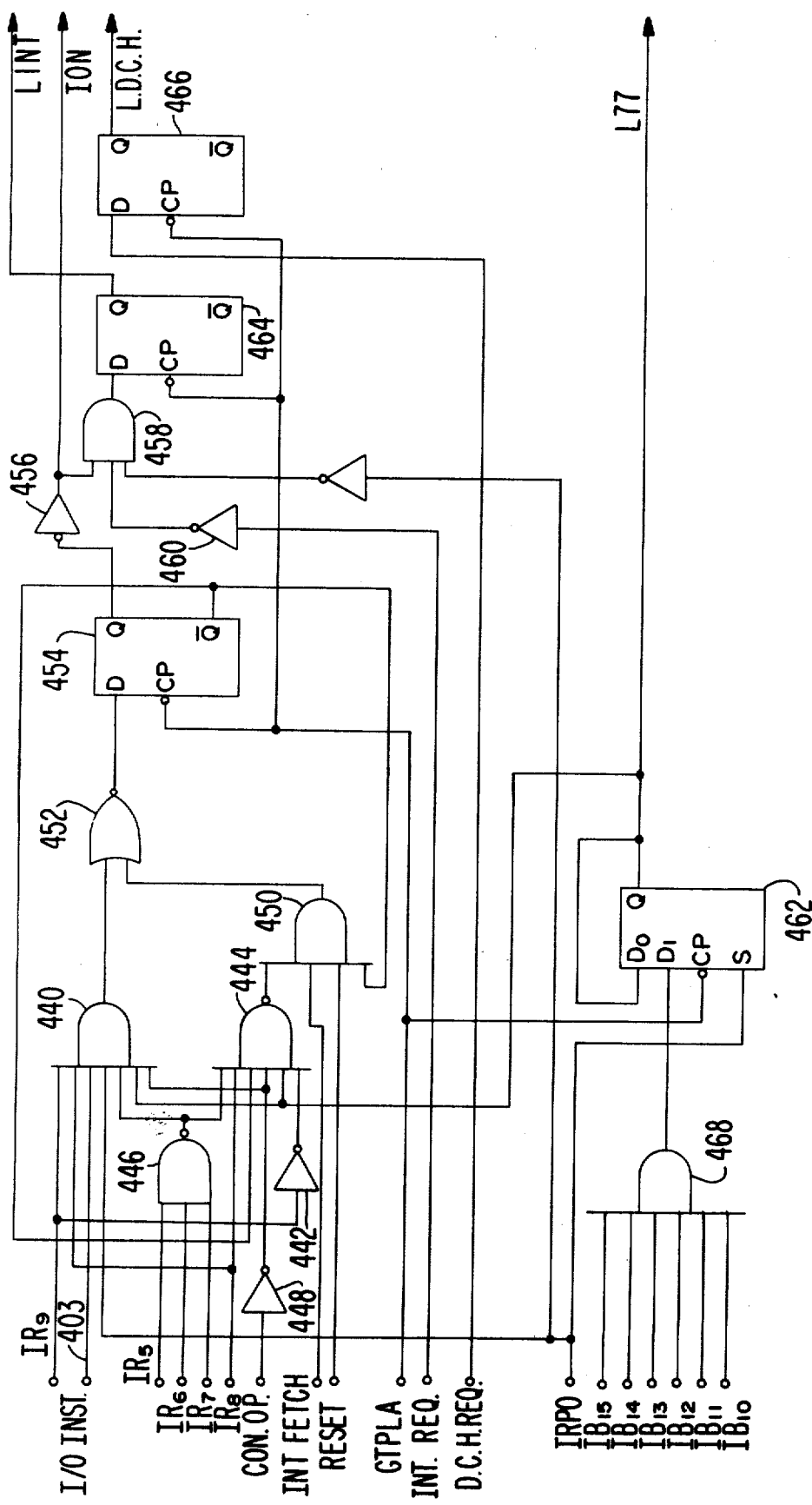
FIG. 11 is a detailed circuit diagram of the interrupt and data channel logic.

Referring now to FIG. 11, a detailed circuit diagram of the Interrupt and Data Channel Logic 354 is illustrated. The ninth bit position of the instruction register ($IR_9$) is provided as an input to an AND gate 440, and to the input of an inverter 442. The line 403, which transmits the signal indicating an I/O INSTRUCTION is coupled to a second input of the AND gate 440. The output of the inverter 442 is coupled to one of six inputs of a NAND gate 444. The fifth, sixth and seventh bit positions of the instruction register ($IR_5$, $IR_6$ and $IR_7$) are coupled, respectively, to three inputs of a NAND gate 446. The output of the NAND gate 446 is coupled to a second input of the AND gate 440 and the NAND gate 444. The eight bit position of the instruction register ($IR_8$) is provided as an input to both the AND gate 440 and to the NAND gate 444. The Console Operation Signal (CONOP) is provided as an input to an inverter 448, and the output of this inverter is coupled to an input of the AND gate 440 and to an input of the NAND gate 444.

The interrupt fetch (INT FETCH) and the RESET signals are provided as inputs to an AND gate 450. The output of the NAND gate 444 is also provided as an input to the AND gate 450. The output of the AND gate 450 is coupled to one of two inputs of a NOR gate 452, and the second input of the NOR gate 452 is coupled to the output of the AND gate 440. The output of the NOR gate 452 is coupled to the data (D) input of a flipflop 454. The true (Q) output of the flipflop 454 is coupled to the input of an inverter 456, and the not true ($\overline{Q}$) output of this flipflop is coupled to another input of the NAND gate 450, and to additional inputs of the AND gate 440 and the NAND gate 444. The status of the flipflop 454 indicates an enable of an interrupt.

The output of the inverter 456 constitutes the interrupt on signal (ION), which is also provided as an input to an AND gate 458. The interrupt request signal (INT. REQ.) is provided as an input to an inverter 460, and the output of this inverter is provided as the second input to the AND gate 458.

The IRP clock signal is provided as an input to the AND gate 440, to a third input of the AND gate 458, and to the select (S) input of a flipflop 462. The output of the AND gate 458 is coupled to the data (D) input of a flipflop 464. The true (Q) output of the flipflop 464 constitutes the latched version of the interrupt signal (LINT). Thus, it is the function of the flipflop 464 to store the interrupt signal. The INT. REQ. signal is passed through the inverter 460, and the AND gate 458 to the data (D) input of the flipflop 464. If the flipflop 454 is set (ION condition), then the INT. REQ. signal will set the flipflop 464 in conjunction with an IRP clock signal. Accordingly, an Interrupt Request to the CPU will not be recognized until the proper conditions are met. The Data Channel Request signal (D. CH. REQ.) is provided as an input to the data (D) input of a flipflop 466, and the true (Q) output of this flipflop constitutes the latched version of the Data Channel Request signal (LDCH). Thus, it is the function of the flipflop 466 to store the Data Channel Request signal. The clock (CP) inputs of the flipflops 454, 462, 464 and 466 are coupled to the GTPLA clock signal.

The tenth through the fifteenth bits of the information bus ($IB_{10}$ through $IB_{15}$) are coupled to six inputs of an AND gate 468. The output of the AND gate 468 is coupled to the second data input ($D_1$) of the flipflop 462. The true (Q) output of the flipflop 462 constitues the L77 output signal from the logic 354, which indicates that the CPU is to respond to an I/O instruction. This true output of the flipflop 462 is coupled back to the first data input ($D_0$) of the flipflop 462 and is also provided as inputs to the AND gate 440 and the NAND gate 444.

Referring now to FIG. 12, a detailed schematic diagram of the Source Multiplexer Select and ALU Function Logic 356 is illustrated. The second bit position of the instruction register ($IR_2$) is provided as one of three inputs to a NAND gate 470. The $A_3$ control signal is provided as an input to an inverter 472, and the output of this inverter is coupled to a second input of the NAND gate 470, one of two inputs of a NAND gate 474, one of three inputs of a NAND gate 476, and to one of two inputs of a NAND gate 478. The output of the NAND gate 470 is coupled to one of two inputs of a NAND gate 480. The output of the NAND gate 474 is coupled to the second input of the NAND gate 480, and to one of two inputs of a NAND gate 482. The output of the NAND gate 476 is coupled to the second input of the NAND gate 482. The outputs of the NAND gates 480, 482 and 478 constitute the source multiplexer select signals (SMS0, 1 and 2), respectively.

The latched version of the Interrupt signal (LINT) is provided as one of four inputs to a NAND gate 484. The latched version of the Data Channel Request signal (L.D.CH.) is provided as the second input to the NAND gate 484. The $S_{22}$ sequence state signal is provided as a third input to the NAND gate 484. The output of the NAND gate 484 is coupled as inputs to inverters 486 and 488. In addition, the output of the NAND gate 484, constitutes the A/L control signal supplied by the logic 356. The output of the inverter 486 is coupled to the third input of the NAND gate 470 and of the NAND gate 476, and it is also provided as a second input to the NAND gate 478.

The output of the inverter 488 is coupled to one of two inputs of a NAND gate 492, one of three inputs of a NAND gate 494, and to one of two inputs of a NAND gate 496. The $XEQ_1$ sequence state signal is provided as one of six inputs to a NAND gate 498. The zero position of the instruction register ($IR_0$) is provided as the second input to the NAND gate 498, the fourth input of the NAND gate 484, and the second input to the NAND gate 474. The first bit position of the instruction register ($IR_1$) is coupled to a third input of the NAND gate 498, and to the third input of the NAND gate 476. The second, third and fourth bit positions of the instruction register ($IR_2$, $IR_3$ and $IR_4$) are provided as fourth, fifth and sixth, respectively, inputs of the NAND gate 498.

The DEFER signal is coupled to the input of an inverter 500, and the output of this inverter is coupled to the input of a NAND gate 502, and one of two inputs of a NAND gate 504. The outputs of the NAND gates 498, 502 and 492 are coupled together and this connection is provided as one of two inputs to a NAND gate 506. The output of the NAND gate 494 is coupled to the second input of the NAND gate 506. The common connection between the NAND gate 498, 502 and 492 is also coupled to the input of an inverter 508, and the output of this inverter constitutes the ALU Select 0 (ALU/$S_0$) output signal from the logic 356. The output of the NAND gate 506 is coupled to the input of an inverter 510, and the output of this inverter constitutes the ALU select 1 (ALU/S1) output signal from the logic 356.

The sixth bit position of the instruction register ($IR_6$) is coupled to the second input of a NAND gate 492. The fifth bit position of the instruction register ($IR_5$) is coupled to the second input of the NAND gate 494. The seventh bit position of the instruction register ($IR_7$) is coupled to the input of an inverter 512, and the output of this inverter is coupled to the third input of the NAND gate 494 and to the second input of the NAND gate 496. The carry signal (C) generated in the PLA 190 is coupled to one of three inputs of a NAND gate 514. The outputs of the NAND gates 496 and 504 are coupled to the second and third inputs of the NAND gate 514. The output of the NAND gate 514 constitutes the arithmetic logic unit carry input signal (C/ALU).

The first through eleventh bit positions of the bus register ($BR_1$ through $BR_{11}$) are provided as inputs to a NAND gate 516. The output of the NAND gate 516 is coupled to the input of an inverter 518, and the output of this inverter is coupled to one of two inputs of NAND gates 520 and 522. The twelfth bit position of the bust register ($BR_{12}$) is coupled to the second input of the NAND gate 522 and to the input of an inverter 524. The output of the inverter 524 is coupled to the second input of the NAND gate 520. The output of the NAND gate 520 is coupled to the first data ($D_0$) input of a flipflop 524. The output of the NAND gate 522 is similarly coupled to the first data ($D_0$) input of a flipflop 526.

The clock (CP) input terminals of the flipflops 524 and 526 are coupled to the Go To PLA (GTPLA) clock signal. The select (S) inputs of the flipflops 524 and 526 are coupled to the $M_2$ memory control signal. The true (Q) output of the flipflop 524 is coupled to the second data ($D_1$) input of the flipflop 524, and the not true ($\overline{Q}$) output of this flipflop is coupled to the second input of the NAND gate 504. The true (Q) output of flipflop 526 is coupled to the second data ($D_1$) of the same flipflop. The not true ($\overline{Q}$) output of the flipflop 526 is coupled to the second input of the NAND gate 502.

The function of the flipflops 524 and 526 is to implement an automatic increment or decrement of the memory address. In particular, when the CPU is indirectly addressing memory, and the memory address is within a prescribed range of address then an automatic increment is effected. Similarly, when the memory address is within another range of addresses, an automatic decrement is implemented.

Figure 13:
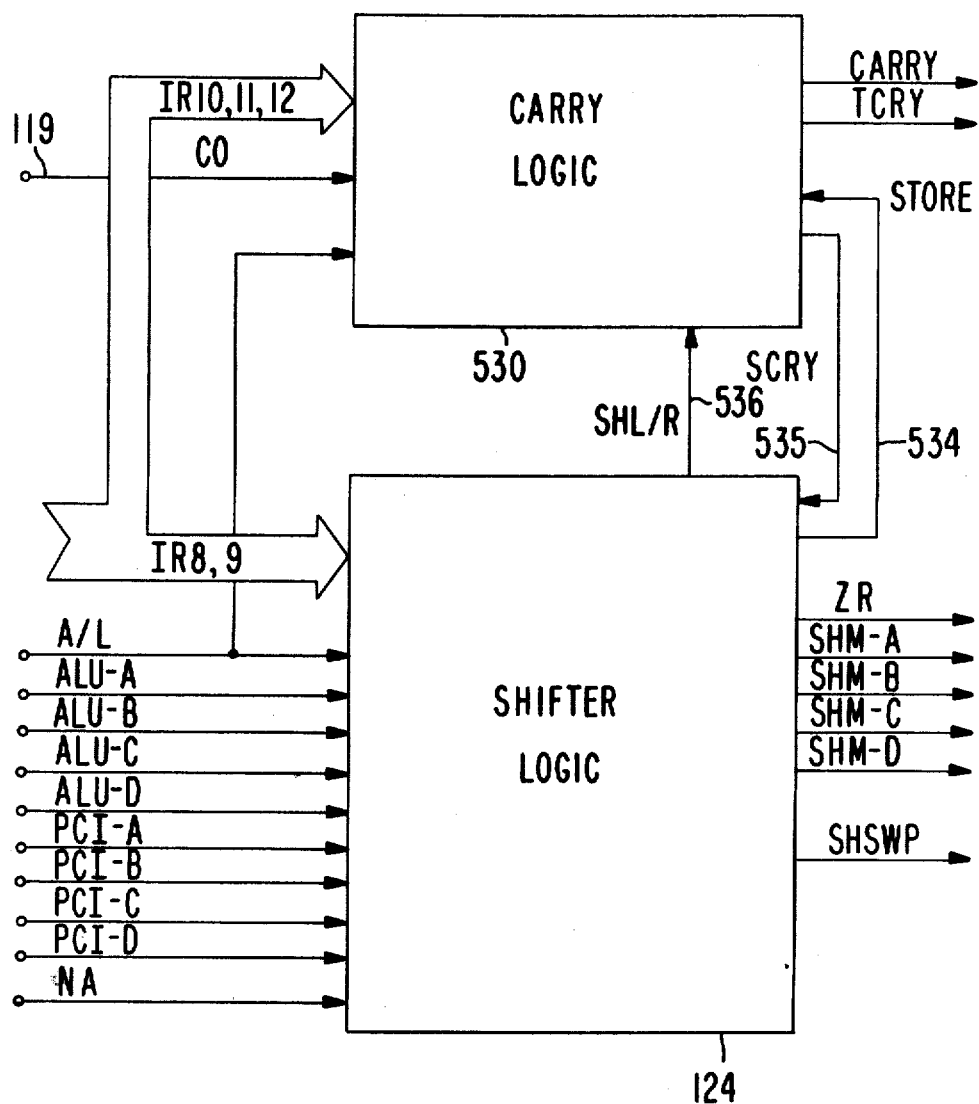
FIG. 13 is a block diagram of the carry and shifter logic.

Referring now to FIG. 13, a block diagram of Carry Logic 530 and the Shifter Logic 124 of the CPU 52 is illustrated. The tenth, eleventh and twelfth bit positions of the instruction register ($IR_{10}$, $IR_{11}$ and $IR_{12}$) are provided as inputs to the logic 530. In addition, the carry out (CO) signal from the ALU 118 is provided as an input to the logic 530 on the line 119. The CARRY and Tentative Carry (TCRY) signals are provided as outputs of the logic 530. In addition, a stored carry (SCRY) signal is provided as an output from the carry logic 530 on a line 535 to an input of the Shifter Logic 124.

The eighth and ninth bit positions of the instruction register ($IR_8$ and $IR_9$) are provided as inputs to the shifter logic 124. The A/L signal from the logic 356 (FIG. 9) is provided as an input to the Carry Logic 530 and to the shifter logic 124. The outputs from the ALU 118 (ALU-A through ALU-D) are provided as inputs to the shifter logic 124. In addition, the outputs of the increment circuit 114 (PCI-A through PCI-D) are provided as inputs to the shifter logic 124.

A shift Store signal and a shift left or right (SHL/R) control signal from the logic 124 are provided as inputs to the carry logic 530 by means of lines 534 and 536, respectively. The zero result (ZR) signal is also provided as an output from the shifter logic 124. The data output from the shifter logic 124 is supplied to the scratch register 128 (FIG. 4a) on four output lines designated herein as SHM-A through SHM-D. In addition, a signal is supplied from the logic 124 to indicate whether a shift or swap (SHSWP) of data from the ALU 118 is to be performed. Finally, a signal entitled NA is provided as an input to the logic 124, which signal indicates the status of the nibble being operated upon by the data path logic as shown in FIG. 4a.

Figure 14:
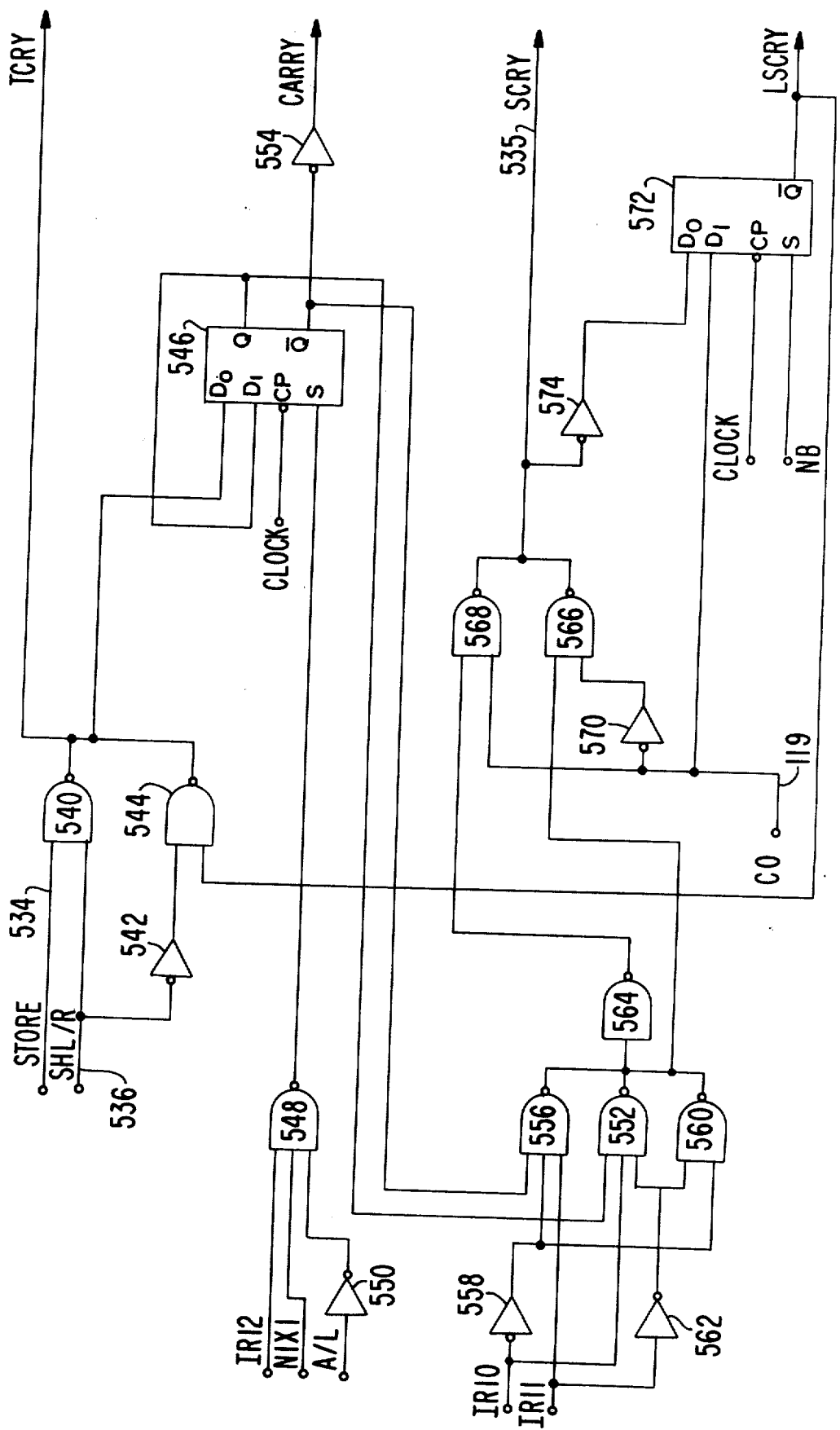
FIG. 14 is a detailed circuit diagram of the carry logic.

Referring now to FIG. 14, a detailed schematic diagram of the carry logic 530 is illustrated. The shift STORE signal supplied on the ℓ 534 from the shifter logic 124 is provided as one of two inputs to a NAND gate 540. The shift left or right (SH L/R) signal provided on the line 536 from the logic 124 is coupled to the second input of the NAND gate 540, and to the input of an inverter 542. The output of the inverter 542 is coupled to one of two inputs of a NAND gate 544. The outputs of the NAND gates 540 and 544 are coupled together and this connection constitutes the tentative carry (TCRY) signal from the Carry Logic 530. In addition, this connection is coupled to the first d: ($D_0$) input of a flipflop 546.

The twelfth bit position of the instruction register ($IR_{12}$) is provided as one of three inputs of a NAND gate 548. The N1X1 control signal, from the clock logic 152 is coupled to the second input of the NAND gate 548. The A/L control signal from the logic 356 (FIG. 9) is coupled to the input of an inverter 550, and the output of this inverter is coupled to the input of the NAND gate 548. The output of the NAND gate 548 is coupled to the select (S) input of the flipflop 546. The clock (CP) input of the flipflop 546 is coupled to the CLOCK signal from the clock logic 152 (FIG. 4b). The true (Q) output of the flipflop 546 is coupled to the second data ($D_1$) input of the same flipflop. Also, the true output of the flipflop 546 is coupled to one of three inputs of a NAND gate 552. The not true ($\overline{Q}$) output of the flipflop 546 is coupled to the input of an inverter 554, and to one of three inputs of a NAND gate 556. The output of the inverter 554 constitutes the CARRY output signal from the Carry Logic 530, which signal is a CPU status signal to the operator console 62.

The tenth bit position of the instruction register ($IR_{10}$) is provided as an input to an inverter 558, and to a second input of the NAND gate 552. The output of the inverter 558 is coupled to the second input of the NAND gate 556 and to one of two inputs of a NAND gate 560. The eleventh bit position of the instruction register ($IR_{11}$) is provided as the third input of the NAND gate 556 and as the input of an inverter 562. The output of the inverter 562 is coupled to the third input of the NAND gate 552 and to the second input of the NAND gate 560.

The outputs of the NAND gates 556, 552 and 560 are coupled together and this connection is coupled to the input of a NAND gate 564 and to one of two inputs of a NAND gate 566. The output of the NAND gate 564 is coupled to one of two inputs of a NAND gate 568. The carry out (CO) signal from the ALU 118, which is supplied on the line 119, is provided as the second input of the NAND gate 568, as the input of an inverter 570, and to the second data ($D_1$) input of a flipflop 572. The output of the inverter 570 is coupled to the second input of the NAND gate 566. The outputs of the NAND gates 566 and 560 are coupled together and this connection is coupled to the input of an inverter 574, and to the line 535 which transmits the Stored Carry (SCRY) signal. The output of the inverter 574 is coupled to the first data ($D_0$) input of the flipflop 572. The clock (CP) input of the flipflop 572 is coupled to the clock signal from the clock logic. The select (S) input of the flipflop 572 is coupled to the NB nibble status signal. The not true ($\overline{Q}$) output of the flipflop 572 constitutes the latched version of the SCRY signal. In addition, the not true ($\overline{Q}$) output of the flipflop 572 is coupled back to the second input of the NAND gate 544.

Referring now to FIG. 15, a detailed schematic diagram of the Shifter Logic 124 is illustrated. The A/L control signal from the logic 356 (FIG. 9) and from the output of the NAND gate 484 (FIG. 12) in particular, is provided as an input to an inverter 580. The output of the inverter 580 is coupled to one of three inputs of NAND gates 582, 583 and 584. The ninth bit position of the instruction register ($IR_9$) is provided as an input to an inverter 586, and to second inputs of the NAND gates 582 and 584. The output of the inverter 586 is provided as the second input to the NAND gate 583. The A246 signal from the control PLA 300 (FIG. 8) is provided as an input to an inverter 588, and the output of this inverter is coupled to one of two inputs of NAND gates 590 and 591. The NA nibble timing signal is supplied to the third inputs of the NAND gates 583 and 584. The eighth bit position ($IR_8$) of the instruction register is provided as an input to an inverter 592, and to a fourth input of the NAND gate 584. The output of the NAND gate 582 is coupled to one of two inputs of the NAND gate 590, to an input of an inverter 594, and to one of two inputs of a NAND gate 596. The output of the NAND gate 583 is coupled to the second input of the NAND gate 591 to one of two inputs of a NAND gate 598, to the second input of the NAND gate 596, and to the input of an inverter 600. The output of the NAND gate 584 constitutes the shift or swap (SH-SWP) signal from the shifter logic 124.

The A bit position at the output of the ALU 118 (ALU-A) is provided as an input to an inverter 602, a NAND gate 604, a NAND gate 606, and to an input of a block 608. The block 608 represents duplications of a portion of the circuitry illustrated in FIG. 15, to be explained in greater detail hereinbelow.

The A bit position at the output of the increment circuit 114, which output is designated herein as PCI A, is provided as one of three inputs to a NAND gate 610. The output of the NAND gate 590 is coupled to an input of an inverter 612, and to an input of the block 608. The output of the NAND gate 591 is coupled to the input of an inverter 614 and also to another input of the block 608. The output of the inverter 614 is coupled to the input of an inverter 616, to one of three inputs of a NAND gate 618, and to a second input of the NAND gate 606. The output of the inverter 612 is coupled to the input of an inverter 620, to one of three inputs of a NAND gate 622, and to the third input of a NAND gate 606. The output of the inverter 616 is coupled to the third input of a NAND gate 610 and to the third input of the NAND gate 622. The output of the inverter 620 is coupled to the third input of the NAND gate 610 and to the third input of the NAND gate 618. The outputs of the NAND gates 606, 618, 622 and 610 are coupled together and this connection constitutes the A bit position output of the shifter logic 124 supplied to the scratch register 128 (FIG. 4a), which output is designated herein as SHM A. The block 608 comprises three additional circuits for the B, C, and D positions of the Nibble supplied from either the program counter increment circuit 144 or the ALU 118. In particular, each of the three repetitive circuits in the block 608 comprise several gates coupled together in the same fashion as the NAND gates 606, 618, 622, and 610 including inverters 612, 614, 616 and 620. The three outputs from the block 608 comprise the three additional bit positions (B, C, and D) of the Nibble supplied at the output of the shifter logic 124 to the input of the scratch register 128.

The output of the inverter 594 is coupled to one of two inputs of a NAND gate 624. The output of the inverter 600 is coupled to a second input of the NAND gate 604, one of three inputs of a NAND gate 626, one of two inputs of a NAND gate 628, one of two inputs of a NAND gate 630, and to one of two inputs of a NAND gate 632. The NC nibble timing signal is provided as an input to an inverter 634, to a third input of the NAND gate 604, and to the second input of the NAND gate 632. The output of the inverter 634 is coupled to a second input of the NAND gate 626, to a second input of the NAND gate 628, and to a second input of the NAND gate 630. The outputs of the NAND gates 598, 604 and 626 are coupled together and this connection is coupled to the data (D) input of a flipflop 636. The not true ($\overline{Q}$) output of the flipflop 636 is coupled to the third input of the NAND gate 618, to the third input of the NAND gate 626, and is supplied as the shifter STORE output of the shifter logic 124.

The output of the inverter 602 is coupled to one of two inputs of a NAND gate 638. The second input of the NAND gate 638 is coupled to the output of the NAND gate 632. The output of the NAND gate 624 is coupled to one of two inputs of a NAND gate 640, and is supplied on a line entitled LN3, which represents a shift left on Nibble 3. The output of the NAND gate 628 is supplied on a line entitled R $\overline{NO}$, which represents a shift right except at nibble zero. The D bit position of the Nibble provided at the output of the ALU (ALU-D) is supplied as an input to an inverter 642, to the second input of the NAND gate 598, and to an input of the block 608. The output of the inverter 642 is coupled to the second input of the NAND gate 640. The output of the NAND gate 596 is coupled to one of three inputs of a NAND gate 644, and constitutes the shift left or right (SHL/R) signal provided at the output of the shifter logic 124. The C bit position of the Nibble provided at the output of the ALU 118 (ALU-C) is provided as an input to the block 608. The SCRY signal supplied on the line 535 from the carry logic 530 to the shifter logic 124 (FIG. 13) is coupled to the input of an inverter 646. The output of the inverter 646 is coupled to the third input of the NAND gate 644.

The outputs of the NAND gates 640, 638, 644, and 630 are coupled together and this connection is coupled to the data (D) input of a flipflop 648. In addition, this common connection at the data (D) input of the flipflop 648 is coupled to both the B and C bits of the Nibble provided at the output of the ALU 118 (i.e., ALU B and ALU C). The clock (CP) inputs of the flipflop 636 and 648 are coupled to the clock signal provided at the output of the clock logic 152. The not true ($\overline{Q}$) output of the flipflop 648 constitutes an inversion of the zero result ($\overline{ZR}$) signal. In addition, the $\overline{ZR}$ signal at the output of the flipflop 648 is coupled back to the second input of the NAND gate 630.

Figure 16A:
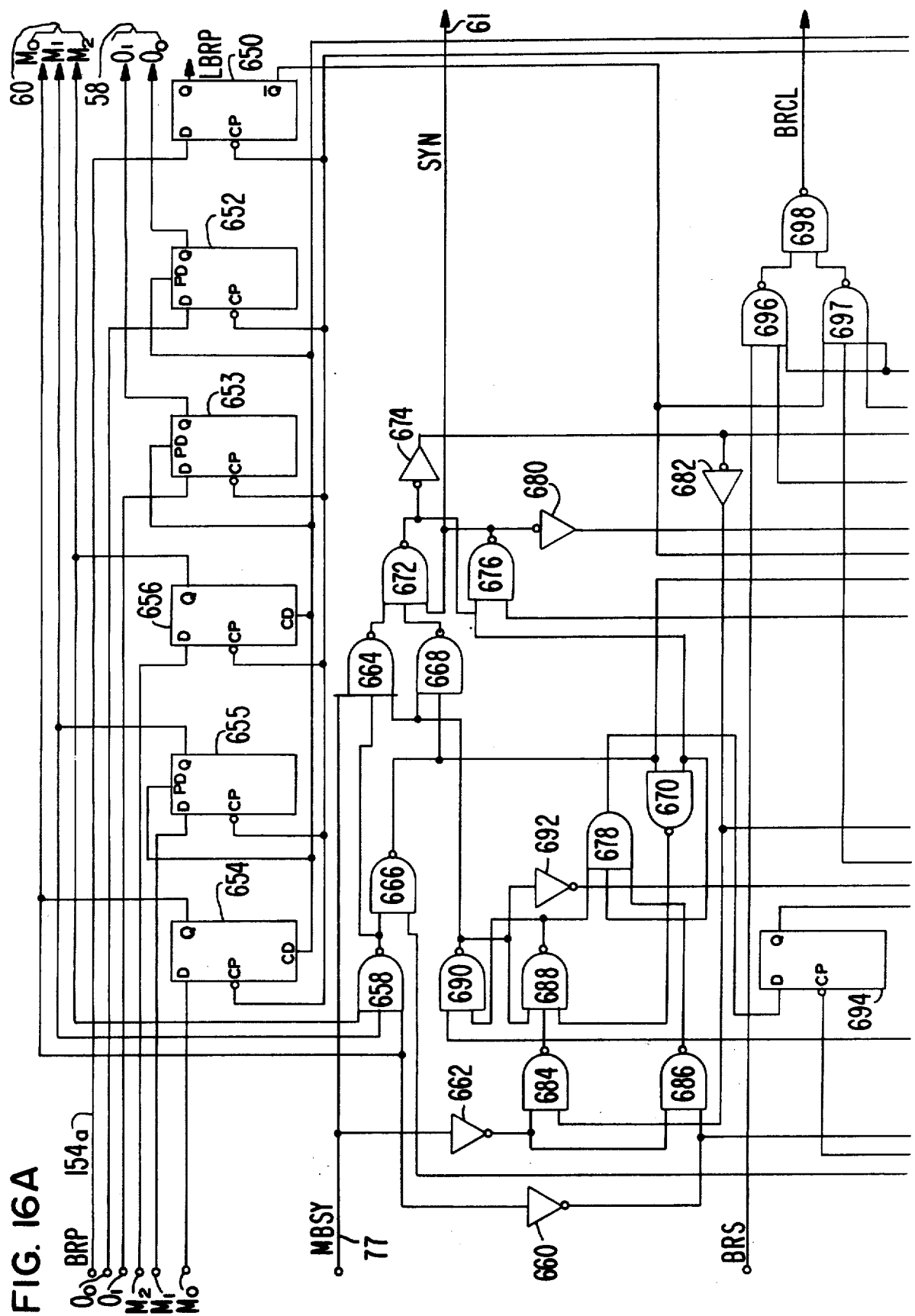
FIGS. 16a, 16b and 16c comprise a detailed circuit diagram of the clock logic.
Figure 16B:
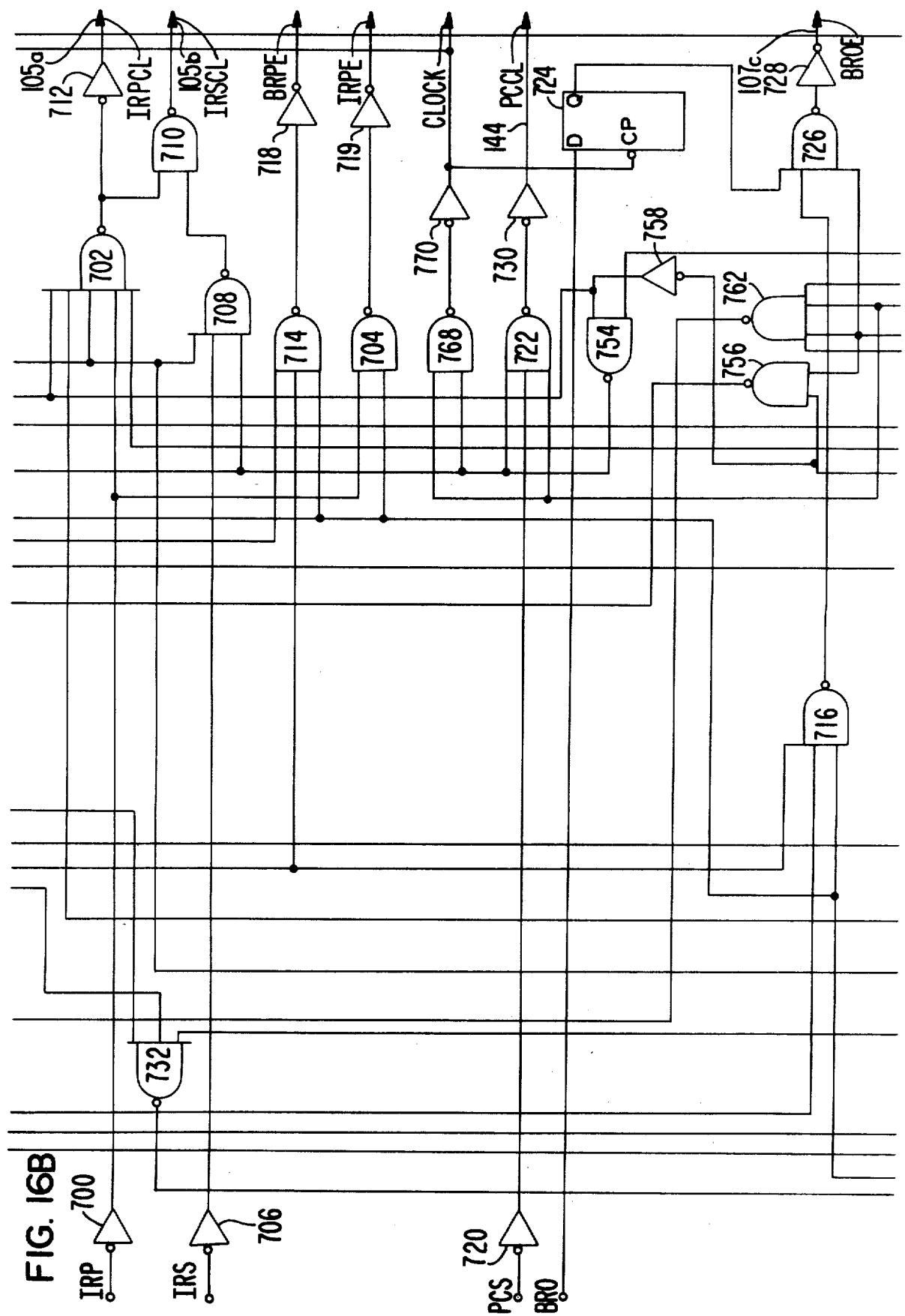
Figure 16C:
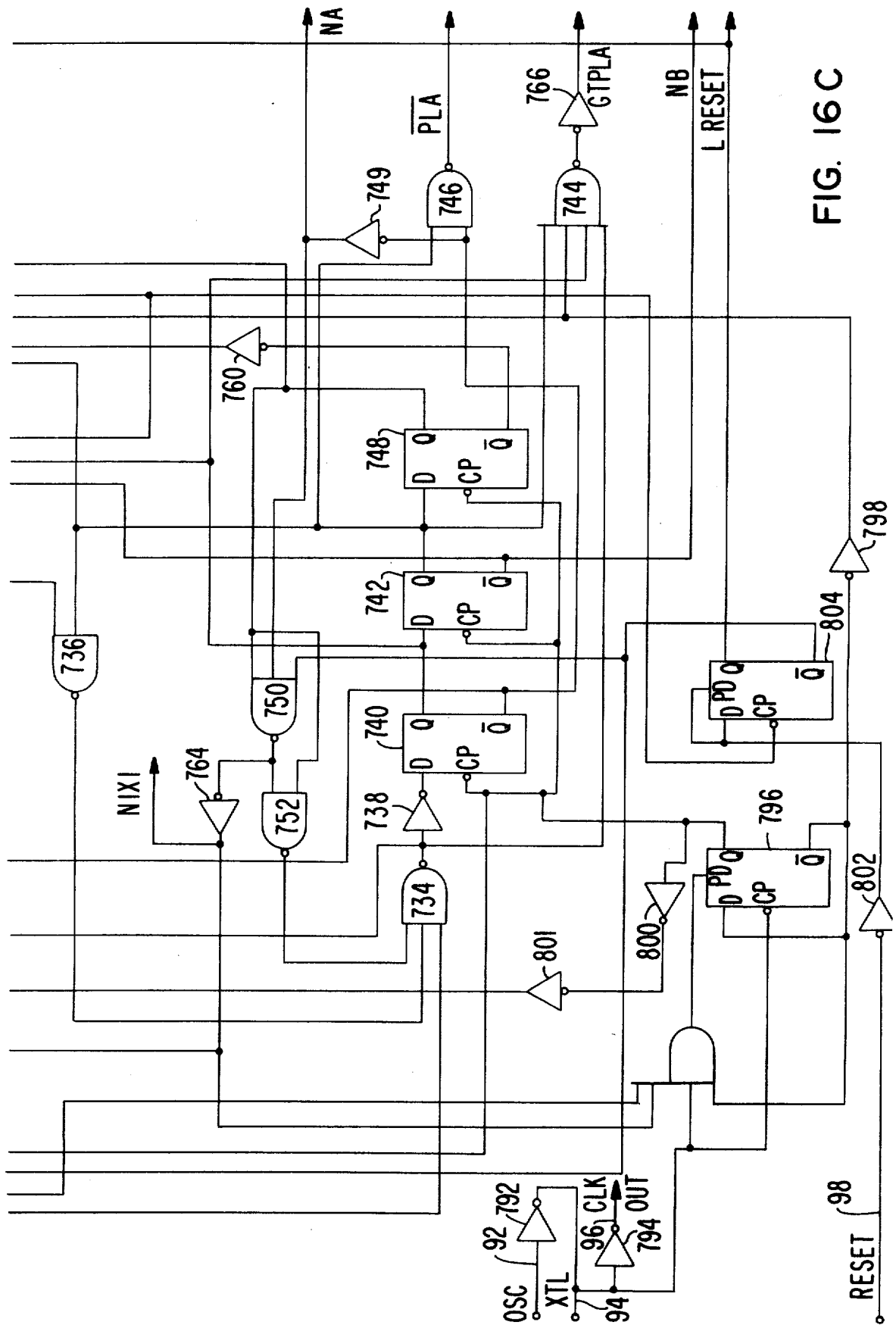

FIG. 16 is a unitary diagram illustrating the orientation of the sheets of the drawings comprising FIGS. 16a, 16b and 16c.

In FIG. 16A a schematic diagram of a portion of the clock logic 152 is illustrated. The Bus Register Parallel (BRP) signal supplied on the line 154a at the output of the PLA 190 (FIG. 6) is supplied to the data (D) input of a flipflop 650. The $O_0$ and $O_1$ output control signal lines from the PLA 190 are coupled to the data (D) inputs of flipflops 652 and 653, respectively. The memory control signal lines $M_0$ through $M_2$ from the PLA 190 are coupled to the data (D) inputs of flipflops 654 through 656, respectively.

The true (Q) output of the flipflop 650 constitutes a latched version of the Bus Register Parallel signal (LBRP) supplied to the clock logic 152. The true (Q) outputs of the flipflops 652 and 653 constitute the output control signals ($0_0$ and $0_1$) supplied on the lines 58 from the CPU 52. The true (Q) outputs of the flipflops 654 through 656 constitute the memory control signals $M_0$, $M_1$ and $M_2$ supplied on the lines 60 from the CPU 52. In addition, the true outputs of the flipflops 654 through 656 are coupled to three inputs of a NAND gate 658. The $M_0$ signal supplied at the true output of the flipflop 654 is also provided as an input to an inverter 660.

The Memory Busy signal (MBSY), supplied on the line 77 from the memory 54, is provided as an input to an inverter 662, and to one of three inputs of a NAND gate 664. The output of the NAND gate 658 is coupled to one of two inputs of a NAND gate 666 and to a second input of the NAND gate 664. The output of the NAND gate 666 is coupled to one of two inputs of a NAND gate 668 and to one of two inputs of another NAND gate 670. The outputs of the NAND gates 664 and 668 are coupled to two of three inputs of a NAND gate 672. The output of the NAND gate 672 is coupled to the input of an inverter 674, to one of two inputs of a NAND gate 676, to the second input of the NAND gate 670, and to one of three inputs of a NAND gate 678. The output of the NAND gate 676 is coupled to the input of an inverter 680, the third input of the NAND gate 672, and to the line 61 which supplies the SYN signal to the memory 54.

The output of the inverter 674 is coupled to an input of an inverter 682, and the output of this inverter is coupled to one of two inputs of a NAND gate 684. The output of the inverter 662 is coupled to the second input of the NAND gate 684 and to one of two inputs of a NAND gate 686. The output of the NAND gate 684 is coupled to one of three inputs of a NAND gate 688. The output of the NAND gate 688 is coupled to a third input of the AND gate 678 and to one of two inputs of a NAND gate 690. The output of the AND gate 690 is coupled back to the third input of the NAND gate 688 and to an input of an inverter 692. In addition, the output of the AND gate 690 is coupled to the second input of the NAND gate 668 and to the NAND gate 664. The output of the NAND gate 678 is coupled to the data (D) input of a flipflop 694.

The Bus Register Serial (BRS) signal from the PLA 190 is coupled to one of three inputs of a NAND gate 696. The not true ($\overline{Q}$) output of the flipflop 650 is coupled to one of four inputs of a NAND gate 697. The outputs of the NAND gates 696 and 697 are coupled to two inputs of a NAND gate 698, and the output of this NAND gate constitutes the BRCL clock signal supplied to the bus register 108 (FIG. 4a).

In FIG. 16B a second portion of the clock logic 152 is illustrated, wherein the description that follows ties in with and relates to the above description of the circuitry in FIG. 16A. The instruction register parallel control signal (IRP) from the PLA 190 is provided as an input to an inverter 700. The output of the inverter 700 is coupled to one of five inputs of a NAND gate 702, and to one of two inputs of a NAND gate 704. The instruction register serial signal (IRS) from the PLA 190 is provided as an input to an inverter 706, and the output of this inverter is supplied to one of three inputs of a NAND gate 708. The outputs of the NAND gates 702 and 708 are coupled to two inputs of a NAND gate 710. The output of the NAND gate 702 is also coupled to the input of an inverter 712. The output of the inverter 712 constitutes the instruction register parallel clock signal (IRPCL) provided on the line 105a. The output of the NAND gate 710 constitutes the instruction register serial clock signal (IRSCL) supplied on the line 105b.

The output of the inverter 680 (FIG. 16A) is coupled to one of three inputs of a NAND gate 714 (FIG. 16B), to the second input of the NAND gate 704, and to one of three inputs of a NAND gate 716. The not true ($\overline{Q}$) output of the flipflop 650 (FIG. 16A) is also provided as the second input to the NAND gate 714 (FIG. 16B). The output of the inverter 692 (FIG. 16A) is provided as the third input of the NAND gate 714 (FIG. 16A) and to a second input of the NAND gate 716. The outputs of the NAND gates 714 and 704 are coupled to inputs of inverters 718 and 719, respectively. The output of the inverter 718 constitutes the bus register parallel enable signal (BRPE), and the output of the inverter 719 constitutes the instruction register parallel enable signal (IRPE).

The program counter select (PCS) signal from the PLA 190 is provided as input to an inverter 720, and the output of this inverter is coupled to one of three inputs of a NAND gate 722. The bus register output signal (BRO) from the PLA 190 is coupled to the data (D) input of a flipflop 724. The true (Q) output of the flipflop 724 is coupled to one of three inputs of a NAND gate 726, and the output of this NAND gate is coupled to the input of an inverter 728. The output of the inverter 728 is coupled to the line 107c which transmits the bus register output enable signal (BROE). The output of the NAND gate 716 is coupled to the second input of the NAND gate 726. The output of the NAND gate 722 is coupled to the input of an inverter 730, and the output of this inverter is coupled to the line 144, which transmits the program counter clock signal (PCCL).

The true (Q) output of the flipflop 694 (FIG. 16A) is coupled to one of three inputs of a NAND gate 732 (FIG. 16B). The output of the inverter 682 (FIG. 16A) is coupled to a second input of the NAND gate 732 shown in FIG. 16B. The output of the NAND gate 732 is coupled to one of three inputs of a NAND gate 734 shown in FIG. 16C. The output of the NAND gate 666 (FIG. 16A) is coupled to one of two inputs of a NAND gate 736 on FIG. 16C. The output of the NAND gate 736 is coupled to a second input of the NAND gate 734. The output of the NAND gate 734 is coupled to an input of an inverter 738, and the output of this inverter is coupled to the data (D) input of a flipflop 740. The true (Q) output of the flipflop 740 is coupled to the data (D) input of a flipflop 742. The true (Q) output of the flipflop 742 is coupled to the second input of the NAND gate 746, a second input of the NAND gate 744, a second input of the NAND gate 736, to the data (D) input of the flipflop 748 and another input of the NAND gate 762 in FIG. 16B. The true (Q) output of the flipflop 748 is coupled to one of three inputs of a NAND gate 750, one of two inputs of a NAND gate 752, and to one of two inputs of a NAND gate 754 shown in FIG. 16B. The not true ($\bar{Q}$) output of the flipflop 742 is coupled to one of two inputs of a NAND gate 756 in FIG. 16B., to the input of an inverter 758 also on FIG. 16B, and is provided as an output signal from the clock logic, which output signal is designated herein as NB. The not true ($\bar{Q}$) output of the flipflop 748 is coupled to the input of an inverter 760, and the output of this inverter is coupled to one of four inputs of a NAND gate 762 (FIG. 16B), the second input of the NAND gate 756, and the third input of the NAND gate 726 also shown in FIG. 16b.

The output of the inverter 749 constitutes the nibble A timing signal (NA). In addition, the output of the inverter 749 is coupled to a second input of the NAND gate 750. The output of the NAND gate 750 (FIG. 16C) is coupled to the second input of the NAND gate 752, and to the input of an inverter 764. The output of the inverter 764 is coupled to one of four inputs of an AND gate 766, and to a third input of the NAND gate 732 shown in FIG. 16B. In addition, the output of the inverter 764 constitutes the N1X1 signal supplied to the carry logic 530. The output of the NAND gate 752 is coupled to the second input of the NAND gate 734. The output of the NAND gate 746 constitutes an inverted state of the PLA signal from the clock logic 152, (an inversion of waveform 162, FIG. 5). The output of the NAND gte 744 is coupled to the input of an inverter 766, and the output of this inverter constitutes the go the PLA (GTPLA) output signal from the clock logic 152.

Referring again to FIG. 16B, the output of the NAND gate 754 is coupled to the second input of the NAND gate 722, and to one of two inputs of a NAND gate 768, to a second input of the NAND gate 708, and to another input of the NAND gate 696 as shown in FIG. 16A. The output of the NAND gate 768 shown in FIG. 16B is coupled to the input of an inverter 770, and the output of this inverter constitutes the CLOCK signal of the CPU 52. This CLOCK signal is coupled to the clock (CP) inputs of flipflops 654, 655, 656, 653, 652 and 650 as shown in FIG. 16B. In addition, the CLOCK signal at the output of the inverter 770 is coupled to the clock (CP) of the flipflop 724 shown in FIG. 16B.

Referring again to FIG. 16C, the oscillator input connection to the CPU 52 (OSC), supplied on the line 92, is provided as an input to an inverter 792. The XTL signal to the CPU 52 supplied on the line 94, is coupled to the output of the inverter 792, to the input of an inverter 794, to one of the four inputs to the AND gate 766, and to the clock (CP) input of a flipflop 796. The output of the inverter 794 constitutes the CLK OUT output signal supplied on the line 96 from the CPU 52. The output of the AND gate 766 is coupled to the preset direct (PD) input of the flipflop 796. The not true ($\bar{Q}$) output of the flipflop 796 is coupled back to the data (D) input of this flipflop and to another input of the NAND.gate 766. In addition, the not true output of the flipflop 796 is coupled to the input of an inverter 798, and the output of this inverter is coupled to another input of the NAND gate 744, another input of the NAND gate 762 shown in FIG. 16B, the third input of the NAND gate 722 and the second input of the NAND gate 768 also shown in FIG. 16B.

The true (Q) output of the flipflop 796 is coupled to the input of an inverter 800, to the clock (CP) inputs of the flipflops 740, 742, and 748. In addition, the true output of the flipflop 796 is coupled to the clock (CP) input of the flipflop 694 shown in FIG. 16A. The output of the inverter 800 is coupled to the input of another inverter 801, and the output of this inverter is coupled to the third input of a NAND gate 708 shown in FIG. 16B, another input of the NAND gate 702 also shown in FIG. 16B and to third inputs of the NAND gates 696 and 697 shown in FIG. 16A.

The RESET signal supplied to the CPU 52 on the line 98 is provided as an input to an inverter 802, and the output of this inverter is coupled to the data (D) and preset direct inputs of a flipflop 804. The true (Q) output of the flipflop 804 constitutes the L RESET signal from the clock logic 152. This LRESET signal is also coupled to the preset direct (PD) inputs of the flipflop 652, 653, and 655 and clear direct (CD) inputs of flipflops 656 and 654, as shown in FIG. 16A. The not true (Q) output of the flipflop 804 is coupled to the third input of the NAND gate 750, and to the second input of the NAND gate 666 as shown in FIG. 16A. Referring again to FIG. 16A, the output of the inverter 674 is also coupled to a third input of the NAND gate 762 shown in FIG. 16B and to the clock (CP) input of the flipflop 804 in FIG. 16C.

The flipflops 740, 742 and 748 form a nibble timing register. In particular, flipflip 740 provides the NA nibble timing signal, flipflop 742 provides the NB nibble timing signal, and the flipflop 748 provides the NC nibble timing signal. The table set forth below better illustrates the function of the flipflop 740, 742 and 748.

| (740) NA | (742) NB | (748) NC | State |
|---|---|---|---|
| 0 | 1 | 1 | PLA |
| 0 | 0 | 1 | Nibble Zero ($N_0$) |
| 0 | 0 | 0 | Nibble 1 ($N_1$) |
| 1 | 0 | 0 | Nibble 2 ($N_2$) |
| 1 | 1 | 0 | Nibble 3 ($N_3$) |
| 1 | 1 | 1 | SYN |

When the nibble timing register reaches the nibble 3 state (110), the memory lines ($M_0$, $M_1$ and $M_2$) are tested by means of gates 658, 664, and 668 (FIG. 16A) to determine whether or not the next step is a memory operation. If no memory operation is detected during this cycle, then the nibble timing register is forced back to the PLA state (011). The GTPLA signal is subsequently generated by means of the NAND gates 734 and 744.

On the other hand, if the memory lines indicate that a memory operation is to take place, then the nibble timing register goes to the SYN state (111). The next step is to test the MEM. BUSY signal line by means of the NAND gate 664. If the memory is indicated as being busy then the CPU waits. When the memory is no longer busy as represented by a change in state of the MEM BUSY signal line 77, the SYN signal is generated.

Figure 17:
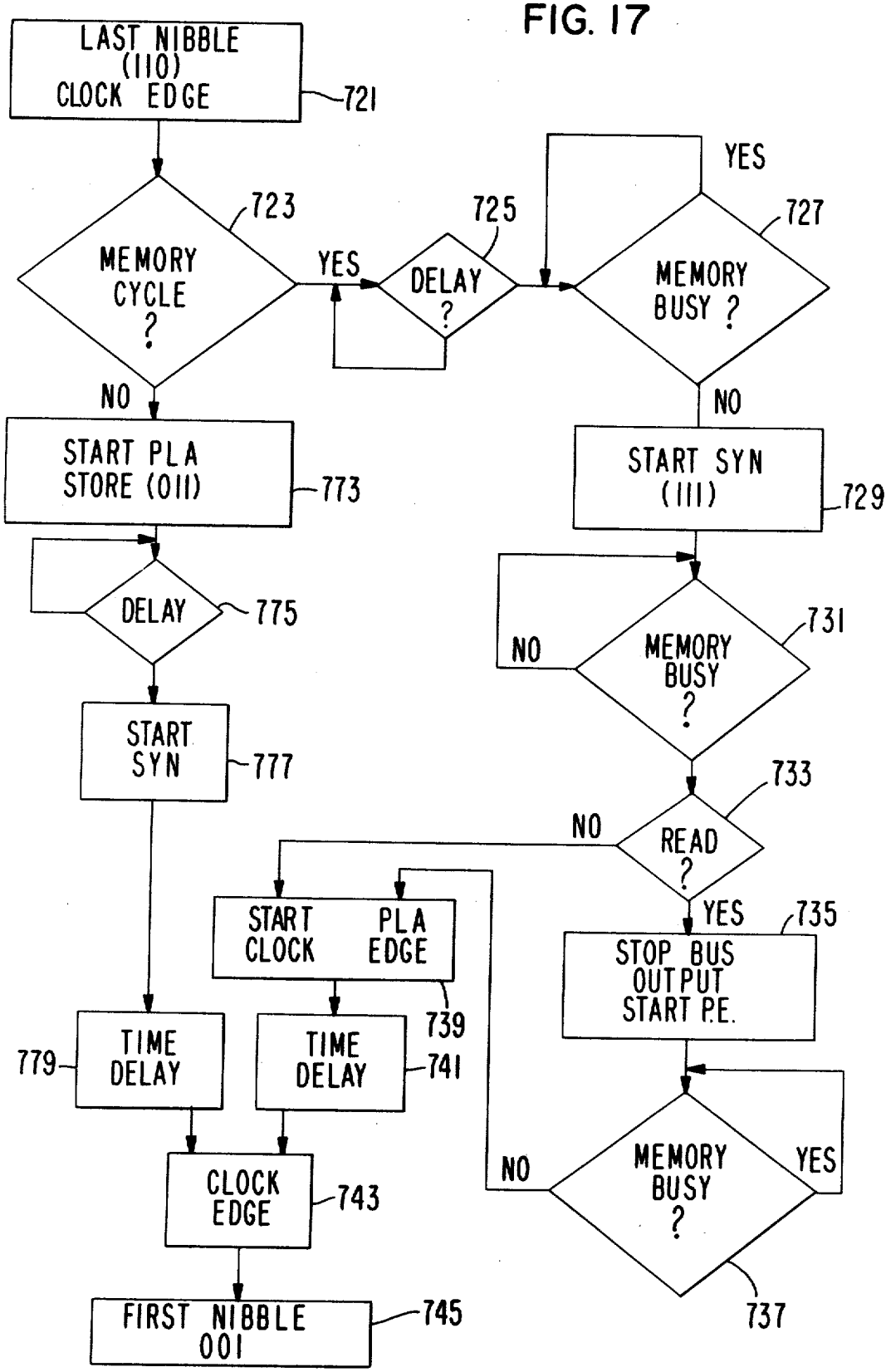
FIG. 17 is a flow chart illustrating the operation of the clock logic.
Figure 18:
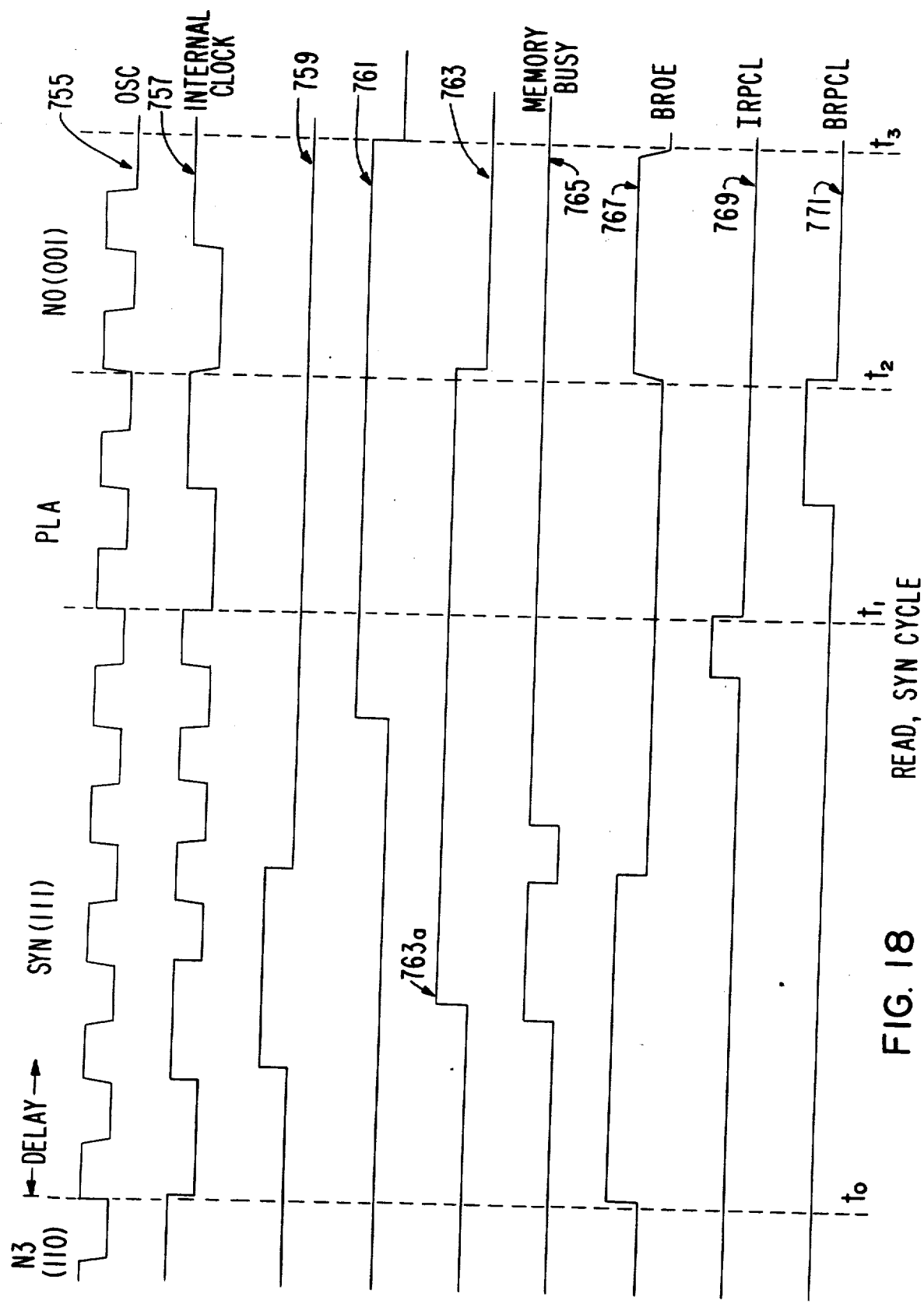
FIGS. 18 and 19 are timing diagrams to further explain operation of the clock logic.
Figure 19:
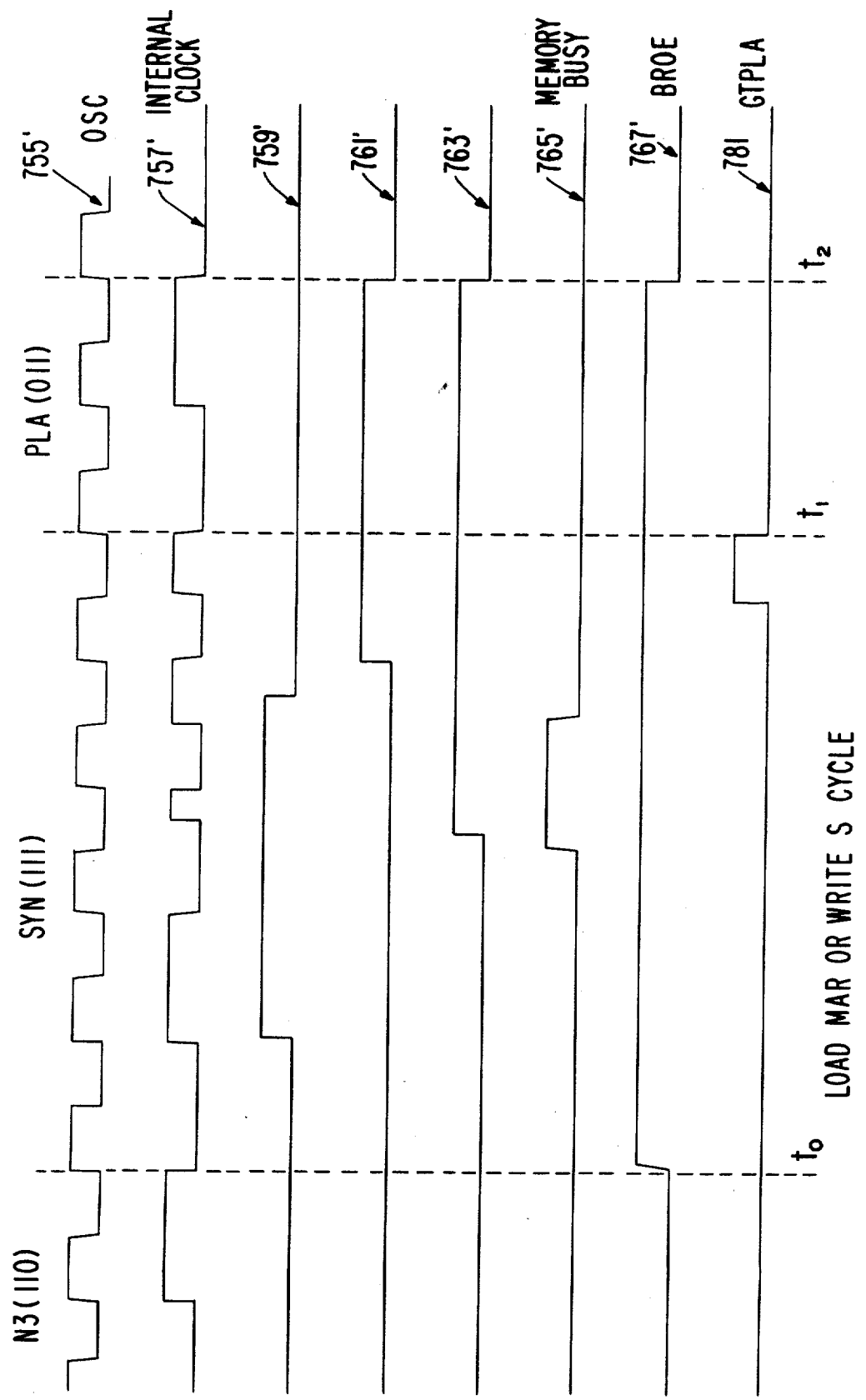
Figure 20:
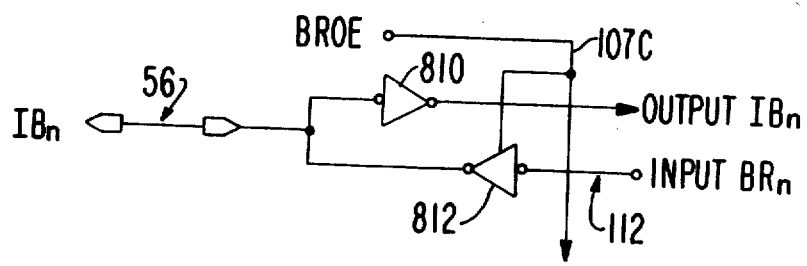
FIG. 20 is a detailed circuit diagram of a single bit position of the information bus.

To better illustrate the opertion of the clock logic circuitry described above, reference is made to the flow chart illustrated in FIG. 17, and the timing diagrams illustrated in FIGS. 18, 19 and 20. Block 721 represents the nibble timing register as being in the last nibble state (N3 or 110). On the next clock edge a test is made as to whether or not the next step is a memory operation. This test is represented in FIG. 17 by a diamond 723. The NAND gate 666 (FIG. 16A) being active indicates a memory operation, while the NAND gate 658 being active indicates no memory operation follows.

Assume first that the next step is a memory operation. Then a minimum delay equal to one oscillator cycle or one-half an internal clock cycle is effected by the NAND gate 762 (FIG. 16B) and is represented in FIG. 17 by a diamond 725. This delay is necessary to assure that all gates have settled down following any transitions caused by changing states. Following this minimum delay, a test is made as to whether or not the memory is busy as represented by a diamond 727 in FIG. 17. The test for memory busy is effected by the NAND gate 664 in FIG. 16A.

When the memory is not busy, as indicated by a high level on the MEM. BSY. line 77, then the SYN state (111) is established in the nibble timing register (flip-flops 740, 742 and 748, FIG. 16C), which is represented in FIG. 17 by a block 729. The SYN signal is provided by means of the NAND gate 672 (FIG. 16A) on the line 61, and is supplied to the memory.

The memory is again tested for being busy as represented by a diamond 731, which test is effected this time by means of the NAND gate 684 (FIG. 16A). The memory should now be busy in response to the SYN signal. Next, a test is made as the whether or not the memory operation is a READ operation, which is represented by a diamond 733. Assuming that the memory cycle is a READ operation, then the Bus Register Output is disabled by means of gate 716. In addition, the Bus Register Parallel Enable (BRPE) signal is active by means of the NAND gate 714 (FIG. 16B). This operation is represented in FIG. 17 by means of a block 735.

The memory is again tested for being busy as represented by a diamond 737. This time the memory is being tested to determine if the READ operation has been completed. Next, the PLA state is initiated on the subsequent clock edge as represented by a block 739. This operation is effected by means of the AND gate 678 (FIG. 16A), the flipflop 694, and the NAND gate 732 (FIG. 16B). A time delay occurs until the subsequent clock edge as represented by blocks 741 and 743 in FIG. 17. Following the clock edge, the nibble state register is returned to the first nibble (001) by means of the NAND gate 756 (FIG. 16B) as represented by block 745 in FIG. 17.

The timing diagram shown in FIG. 18 further illustrates a portion of the above-described operation of the clock logic. Waveform 755 illustrates the oscillator signal supplied on the input line 92. Waveform 757 illustrates the internal clock signal derived from the oscillator.

Prior to time $t_0$, the nibble timing register is in the fourth which is the last nibble state (N3, or 110). Between times $t_0$ and $t_1$ the timing register is in the SYN state or 111. Note that the internal clock doubles in frequency, following a "delay", during the SYN state, which doubled frequency equals the frequency of the oscillator. The internal clock frequency changes back to half that of the oscillator during PLA state between times $t_1$ and $t_2$.

Waveform 759 illustrates the output of the NAND gate 690 (FIG. 16A) during the SYN state, and waveform 761 illustrates the true (Q) output of the flipflop 694 during the SYN and PLA states as well as during the first nibble state (N0 or 001) between times $t_2$ and $t_3$.

Waveform 763 illustrates the output of the NAND gate 672 (FIG. 16A). Waveform 765 illustrates the memory busy signal supplied on the line 77, and waveform 767 illustrates the Bus Register Output Enable signal (BROE) supplied on the line 107c.

Waveform 763 changes from a low level to a high level at point 763a in response to waveforms 759 and 765 being at a high level coupled with a positive transition of the internal clock signal (waveform 757). In addition, the internal clock signal changes to a higher frequency in response to waveform 763 being at a high level. The high level of waveform 763 at point 763a causes the BROE signal (waveform 767) to drop to a low level. Subsequently, the IRPCL signal (waveform 769) goes to a high level in response to waveforms 757, 761, 763 and IRP from PLA 190 being at a high level. At time $t_1$, or the beginning of the PLA state, the IRPCL signal drops back to a low level in response to the negative transition of the internal clock signal (waveform 757) dropping to a low level.

The BRPCL signal goes to a high level during the PLA state in response to the positive cycle of the internal clock in combination with waveforms 761 and 763 being at a high level and not true ($\overline{Q}$) of flipflop 650 which stores the BRP (154a) of PLA 190. The BRPCL signal drops to a low level on the subsequent low-level transition of the internal clock signal. Accordingly, data on the information bus are loaded into the instruction register before the PLA state, and the bus register is loaded with data during the PLA state. Either BRPCL or IRPCL are used for fetch of Data to Bus Register 108 or fetch of an instruction to the Instruction Register 106.

Returning to the diamond 723 in FIG. 17, assume now that the next operation is not a memory cycle. Then, the PLA state is established in the nibble timing register by means of the NAND gate 658 (FIG. 16A). This operation is depicted in FIG. 17 by means of a block 773. Next, a time delay is effected by means of the NAND gate 762 as represented by a diamond 775 in FIG. 17. Subsequently, the SYN state is established by means of the NAND gate 668 and 672 in FIG. 16A, as represented by a block 777 in FIG. 17. Another time delay occurs until the next clock edge as represented by a block 779 and the block 743 before returning to the first nibble (001).

The timing diagram shown in FIG. 19 illustrates a Load MAR (memory address register) or Write cycle of operation. Waveforms 755' and 757' illustrate the oscillator and internal clock, respectively. Waveform 759' illustrates the output of the NAND gate 690 (FIG. 16A), and waveform 761' illustrates the true (Q) output of the flipflop 694. Waveform 763' illustrates the output of the NAND gate 672 (FIG. 16A) while waveform 765' illustrates the MEM BSY signal supplied on the line 77. Waveform 767' illustrates the BROE signal, and waveform 781 illustrates the GTPLA signal supplied by gates 744 and 766 (FIG. 16C).

The waveform 763' goes to a high level as a function of both waveforms 765' (Memory Busy) and 759' being at a high level. When the memory busy signal drops to a low level, waveform 759' also drops to a low level. Note that the GTPLA signal goes to a high level near the end of the SNY state (times $t_0$ to $t_1$), which is a function of both the internal clock (waveform 757') and the waveform 761' both being at a high level. The GTPLA signal drops back to a low level at time $t_1$, which is the beginning of the PLA state, on the next negative transition of the internal clock signal. Note that the BROE signal is at a high level during both the SYN and PLA states, which allows the bus register to supply data on the information bus to the memory.

Referring now to FIG. 20, a signal bit position of the information bus 56 is illustrated. Each of the data bus connections to the CPU 52 is coupled to inputs of amplifiers, such as amplifier 810, and the output of these amplifiers constitute the information bus signal lines ($IB_n$) within the CPU 52. The bus register signals supplied on the lines 112 ($BR_n$) are provided as inputs to other amplifiers, such as amplifier 812, and the outputs of these amplifiers are coupled back to inputs of the first amplifiers (e.g., amplifier 810), and to individual bit positions of the bus register 56. The amplifiers 812 et seq are tri-state devices such that the outputs thereof are at a high level, a low level, or at a high impedance depending upon the status of a control input signal. The control input signal supplied to the amplifiers 812 et seq is the Bus Register Output Enable signal (BROE) supplied on the line 107c.

Figure 21:
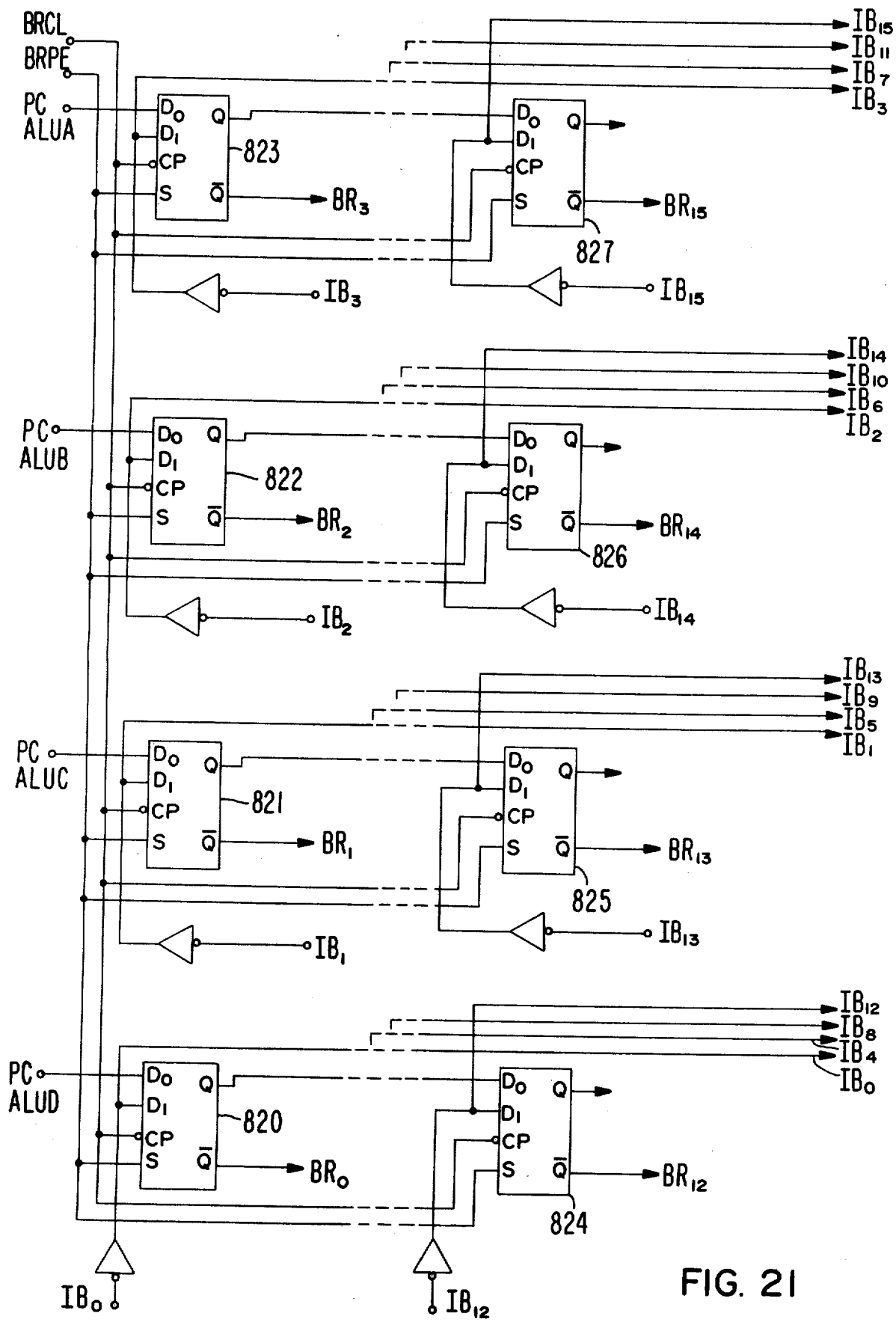
FIG. 21 is a detailed circuit diagram of a portion of the bus register.

Referring now to FIG. 21, a logic diagram of the bus register 108 is illustrated. Only one half (8) of the flipflops comprising the bus register 108 are illustrated for simplification of the drawings. Each bit position of the information bus, i.e., $IB_0$ through $IB_{15}$ are provided as inputs to inverters and the output of these inverters are coupled to the second data ($D_1$) inputs of the flipflops forming the bus register. The not true ($\bar{Q}$) outputs of the flipflops of the bus register constitute the bus register output signals ($BR_0$ through $BR_{15}$) supplied on the lines 112. The clock (CP) inputs of the flipflops forming the bus register are coupled to the BRCL clock signal from the clock logic 152. The select (S) inputs of these flipflops are coupled to the Bus Register Parallel Enable signal (BRPE).

Referring briefly to FIG. 4a, note that the bus r register 108 accepts data from the information bus 56 or from the bus register multiplexer 122. To effect this selection of data to be loaded into the bus register 108, the flipflops of the bus register will load data either into the first data ($D_0$) input thereof or the second data ($D_1$) input depending upon the status of the BRPE signal supplied at the Select inputs of these flip-flops. If, for example, data are loaded from the bus register multiplexer 122 such data will constitute a four bit nibble. Accordingly, this four bit nibble is loaded into the first four flipflops of the bus register. In particular, these first four flipflops are identified herein as flipflops 820 through 823. The output of the bus register multiplexer 122 is identified herein as PC ALU A through ALU D, which comprise the input signals coupled to the first data ($D_0$) inputs of the flipflops 820 through 823. The true (Q) outputs of the flipflops 820 through 823 are coupled to first data ($D_0$) inputs of the next bank of flipflops (not shown), which form another part of the bus register 108. The true outputs of the next to last bank of flipflops (not shown) forming the bus register are coupled to the first data ($D_o$) inputs of flipflops 824 through 827. In this manner, the four bit nibble supplied at the output of the bus register multiplexer 122 is loaded into the bus register 108 in a parallel by bit and serial by nibble fashion.

Figure 22:
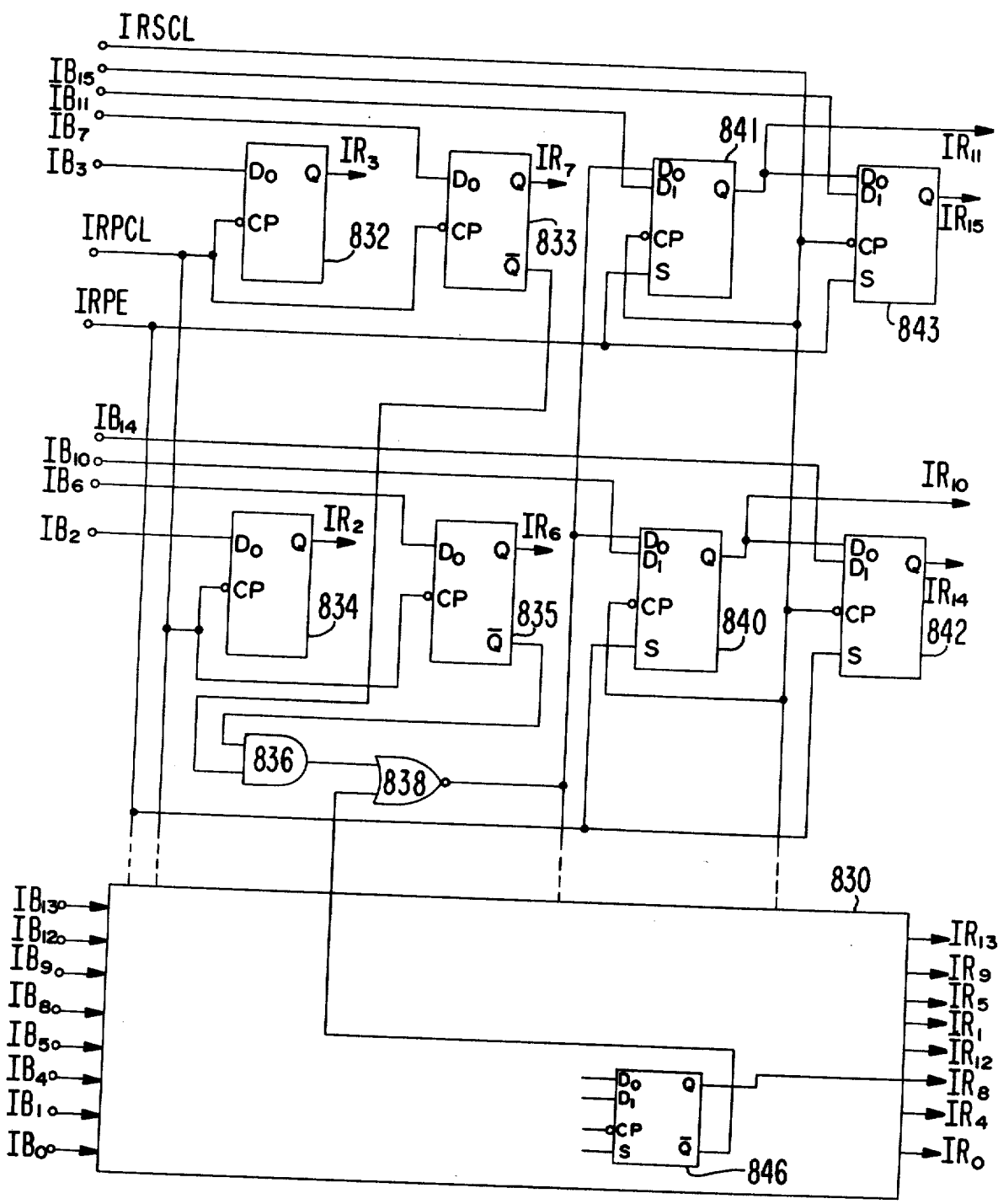
FIG. 22 is a detailed circuit diagram of a portion of the instruction register.

Referring now to FIG. 22, a logic circuit diagram of the instruction register 106 is illustrated. In FIG. 22 only one half of the flipflops forming the instruction register are illustrated for simplification of the drawings. The second half of the instruction register is illustrated by a block 830. The instruction register parallel clock signal (IRPCL) is coupled to the clock (CP) inputs of flipflops 832, 833, 834 and 835 which from the second, third, sixth and seventh bit positions of the instruction register ($IR_2$, $IR_3$, $IR_6$ and $IR_7$). In addition, the IRPCL clock signal is supplied to corresponding flipflops (not shown) within the block 830. The second bit position of the information bus ($IB_2$) is coupled to the first data ($D_o$) input of the flipflop 834. In similar manner, the third, sixth and seventh bit positions of the information bus ($IB_3$, $IB_6$ and $IB_7$) are provided to the first data ($D_o$) inputs of the flipflops 832, 835 and 833, respectively. The true (Q) outputs of the flipflops 832 through 835 constitute the third, seventh, second and sixth positions of the instruction register ($IR_3$, $IR_7$, $IR_2$ and $IR_6$).

The not true ($\bar{Q}$) output of the flipflop 833 is coupled to one of two inputs of an AND gate 836. The not true ($\bar{Q}$) output of the flipflop 835 is coupled to the second input of the AND gate 836. The output of the AND gate 836 is coupled to one of two inputs of a NOR gate 838. The output of the NOR gate 838 is coupled to the first data ($D_o$) inputs of flipflops 840 and 841. It is the function of the AND gate 836 and the NOR gate 838 to help compute an effective memory address from memory reference instructions.

The tenth and eleventh bit positions of the information bus ($IB_{10}$ and $IB_{11}$) are coupled to the second data inputs ($D_1$) of the flipflops 840 and 841. The true (Q) outputs of the flipflops 840 and 841 constitute the tenth and eleventh, respectively, outputs of the instruction register; and, also are coupled to the first data ($D_0$) inputs of flipflops 842 and 843. The first data ($D_0$) inputs of the flipflops 842 and 843 are coupled to the fourteenth and fifteenth bit positions of the information bus ($IB_{14}$ and $IB_{15}$). The true (Q) outputs of the flipflops 842 and 843 constitute the fourteenth and fifteenth bit positions of the instruction register ($IR_{14}$ and $IR_{15}$).

The Instruction Register Parallel Enable signal (IRPE) is coupled to the Select (S) inputs of the flipflops 840 through 843. In addition, the clock signal is coupled to corresponding flipflops within the block 830. The instruction register serial clock (IRSCL) signal is coupled to the clock (CP) inputs of the flipflops 840 through 843, and to corresponding flipflops within the block 830. A flipflop 846 is shown within the block 830, which flipflop constitutes the eighth bit position of the instruction register. The not true ($\bar{Q}$) output of this flipflop is coupled to the second input of the NOR gate 838.

Figure 23:
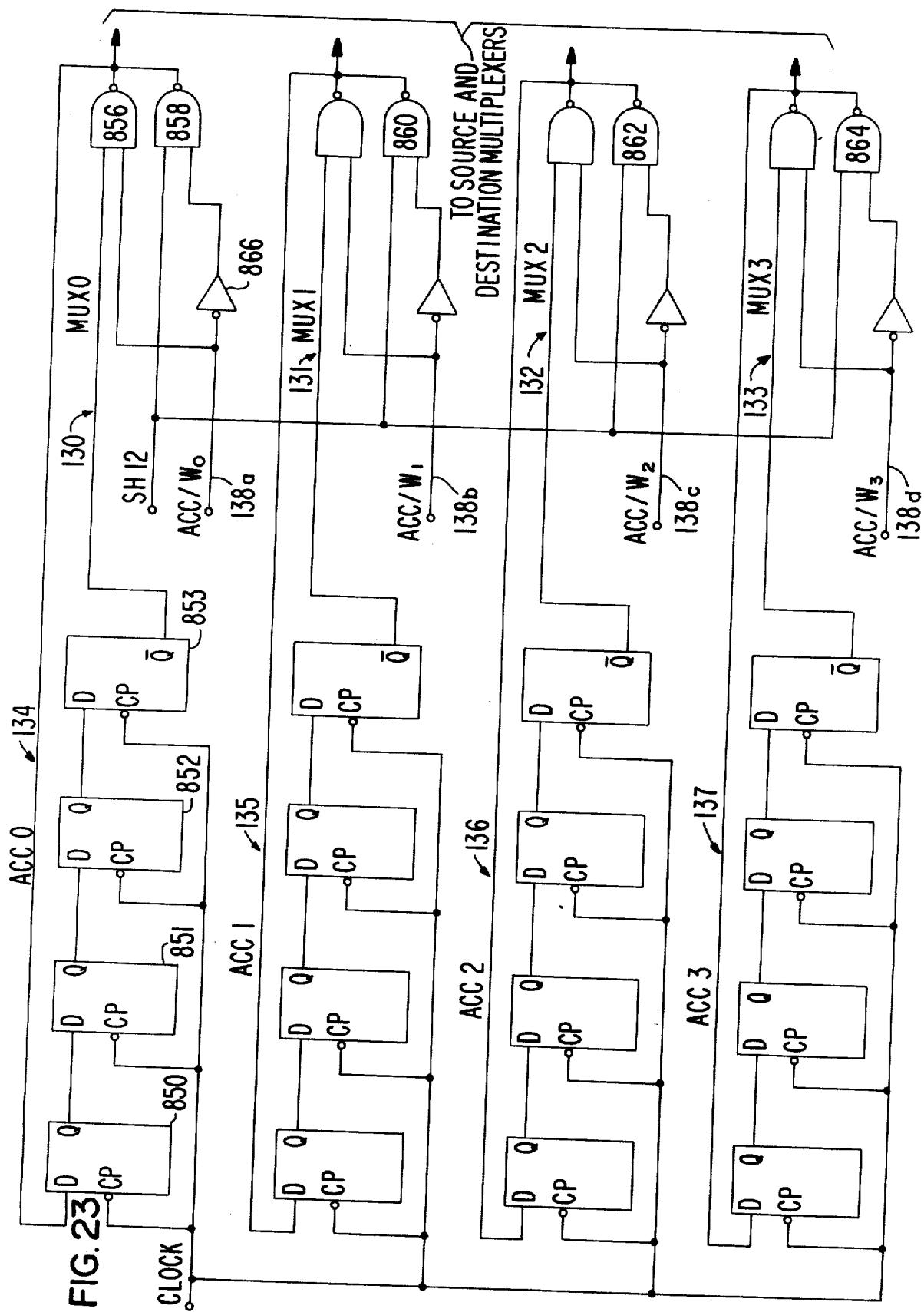
FIG. 23 is a circuit diagram of one of the multiplexer and accumulator circuits.

Referring now to FIG. 23, one fourth of each of the accumulators 134 through 137 and the multiplexers 130 through 133 is illustrated in logic diagram form. The first slice of the accumulator 134 (ACC$_0$) comprises four flipflops 850 through 853. The term "slice" as used herein refers to single bit positions of a nibble. The not true ($\overline{Q}$) output of the flipflop 853 is coupled to one of two inputs of a NAND gate 856, which NAND gate forms a part of the multiplexer 130 (MUX 0). The highest order bit position at the output of the scratch register 138 (FIG. 4a), which bit position is designated herein as SH12 is coupled to one of two inputs of the NAND gate 853 in the multiplexer 130, one of two inputs of a NAND gate 860 in the multiplexer 131, to one of two inputs of a NAND gate 862 in the multiplexer 132 and to one of two inputs of a NAND gate 864 in the mutliplexer 133. The accumulator write zero signal (ACC/W$_0$) supplied on the line 138 is provided as the second input of the NAND gate 856 in the multiplexer 130, and as the input of an inverter 866. The output of the inverter 866 is coupled to the second input of the NAND gate 858. The outputs of the NAND gates 856 and 858 are coupled together and this connection is coupled back to the data (D) input of the flipflop 850, and also is provided as an input to the source destination multiplexers 114 and 116 (FIG. 4a). The true (Q) output of the flipflop 850 is coupled to the data (D) input of the flipflop 851 and the outputs of the flipflops 851 and 852 are coupled in a similar fashion.

The accumulators 135 through 137 and the multiplexers 131 through 133 are connected together in the same fashion as that described hereinabove for the accumulator 134 and the multiplexer 130.

Accordingly, data are entered into a multiplexer, such as the multiplexer 130 from either the scratch register 128 by means of line SH12, or from the output of the flipflop 853 in accordance with the status of the accumulator write signal supplied on the line 138a. Also, data provided at the output of each of the multiplexers, such as multiplexer 130 is coupled back as an input to the corresponding accumulator such as accumulator 134 to re-store this data in the accumulator.

Figure 24:
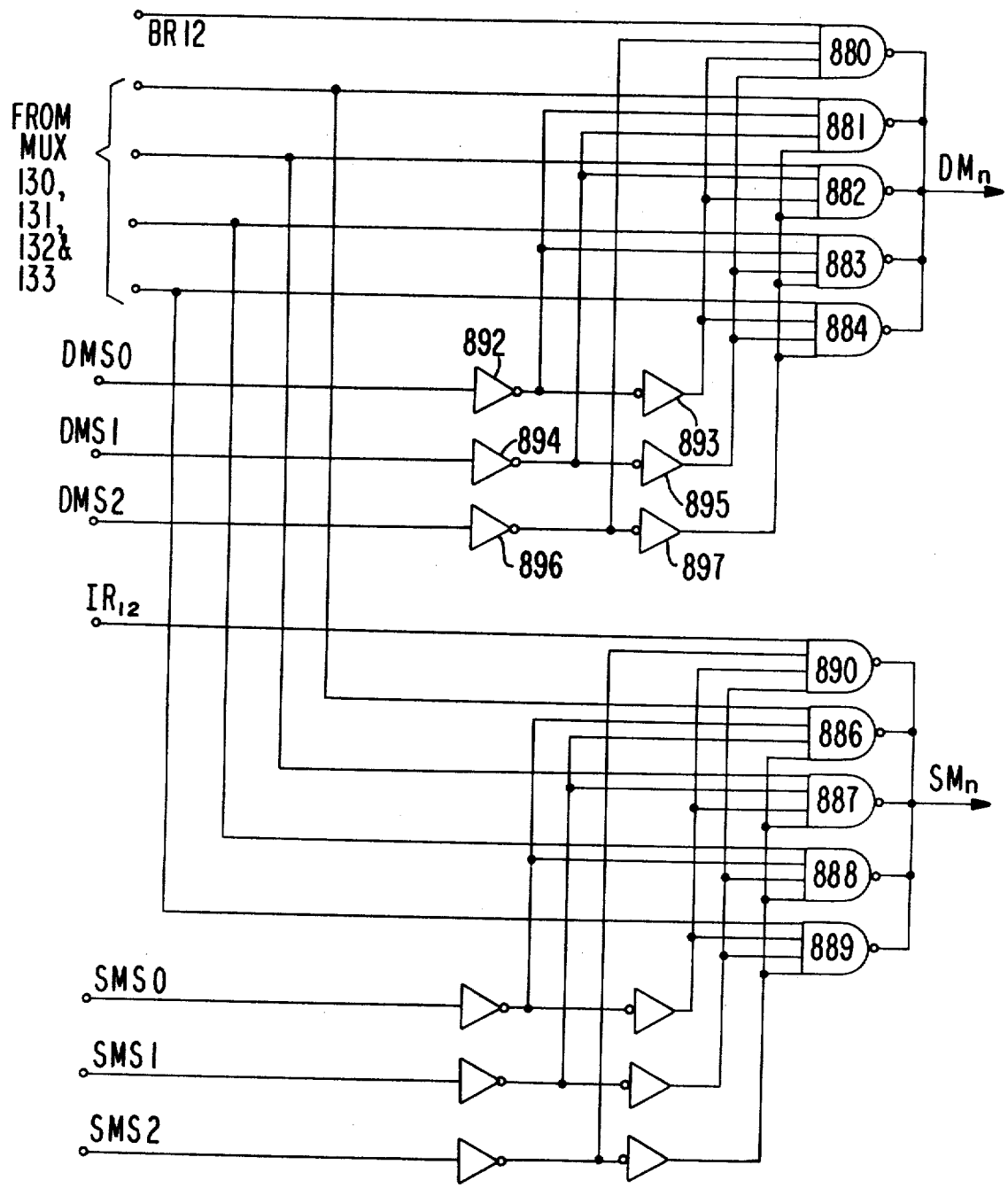
FIG. 24 is a detailed circuit diagram of a portion of the destination and source multiplexers.

Referring now to FIG. 24, a detailed logic diagram of a portion of the destination and source multiplexers 116 and 114 are illustrated. The twelfth bit position of the bus register (BR$_{12}$) is provided as one of four inputs to a NAND gate 880. The four outputs from multiplexers 130, 131, 132 and 133 are coupled to one of four inputs of NAND gates 881 through 884, respectively; and, these outputs are also coupled to one of four inputs of NAND gates 886 through 889, The twelfth bit position of the instruction register (IR$_{12}$) is coupled to one of four inputs of a NAND gate 890. The NAND gates 880 through 884 comprise one slice of a nibble of the destination multiplexer 116. The NAND gates 886 through 890 form one slide of a nibble of the source multiplexer 114.

As stated hereinabove, operation of the destination multiplexer is controlled by the DMS0 through DMS2 select signals. In particular, the DMS0 select signal is provided as the input of an inverter 892, and the output of this inverter is coupled to the input of an inverter 893 and to second inputs of NAND gates 881 and 883. The destination multiplexer select signal 1 (DMS1) is provided as the input to an inverter 894, and the output of this inverter is coupled to the input of another inverter 895, and to second inputs of the NAND gates 881 and 882. The DMS2 select signal is provided as the input of an inverter 896, and the output of this inverter is coupled to the input of inverter 897 and to a second input of the NAND gate 880. The output of the inverter 893 is coupled to the second input of the NAND gates 884, 882, and to a third input of the NAND gate 880. The output of the inverter 895 is coupled to the third input of the NAND gate 884, the third input of the NAND gate 883 and to the third input of the NAND gate 880. The output of the inverter 897 is coupled to the fourth input of the NAND gates 884, 883, 882 and 881.

Figure 25:
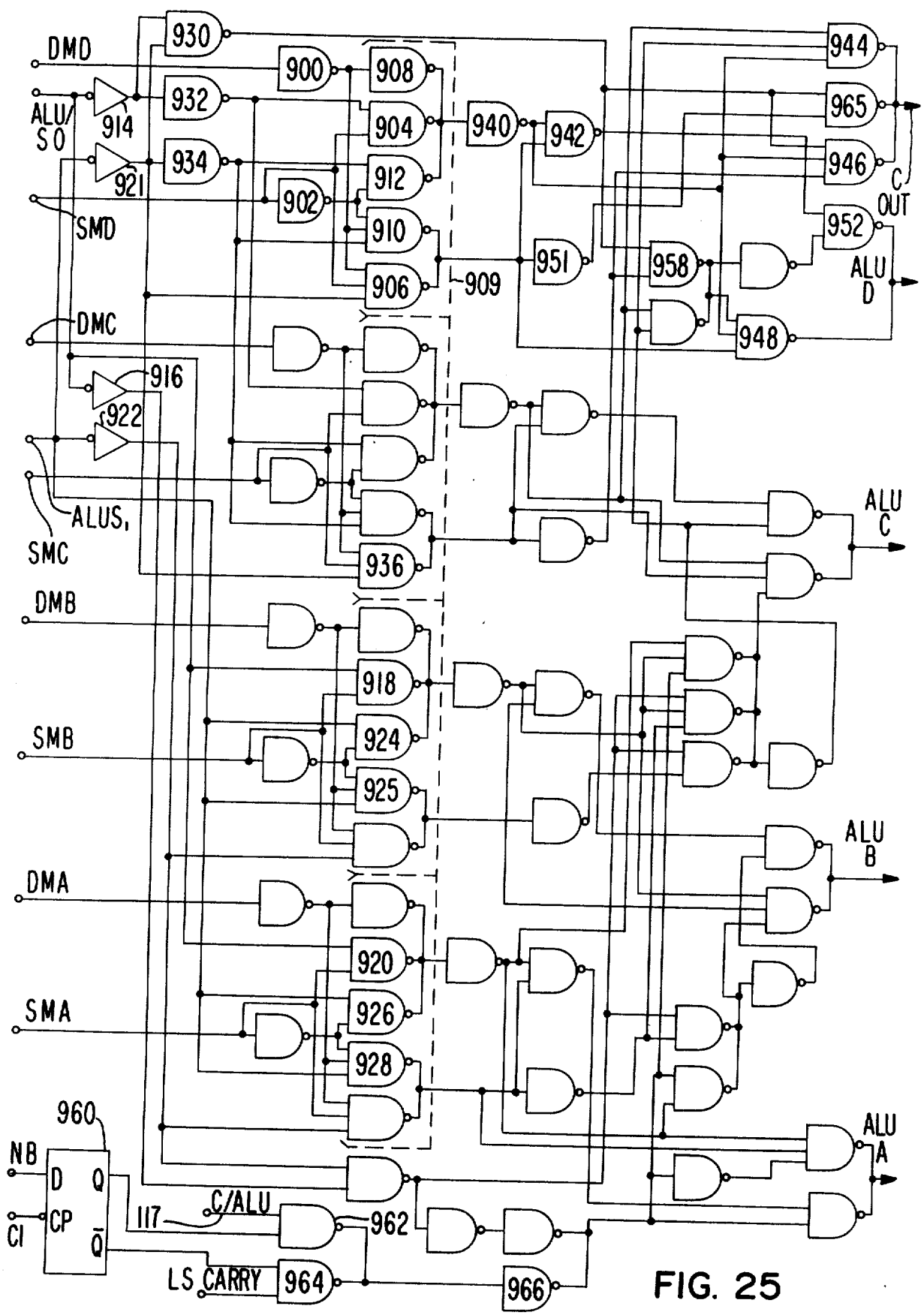
FIG. 25 is a detailed circuit diagram of the ALU.

Referring now to FIG. 25 a detailed logic diagram of ALU 118 is illustrated. The first operand provided at the input of the ALU 118 is supplied from the source multiplexer 114 (FIG. 4a). This first operand is a four bit nibble and each bit thereof is identified in FIG. 22 as SMA, SMB, SMC and SMD. The second operand provided to the ALU 118 is from the destination multiplexer 116, which also comprises a four bit nibble. Each bit of this four bit nibble is identified in FIG. 22 as DMA, DMB, DMC and DMD. The D bit position from the destination multiplexer 116 (DMD) is provided as a single input to a NAND gate 900. The D bit position from the source multiplexer 114 (SMD) is provided as a single input to a NAND gate 902, to one of two inputs of a NAND gate 904, and to one of three inputs of a NAND gate 906. The output of the NAND gate 900 is provided as single input to a NAND gate 908, to one of three inputs of a NAND gate 910 and to the second input of the NAND gate 906. The output of the NAND gate 902 is provided as one of two inputs to a NAND gate 912, and to a second input of the NAND gate 910. The ALU select signal zero (ALU/S0) is provided as an input to an inverter 914, to an input of another inverter 916, to one of two inputs of a NAND gate 918, and to one of two inputs of a NAND gate 920. The second select signal for the ALU (ALU/S1) is provided as inputs to inverters 921 and 922, one of two inputs of a NAND gate 924, one of three inputs of a NAND gate 925, one of two inputs of a NAND gate 926, and to one of three inputs of a NAND gate 928.

The output of the inverter 914 is coupled to one of two inputs of a NAND gate 930 and to a single input of a NAND gate 932. The output of the inverter 921 is coupled to a single input of the NAND gate 934, to the third input of the NAND gate 906, and to one o' three inputs of a NAND gate 936.

The outputs of the NAND gates 904, 908 and 912 are coupled together and this connection is coupled to the single input of a NAND gate 940. The output of the NAND gate 940 is coupled to one of two inputs of a NAND gate 942, to one of three inputs of a NAND gate 944, to one of three inputs of a NAND gate 946, and to one of three inputs of a NAND gate 948. The outputs of the NAND gates 906 and 910 are coupled together and this connection is coupled to the second input of the NAND gate 942, to a single input of the NAND gate 951 and to a second input of the NAND gate 948. The output of the NAND gate 942 is coupled to one of two inputs of a NAND gate 952. The output of the NAND gate 951 is coupled to one of two inputs of a NAND gate 956. The output of the NAND gate 930 is coupled to a second input of the NAND gate 956, a second input of the NAND gate 946, and to one of two inputs of a NAND gate 958. The outputs of the NAND gates 944, 956 and 946 are coupled together and this connection constitutes the carry out (CO) output of the ALU 118.

The outputs of the NAND gates 948 and 952 are coupled together and this connection constitutes the D bit position at the result output of the ALU (ALU D).

The arithmetic logic unit shown in FIG. 25 is substantially the same as a conventional ALU. The group of NAND gates 908, 904, 912, 910 and 906, which are enclosed within dashed line 909 perform the arithmetic functions. In particular, the NAND gates 908, 904 and 912 perform the summing operation for bit D, and gates 910 and 906 perform the product operation.

The remaining three bit positions of the ALU 118 are coupled together in the same fashion as described above for the D bit position, and will not be described in greater detail herein.

The NB nibble timing signal is coupled to the data (D) inputs of a flipflop 960. The clock signal (CLOCK) from the clock circuitry is coupled to the clock (CP) input of the flip-flop 960. The true (Q) output of the flipflop 960 is coupled to one of two inputs of a NAND gate 962. The second input of the NAND gate 962 is coupled to the Carry/ALU control signal provided on the line 117. The not true ($\overline{Q}$) output of the flipflop 960 is coupled to one of two inputs of a NAND gate 964. The second input of the NAND gate 964 is coupled to the latched status of the stored carry signal (LSCARRY). The outputs of the NAND gates 962 and 964 are coupled together and this connection is coupled to a single input of a NAND gate 966. It is the function of the flipflop 960 in combination with the NAND gates 962, 964 and 966 to process any carries between sequential nibbles passed through the ALU.

Arithmetic logic units are well known in the art. One example of an ALU substantially identical to ALU 118, and which operates in substantially the same way, is disclosed in a Fairchild Semiconductor publication entitled "The TTL Applications Handbook," August, 1973, at page 522 et seq. Another ALU substantially identical to ALU 118, which includes a ripple carry feature, is disclosed in U.S. Pat. No. 3,984,670 entitled "Expandable Digital Arithmetic Logic Register Stack," and is assigned to the assignee of this invention.

Figure 26:
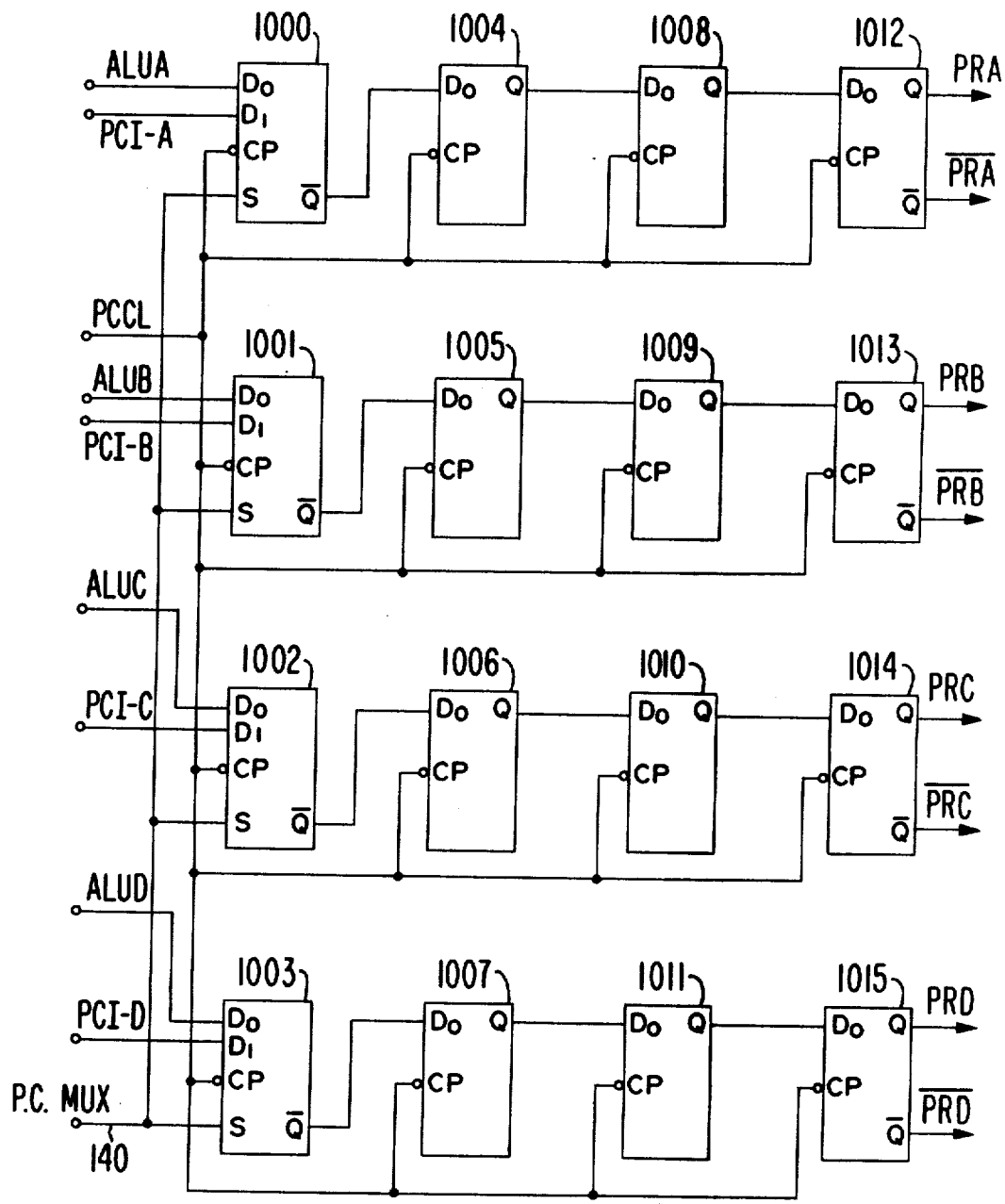
FIG. 26 is a detailed circuit diagram of the program register.

Referring now to FIG. 26, a logic diagram of the program register 142 is illustrated. Referring briefly back to FIG. 4a, note that the output of the ALU 118 and the output of the increment circuit 144 are both coupled to a program counter multiplexer 120 and the output of the multiplexer 120 is coupled to the input of the program register 142. In this embodiment, the program counter multiplexer 120 comprises four flipflops 1000 through 1003 having a select (S) input operative to select between one of the two data ($D_0$ and $D_1$) inputs to these flipflops. In addition, the flipflops 1000 through 1003 form the first nibble storage means of the program register 142.

In particular, the select (S) inputs of the flipflops 1000 through 1003 are coupled to the program counter multiplexer control signal supplied on the line 140. The first data ($D_0$) input of these flipflops are coupled to the four bit output terminals of the ALU 118 (i.e., ALU A through ALU D). The second data ($D_1$) inputs of these same flipflops are coupled to the outputs of the increment circuit 144, which are identified herein as PCI A through PCI D.

The not true ($\overline{Q}$) outputs of the flipflops 1000 through 1003 are coupled to first data ($D_0$) inputs of flipflops 1004 through 1007, respectively. In a similar manner, the true (Q) outputs of the flipflops 1004 through 1007 are coupled to the first data ($D_0$) inputs of four flipflops 1008 through 1011, respectively. In a similar manner, the outputs of the flipflops 1008 through 1011 are coupled to the data inputs of flipflops 1012 through 1015. The true (Q) outputs of the flipflops 1012 through 1015 constitute the program register output signal supplied to the increment circuit 144, and are identified herein as PRA through PRD. The not true ($\overline{Q}$) outputs of these same flipflops are also provided as inputs to the increment circuit 144, which signals are identified by the same signal names having a bar over the name and will be illustrated further hereinbelow.

The clock (CP) inputs of the flipflops 1000 through 1015 are coupled to the program counter clock signal (PCCL) from the clock logic 152.

Figure 27:
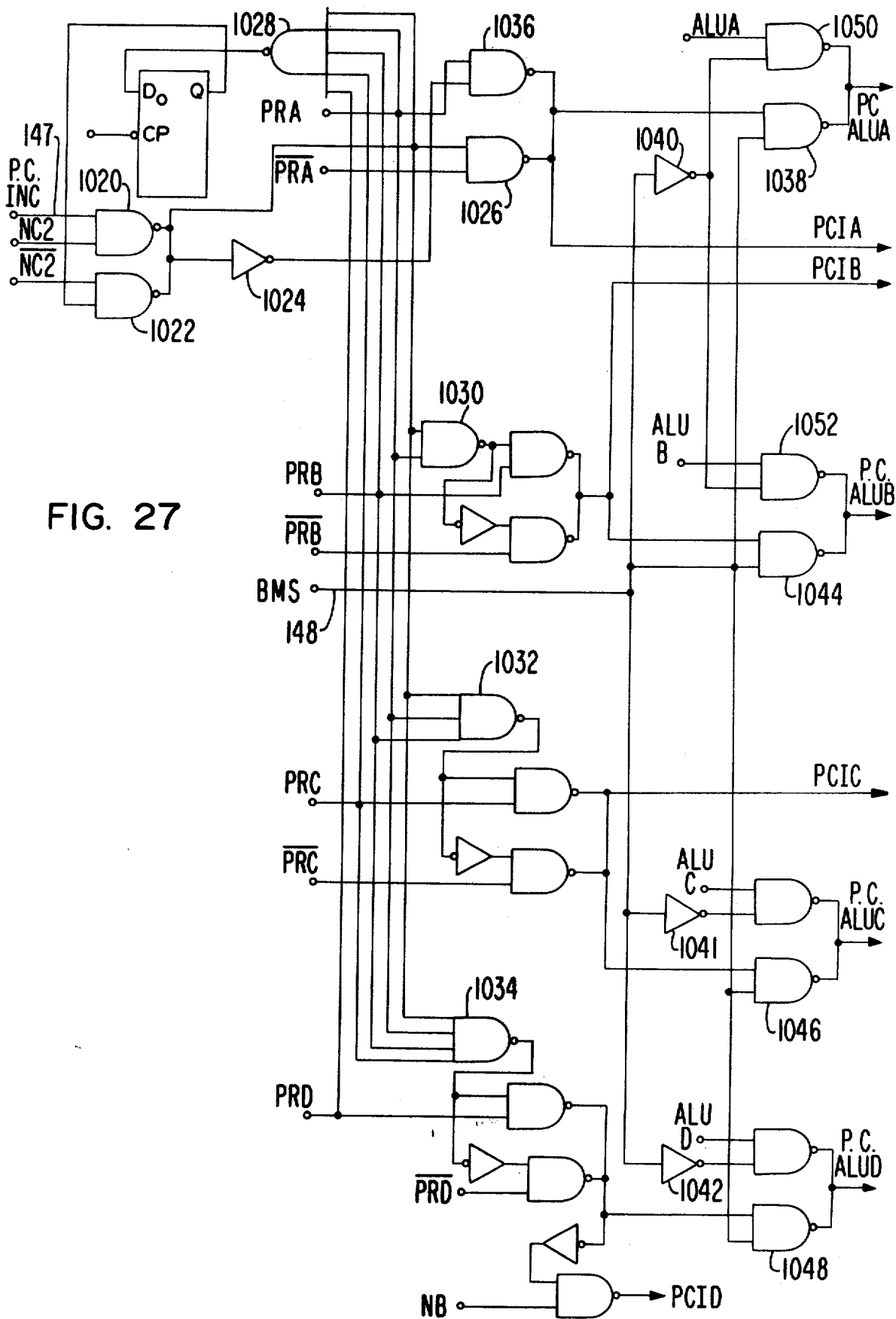
FIG. 27 is a detailed circuit diagram of the incrementer and bus multiplexer.

Referring now to FIG. 27, a logic diagram of the incrementer circuit 144 and the bus register multiplexer 122 is illustrated. The program counter increment signal (PC INC) supplied on the line 147 from the PLA 190 is coupled to one of two inputs of a NAND gate 1020. The second input to the NAND gate 1020 is coupled to the second nibble control NC2, and signal ($\overline{NC\ 2}$) is coupled to one of two inputs of a NAND gate 1022. The outputs of the NAND gates 1020 and 1022 are coupled together and this connection is coupled to the input of an inverter 1024, to one of two inputs of a NAND gate 1026, one of five inputs of a NAND gate 1028, one of three inputs of a NAND gate 1030, one of three inputs of a NAND gate 1032, and one of four inputs of a NAND gate 1034. The output of the inverter 1024 is coupled to one of two inputs of a NAND gate 1036. The A bit position at the output of the program register 142 (PRA) is coupled to a second input of the NAND gate 1028, to a second input of the NAND gate 1036, to a second input of the NAND gate 1030, to a second input of the NAND gate 1032, and to a second input of the NAND gate 1034. The inverse of the A bit of the program register (PRA) is coupled to the second input of the NAND gate 1026. The outputs of the NAND gates 1036 and 1026 are coupled together and this connection is coupled to one of two inputs of a NAND gate 1038, and also constitutes the A bit position output (PCI A) of the program counter increment circuit 144.

The bus register multiplexer select signal supplied on the line 148 is coupled to the inputs of inverters 1040 through 1042. In addition, the BMS select signal is provided as the second input to the NAND gate 1038, the first of two inputs of a NAND gate 1044, first of two inputs of a NAND gate 1046, and to the first of two inputs of a NAND gate 1048. The output of the inverter 1040 is coupled to the first of two inputs of a NAND gate 1050, and to the first of two inputs of a NAND gate 1052. The A bit position at the output of the ALU 118 (ALU A) is coupled to the second input of the NAND gate 1050. In a similar manner, the B bit position of the ALU output (ALU B) is coupled to the second input of the NAND gate 1052.

In operation, the state of the bus multiplexer select signal supplied on the line 148 will determine whether the ALU A signal is passed through the NAND gate 1050, or the outputs of the NAND gates 1026 and 1036 will be passed through the NAND gate 1038. The outputs of the NAND gates 1038 and 1050 are coupled together and this connection constitutes the output signal from the bus register multiplexer 122 supplied to the bus register 108. The remaining circuitry shown in FIG. 24 is constructed and operates in the same manner as described hereinabove.

Figure 28:
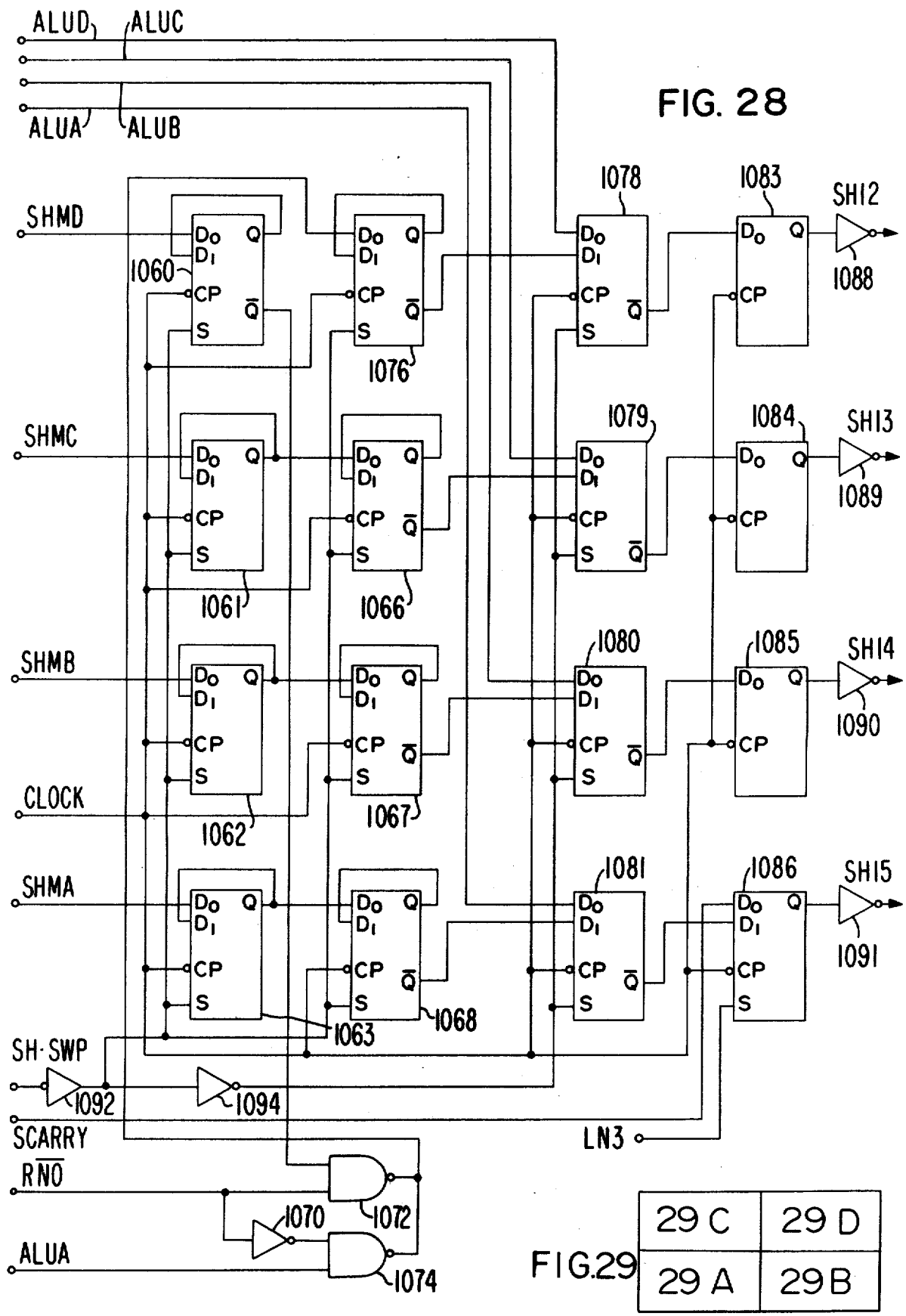
FIG. 28 is a detailed circuit diagram of the scratch register.

Referring now to FIG. 28, a logic diagram of the scratch register 128 is illustrated. The output of the shifter logic 124, which is identified herein as SHM A through SHM D, is provided to the first data ($D_0$) inputs of flipflops 1060 through 1063. The true (Q) of these flipflops are coupled back to the second data ($D_1$) inputs of the same flipflops. In addition, the true outputs of the flipflops 1061 through 1063 are coupled to first data inputs ($D_0$) of flipflops 1066 through 1068, respectively.

The right shift except nibble zero control signal ($\overline{R\ NO}$) from the shifter logic 124 is coupled to the input of an inverter 1070, and to one of two inputs of a NAND gate 1072. The A bit position at the output of the ALU 118 (ALU A) is provided as one of two inputs of a NAND gate 1074. The output of the inverter 1070 is coupled to the second input of the NAND gate 1074. The outputs of the NAND gates 1072 and 1074 are coupled together and this connection is connected to the first data ($D_0$) input of a flipflop 1076. The not true ($\overline{Q}$) output of the flipflop 1060 is coupled to the second input of the NAND gate 1072.

The not true ($\overline{Q}$) output of the flipflops 1076 and 1066 through 1068 are coupled to second data inputs ($D_1$) of flipflops 1078 through 1081, respectively. The result output of the ALU (ALU A through ALU D) is coupled to the first data ($D_0$) inputs of the flipflops 1078 through 1081. The not true ($\overline{Q}$) outputs of the flipflops 1078 through 1081 are coupled to the first data ($D_0$) inputs of flipflops 1083 through 1085, respectively. The not true ($\overline{Q}$) output of the flipflops 1081 is coupled to the second data ($D_1$) input of a flipflop 1086. The true (Q) outputs of the flipflops 1083 through 1086 are coupled to inputs of inverters 1088 through 1099, respectively, and the outputs of these inverters constitute the output of the scratch register 128 supplied to the multiplexers 130 through 133 (FIG. 4a), which signals are designated herein as SH12 through SH15. The SCARRY output signal from the carry logic is coupled to the first data ($D_0$) input of the flipflop 1086, and the shift left on nibble 3 control signal (LN3) from the shifter logic is provided as a select input (S) to this flipflop.

The scratch register 128 is divided into two halves, the first half comprising the flipflops 1060 through 1063, 1076 and 1066 through 1068; and, the second half comprising the flip-flops 1078 through 1081 and 1083 through 1086. The swap multiplexer 126, as identified in FIG. 4a, comprises select (S) inputs to these flipflops.

The shift-or-swap signal (SH SWP) is provided as an input to an inverter 1092, and the output of this inverter is coupled to the input of an inverter 1094 and to the select (S) inputs of the flipflops 1060 through 1063, 1076 and 1066 through 1068. The output of the inverter 1094 is coupled to the select (S) input of flipflops 1078 through 1081. Thus, depending upon the state of the shift-or-swap signal, the first group of flip-flops comprising the scratch register 128 will enter data from the first data ($D_0$) input or the second data ($D_1$) inputs thereof. In addition, the flipflops 1078 through 1081 are likewise controlled by the shift-or-swap signal to enter data from either the first data ($D_0$) inputs or from the second data ($D_1$) inputs thereof.

FIG. 29 is a unitary diagram showing the orientation of FIGS. 29A, 29B, 29C and 29D.

FIGS. 29A through 29D illustrate the details of the PLA 190, which diagram is read in the same manner as that described hereinabove for the control PLA 300 shown in FIG. 8.

The input and output signals have been identified and described in detail hereinabove. The vertical lines of the PLA 190 in the composite drawings are identified as 1 through 72 for the 72 instruction set of the CPU 52. The table set forth hereinbelow identifies these instructions with reference to the vertical lines 1 through 72.

| INSTR. NO. | SEQUENCE STATE | INSTRUCTION OR OPERATION IDENTIFICATION |
|---|---|---|
| 1 | $S_{22}$ | Fetch, Load Accumulator, Page 0 |
| 2 | $S_{22}$ | Fetch, Store Accumulator, Page 0 |
| 3 | $S_{22}$ | Fetch, Increment and Skip if Zero, or Decrement and Skip if 0, Page 0 |
| 4 | $S_{22}$ | Fetch, Load Accumulator, Base Register |
| 5 | $S_{22}$ | Fetch, Store Accumulator, Base Register |
| 6 | $S_{22}$ | Fetch, Inc. & Skip if 0, or Dec. & Skip if 0, Base Register |
| 7 | $S_{22}$ | Fetch, Load Acc., Relative |
| 8 | $S_{22}$ | Fetch, Store Acc., Relative |
| 9 | $S_{22}$ | Fetch, Inc. & Skip if 0, or Dec. & Skip if 0, Relative |
| 10 | $DEFER_1$ | Load Accumulator |
| 11 | $DEFER_1$ | Store Accumulator |
| 12 | $DEFER_1$ | Inc. & Skip if 0, or Dec. & Skip if 0 |
| 13 | $DEFER_2$ | Load Accumulator |
| 14 | $DEFER_2$ | Store Accumulator |
| 15 | $DEFER_2$ | Inc. & Skip if 0, or Dec. & Skip if 0 |
| 16 | $XEQ_1$ | Load Accumulator |
| 17 | $XEQ_1$ | Store Accumulator |
| 18 | $XEQ_1$ | Inc. & Skip if 0 |
| 19 | $XEQ_1$ | Dec. & Skip if 0 |
| 20 | $XEQ_2$ | Inc. & Skip if 0, or dec. & Skip if 0 |
| 21 | $S_{22}$ | Fetch & XEQ, Jump, Page 0 |
| 22 | $S_{22}$ | Fetch & XEQ, Jump, Base Reg. |
| 23 | $S_{22}$ | Fetch & XEQ, Jump, Relative |
| 24 | $S_{22}$ | Fetch & XEQ, Jump to Subroutine, Page 0 |
| 25 | $S_{22}$ | Fetch & XEQ, Jump to Subroutine, Base Reg. |
| 26 | $S_{22}$ | Fetch & XEQ, Jump to Subroutine, Relative |
| 27 | $S_{22}$ | Fetch, Jump or Jump to Subroutine Indirect, Page 0 |
| 28 | $S_{22}$ | Fetch, Jump or Jump to Subroutine Indirect, Base Reg. |
| 29 | $S_{22}$ | Fetch, Jump or Jump to Subroutine Indirect, Relative |

-continued

| INSTR. NO. | SEQUENCE STATE | INSTRUCTION OR OPERATION IDENTIFICATION |
|---|---|---|
| 30 | $DEFER_2$ | Jump, or Jump to Subroutine, Indirect |
| 31 | $DEFER_1$ | Jump, or Jump to Subroutine, Indirect |
| 32 | $XEQ_1$ | Jump, Indirect |
| 33 | $XEQ_1$ | Jump to Subroutine, Indirect |
| 34 | $S_{22}$ | A/L (Arithmetic) |
| 35 | $S_{22}$ | I/O Data In |
| 36 | $S_{22}$ | I/O Data In |
| 37 | $S_{22}$ | I/O Data Out |
| 38 | $S_{22}$ | I/O Data Out |
| 39 | $S_{22}$ | N I/O or Interrupt Enable, or Interrupt Disable |
| 40 | $S_{22}$ | Clear I/O Devices |
| 41 | $S_{22}$ | Unused I/O Code |
| 42 | $XEQ_1$ | I/O Data In |
| 43 | $XEQ_2$ | I/O Data Out |
| 44 | $XEQ_2$ | I/O Data Out |
| 45 | $XEQ_2$ | N I/O or Int. En. or Int. Disable |
| 46 | $XEQ_2$ | Clear I/O Devices, or unused I/O Code |
| 47 | $XEQ_2$ | Store Acc. |
| 48 | SKIP | |
| 49 | $S_{22}$ | Skip on Flags |
| 50 | $XEQ_2$ | Skip on Flags |
| 51 | $S_{22}$ | Interrupt |
| 52 | $INTERRUPT_2$ | Interrupt |
| 53 | $INTERRUPT_3$ | Interrupt |
| 54 | $INT. DEFER_2$ | Interrupt |
| 55 | $INT. DEFER_1$ | Interrupt |
| 56 | $INT. XEQ_1$ | Interrupt |
| 57 | $S_{22}$ | Data Channel |
| 58 | $S_{22}$ | Halt |
| 59 | $S_{22}$ | Console Halt |
| 60 | WAIT | Wait |
| 61 | WAIT | Load P.C. |
| 62 | WAIT | Examine Acc. or Deposit Data into Acc. |
| 63 | WAIT | Examine Memory |
| 64 | WAIT | Continue |
| 65 | WAIT | Deposit Data Into Memory |
| 66 | $CON. OP_1$ | Deposit Data Into Memory |
| 67 | $CON. OP_2$ | Deposit Data Into Memory |
| 68 | $CON. OP_2$ | Load P.C. |
| 69 | $CON. OP_2$ | Examine Acc. |
| 70 | $CON. OP_2$ | Deposit Data into Acc. |
| 71 | $CON. OP_2$ | Examine Memory |
| 72 | $S_{22}$ | A/L (Logic) |

It may be appreciated from the discussion hereinabove that a monolithic microcomputer central processor has been described in detail. Thus, while the invention has been particularly shown and described with reference to one embodiment, it will be understood by those skilled in the art that the foregoing and other changes in form and details may be made without departing from the spirit and scope of the invention. Accordingly, it is intended that the present invention only be limited by the claims set forth hereinbelow.

We claim:

1. For use in a computing system which includes a processing unit, at least one memory unit external to the processing unit for storing a program and data to be processed in said processing unit in response to said program, and peripheral equipment operably connected to said system for access with the processing unit, a monolithic semiconductor integrated central processing unit comprising:

(a) an information bus for bidirectionally communicating instructions and data between said central processing unit and the memory unit and peripheral equipment;

(b) first storage means operably connected to said information bus for receiving and storing program instructions to be executed;

(c) first multiplexer means operably connected to said first storage means to receive memory address information;

(d) second storage means operably connected to said information bus for receiving and storing data and address information;

(e) second multiplexer means operably connected to said second storage means for receiving the stored data and address information to be processed;

(f) control means including a program logic array and sequence state logic and operably connected to said first storage means for receiving a program instruction by said program logic array and generating a plurality of microprogram control codes for controlling processor operation in executing said program instruction;

(g) a program counter means operably connected to said program logic array of said control means and which is operative to receive the memory addresses of the next program instructions to be executed and including incrementing means to obtain the address of subsequent instructions which are to be executed;

(h) a time multiplexed arithmetic logic unit operably connected to said first multiplexer means and said second multiplexer means for receiving memory address information and generating real memory addresses and for receiving data to be processed, said arithmetic logic unit operably connected to said control means for receiving control signals for data manipulation, and said arithmetic logic unit having means operably connected to said program counter to provide said next program instruction memory addresses; and (i) accumulator means including a plurality of shift registers operably connected to receive and store processed information from said arithmetic logic unit and transfer said processed information to said first and second multiplexer means for subsequent processing.

2. A semiconductor monolithic integrated central processing unit as defined by claim 1 wherein said control means includes means for interrupting program execution in response to signals from said peripheral devices.

3. A central processing unit as defined in claim 1 wherein said program counter means comprises register means for storing addresses for the next program instructions to be executed and wherein said incrementing means increments said memory addresses.

4. A central processing unit as defined in claim 1 further including scratch pad register means for storing intermediate computation results of said arithmetic logic unit.

5. A central processing unit as in claim 1 further including means for modifying the data format including shifter and swap means for transforming said data in said processor processing unit.

* * * * *